US011323450B2

(12) United States Patent
Suzuki et al.

(10) Patent No.: US 11,323,450 B2
(45) Date of Patent: May 3, 2022

(54) INFORMATION PROCESSING APPARATUS, INFORMATION PROCESSING METHOD, CLIENT SYSTEM, AND CONTROL METHOD OF CLIENT SYSTEM

(71) Applicant: SONY CORPORATION, Tokyo (JP)

(72) Inventors: Kenji Suzuki, Tokyo (JP); Qihong Wang, Tokyo (JP)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 16/643,644

(22) PCT Filed: Aug. 28, 2018

(86) PCT No.: PCT/JP2018/031661
§ 371 (c)(1),
(2) Date: Mar. 2, 2020

(87) PCT Pub. No.: WO2019/049711
PCT Pub. Date: Mar. 14, 2019

(65) Prior Publication Data
US 2020/0220876 A1 Jul. 9, 2020

Related U.S. Application Data

(60) Provisional application No. 62/556,564, filed on Sep. 11, 2017.

(51) Int. Cl.
*G06F 21/00* (2013.01)
*H04L 29/06* (2006.01)
*G06F 21/32* (2013.01)

(52) U.S. Cl.
CPC ............ *H04L 63/102* (2013.01); *G06F 21/32* (2013.01); *H04L 63/101* (2013.01); *H04L 63/108* (2013.01)

(58) Field of Classification Search
CPC ... H04L 63/102; H04L 63/101; H04L 63/108; H04L 63/083; H04L 63/0861;
(Continued)

(56) References Cited

U.S. PATENT DOCUMENTS 10,044,847 B2 * 8/2018 Economy .......... H04M 1/72409
2005/0097320 A1 5/2005 Golan et al.
(Continued)

FOREIGN PATENT DOCUMENTS

CN 101073219 A 11/2007
CN 107077597 A 8/2017
(Continued)

OTHER PUBLICATIONS

International Search Report and Written Opinion of PCT Application No. PCT/JP2018/031661, dated Oct. 23, 2018, 11 pages of ISRWO.

*Primary Examiner* — Kendall Dolly
(74) *Attorney, Agent, or Firm* — Chip Law Group

(57) ABSTRACT

The present disclosure relates to an information processing apparatus, an information processing method, a client system, and a control method of the client system that can reduce labor of authentication by a user without reducing a security level of a settlement process. The user wears a wearable device that performs fingerprint authentication and that periodically transmits position information to a bank server. In addition, the user operates a client apparatus including a smartphone, a PC, or the like to execute a settlement process. The client apparatus transmits position information of the client apparatus to a bank server in the settlement process. The bank server reduces a risk score if the wearable device and the client apparatus are at the same position based on the position information of the wearable device and the position information of the client apparatus.

(Continued)

The present disclosure can be applied to a settlement processing system.

16 Claims, 30 Drawing Sheets

(58) Field of Classification Search
CPC ... H04L 63/1425; H04L 63/107; G06F 21/32; H04W 12/06; H04W 12/61; H04W 12/67; H04W 12/63
See application file for complete search history.

(56) References Cited

U.S. PATENT DOCUMENTS

| | | |
|---|---|---|
| 2015/0181368 A1 | 6/2015 | Okabayashi |
| 2016/0224779 A1* | 8/2016 | Kitane ............... H04L 63/0853 |
| 2017/0185103 A1* | 6/2017 | Kim ..................... H04W 12/50 |
| 2018/0006821 A1* | 1/2018 | Kinagi ................ H04L 9/3234 |

FOREIGN PATENT DOCUMENTS

| | | |
|---|---|---|
| EP | 3089062 A1 | 11/2016 |
| JP | 2007-514333 A | 5/2007 |
| JP | 2015-076044 A | 4/2015 |
| JP | 2015-121840 A | 7/2015 |
| JP | 2015-121910 A | 7/2015 |
| JP | 2017-134689 A | 8/2017 |
| JP | 2017-531843 A | 10/2017 |
| KR | 20160006912 A | 1/2016 |
| WO | 2005/025292 A2 | 3/2005 |
| WO | 2015/098384 A1 | 7/2015 |
| WO | 2016/006927 A1 | 1/2016 |

\* cited by examiner

FIG. 17

INFORMATION PROCESSING APPARATUS, INFORMATION PROCESSING METHOD, CLIENT SYSTEM, AND CONTROL METHOD OF CLIENT SYSTEM

CROSS REFERENCE TO RELATED APPLICATIONS

This application is a U.S. National Phase of International Patent Application No. PCT/JP2018/031661 filed on Aug. 28, 2018, which claims priority benefit of U.S. Provisional Application No. 62/556,564 filed in the U.S. Patent Office on Sep. 11, 2017. Each of the above-referenced applications is hereby incorporated herein by reference in its entirety.

TECHNICAL FIELD

The present disclosure relates to an information processing apparatus, an information processing method, a client system, and a control method of the client system, and particularly, to an information processing apparatus, an information processing method, a client system, and a control method of the client system that can reduce labor of authentication by a user without reducing a security level in a settlement process.

BACKGROUND ART

A technique is proposed, in which an authentication processing method is determined based on reliability information according to authenticity of a user in electronic settlement (see PTL 1).

CITATION LIST

Patent Literature

[PTL 1]
JP 2015-076044A

SUMMARY

Technical Problem

However, in the technique described in PTL 1, just the authentication processing method is determined based on the reliability information according to the authenticity of the user, and an authentication process of the user is required. Therefore, the user needs to execute the cumbersome authentication process.

The present disclosure has been made in view of the circumstances, and the present disclosure can particularly reduce labor of authentication by a user without reducing a security level in a settlement process.

Solution to Problem

A first aspect of the present disclosure provides an information processing apparatus and an information process method including a risk determination unit that determines, in a settlement process, a risk regarding the settlement process based on a positional relationship between an authentication apparatus that has authenticated a user and a client apparatus for the user to execute the settlement process.

In the first aspect of the present disclosure, the risk regarding the settlement process is determined in the settlement process based on the positional relationship between the authentication apparatus that has authenticated the user and the client apparatus for the user to execute the settlement process.

A second aspect of the present disclosure provides a client system and a control method of the client system including: an authentication apparatus that authenticates a user; and a client apparatus that applies a settlement process of the user to an information processing apparatus that determines a risk regarding the settlement process. The authentication apparatus includes: an authentication unit that authenticates the user; an authentication apparatus position information acquisition unit that acquires position information of the authentication apparatus as authentication apparatus position information; and an authentication apparatus position information transmission unit that transmits an authentication result of the authentication unit and the authentication apparatus position information to the information processing apparatus. The client apparatus includes: a client apparatus position information acquisition unit that acquires position information of the client apparatus as client apparatus position information; and a client apparatus position information transmission unit that transmits the client apparatus position information to the information processing apparatus.

In the second aspect of the present disclosure, the authentication apparatus authenticates the user, acquires the position information of the authentication apparatus as the authentication apparatus position information, and transmits the authentication result and the authentication apparatus position information to the information processing apparatus, and the client apparatus acquires the position information of the client apparatus as the client apparatus position information and transmits the client apparatus position information to the information processing apparatus.

Advantageous Effect of Invention

According to the aspects of the present disclosure, the labor of authentication by the user can be reduced without reducing the security level in the settlement process.

BRIEF DESCRIPTION OF DRAWINGS

FIG. 17 is a flow chart describing a pre-credit process of the pre-credit processing system of FIG. 4.

DESCRIPTION OF EMBODIMENT

A preferred embodiment of the present disclosure will be described in detail with reference to the attached drawings. Note that in the present specification and the drawings, the same reference signs are provided to the constituent elements with substantially the same functional configurations, and the description will not be repeated.

Hereinafter, the embodiment of the present technique will be described. The embodiment will be described in the following order.

1. Overview of Settlement Processing System
2. Configuration Example of Settlement Processing System of Present Disclosure
3. Configuration Example of Pre-Credit Processing System of Present Disclosure
4. Configuration Example of Client Apparatus
5. Configuration Example of EC Store Server
6. Configuration Example of Acquirer Server
7. Configuration Example of Mediation Server
8. Configuration Example of Bank Server
9. Configuration Example of Wearable Device
10. Settlement Process in Settlement Processing System of FIG. 3
11. Registration Process
12. Context Information Upload Process
13. Pre-Credit Process of Settlement Processing System of FIG. 3
14. Variation of Acquisition Method of Position Information of Client Apparatus and Wearable Device (Part 1)
15. Variation of Acquisition Method of Position Information of Client Apparatus and Wearable Device (Part 2)
16. Variation of Method of Determining Whether or Not Client Apparatus and Wearable Device Are at Substantially the Same Position (Part 1)
17. Variation of Method of Determining Whether or Not Client Apparatus and Wearable Device Are at Substantially the Same Position (Part 2)
18. Modification of Context Information Upload Process
19. Application to Face-to-Face Settlement
20. Example of Execution by Software <<1. Overview of Settlement Processing System>>

In describing a settlement processing system of the present disclosure, an overview of the settlement processing system will be described first.

Figure 1:
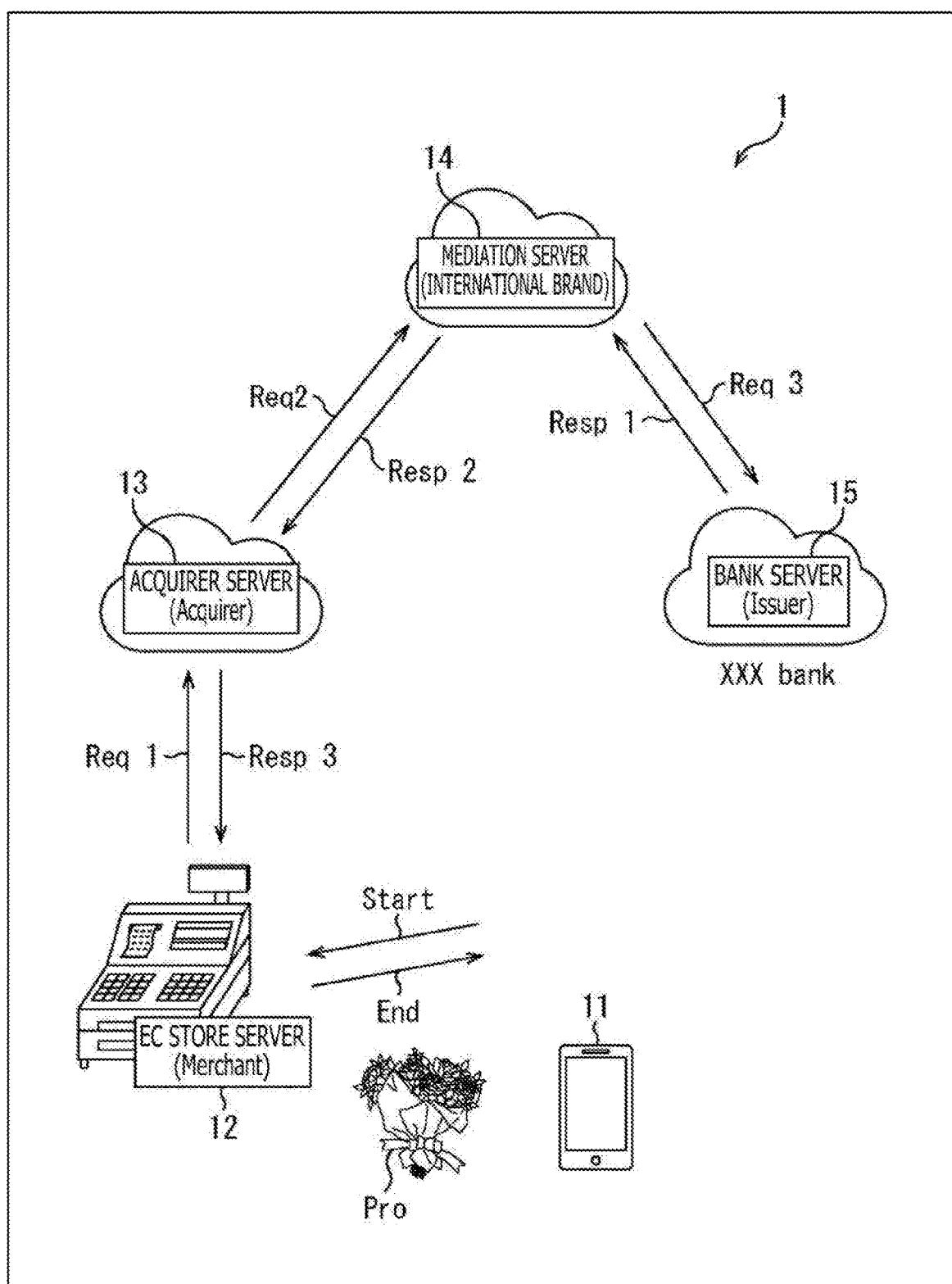
FIG. 1 is a diagram describing an overview of a settlement processing system.

Generally, in a case where a user uses a client apparatus (for example, smartphone or PC (Personal Computer)) to purchase a product through electronic settlement, the settlement processing system has, for example, a configuration as illustrated in FIG. 1.

A settlement processing system 1 of FIG. 1 includes a client apparatus 11, an EC (electronic commerce) store server (Merchant) 12, an acquirer server (Acquirer) 13, a mediation server 14 managed and operated by an international brand (Payment card brand) agent, and a bank server (Issuer) 15.

The client apparatus 11 is a smartphone, a mobile PC (personal computer), or the like and is possessed by the user. The client apparatus 11 uses a browser application program or the like to access the EC store server 12 to select a product and executes a settlement process to realize purchase of the product. The client apparatus 11 transmits information, such as a card number of a credit card of the user, to the EC store server 12 to thereby cause the EC store server 12 to execute the settlement process.

The EC store server (Merchant) 12 is a server managed and operated by a member store (Merchant) corresponding to a store in face-to-face settlement. The EC store server 12 provides an HP (HomePage) or the like necessary for product sales to the client apparatus 11 and the like through a network such as the Internet. Furthermore, in selling the product selected by the client apparatus 11, the EC store server 12 requests, through the HP or the like, the acquirer server 13 for a credit process necessary for settlement by credit card and acquires a credit result. In this case, the EC store server 12 supplies information necessary for the credit process including the card number of the credit card and the information of the price of the product and requests the acquirer server 13 for the credit process. Furthermore, the EC store server 12 acquires the credit result from the acquirer server 13 and executes the settlement process regarding the sales of the product based on the credit result.

The acquirer server (Acquirer) 13 is a server managed by a member store management agent (Acquirer) that is a financial institution for paying the amount to the EC store server 12 according to the settlement result of the credit card. Once the acquirer server 13 acquires the card number of the credit card and the information of the price supplied from the EC store server 12 in the settlement process, the acquirer server 13 supplies the acquired credit card number and the information of the price to the mediation server 14 to request for a credit process. The acquirer server 13 acquires a credit result and supplies the credit result to the EC store server 12.

The mediation server 14 is a server managed by an agent that manages international brands (Payment card brands), such as VISA (registered trademark), Master (registered trademark), and JCB (registered trademark). The mediation server 14 executes a mediation process regarding the credit process between the acquirer server 13 and the bank server 15. That is, the mediation server 14 acquires the card number of the credit card and the information necessary for the credit of the amount from the acquirer server 13 and receives the request for the credit process. In addition, the mediation server 14 supplies the acquired card number and the information necessary for the credit of the amount to the bank server 15. The mediation server 14 also acquires the credit result and transmits the credit result to the acquirer server 13.

The bank server 15 is an issuer of the credit card and is a server managed and operated by a bank that makes a contract with the credit card user to provide various services. The bank server 15 executes a credit process regarding settlement by credit card. That is, the bank server 15 executes the credit process based on the card number of the credit card and the information of the price that are supplied from the mediation server 14 and used for the settlement, and the bank server 15 supplies the credit result to the mediation server 14. In addition, the bank server 15 records information of the price regarding the product purchase settled when the credit is accepted. The bank server 15 transfers the amount of money to an account managed by the acquirer server 13.

The acquirer server 13 deposits, into an account of the member store, the amount of money of the credit card settlement transferred by the bank server 15.

The settlement process of the settlement processing system 1 of FIG. 1 as described above is a process as follows.

First, as indicated by a process Start in FIG. 1, when the client apparatus 11 executes a purchase process of a product, the information of the card number of the credit card of the user purchasing the product is supplied to the EC store server 12.

In a process Req 1, once the EC store server 12 acquires the information of the card number of the credit card from the client apparatus 11, the EC store server 12 transmits information for requesting the acquirer server 13 to execute the credit process, along with the information of the price regarding the product purchase.

In a process Req 2, once the acquirer server 13 acquires the card number of the credit card and the information of the price from the EC store server 12 and acquires the information for requesting the credit process, the acquirer server 13 transmits information for requesting the credit process to the mediation server 14, along with the information of the card number and the information of the price.

In a process Req 3, once the mediation server 14 acquires the card number of the credit card and the information of the price from the acquirer server 13 and acquires the information for requesting the credit process, the mediation server 14 transmits information for requesting the credit process to the bank server 15, along with the card number and the information of the price.

In a process Resp 1, once the bank server 15 acquires the card number of the credit card and the information of the price from the mediation server 14, the bank server 15 executes the credit process and transmits the credit result to the mediation server 14.

In a process Resp 2, once the mediation server 14 acquires the credit result from the bank server 15, the mediation server 14 transmits the credit result to the acquirer server 13.

In a process Resp 3, once the acquirer server 13 acquires the credit result from the mediation server 14, the acquirer server 13 transmits the credit result to the EC store server 12.

As indicated by a process End, the EC store server 12 completes the settlement process based on the credit result and ends the selling process of the product. That is, if there is no problem in the credit result, the settlement of the charge regarding the product sale is completed. If there is a problem in the credit result, the product sale is not concluded.

The process realizes the settlement process.

<Pre-Credit System Realized by Settlement Processing System of FIG. 1>

However, the series of processes are processes based on the assumption that there is no counterfeiting or impersonation of the credit card, and in reality, countermeasures against counterfeiting of the information of the credit card and impersonation are necessary. The settlement processing system 1 of FIG. 1 further executes, for example, a pre-credit process in the series of settlement processes to take measures against counterfeiting of the information of the credit card and take measures against impersonation.

Figure 2:
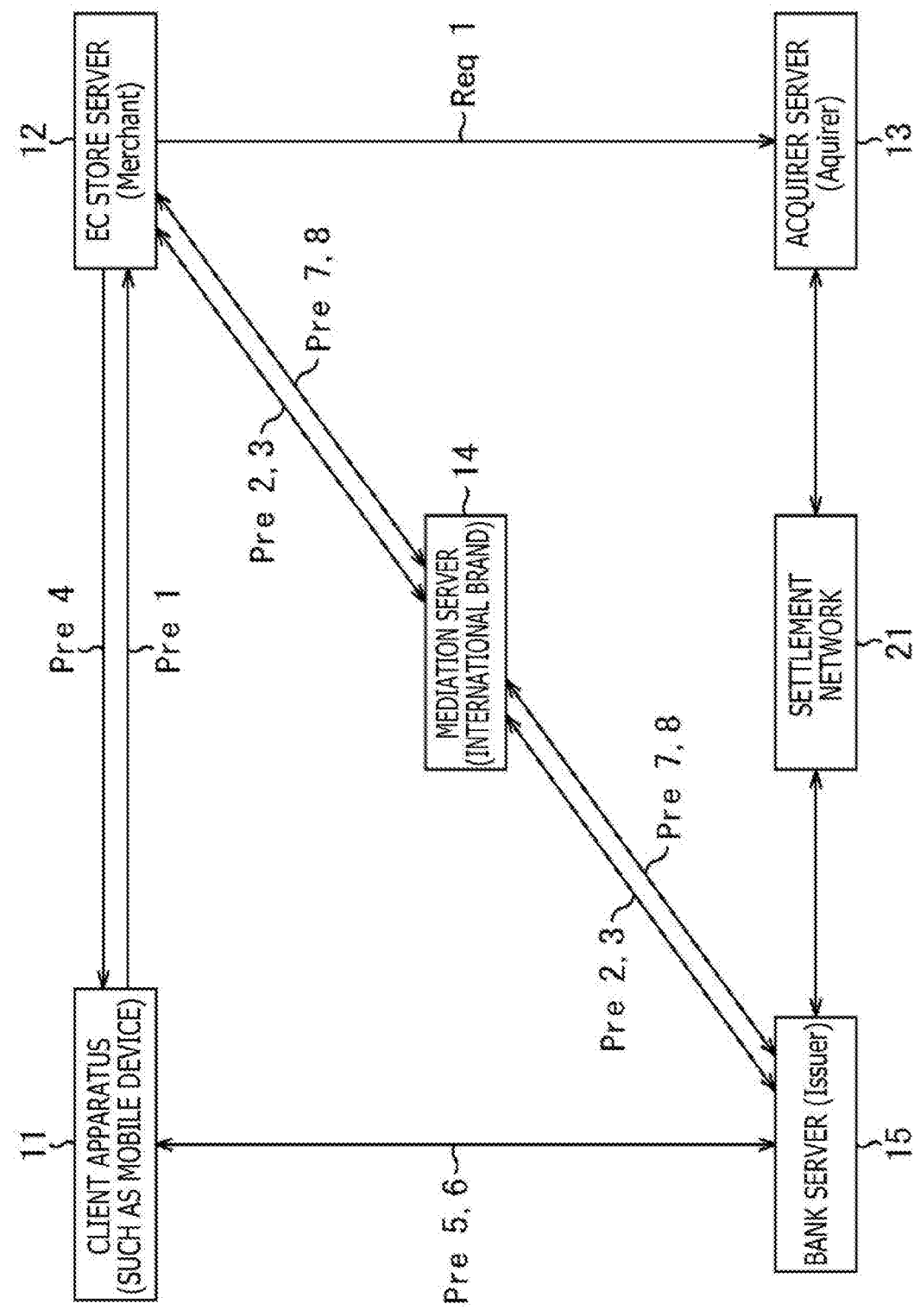
FIG. 2 is a diagram describing an overview of a pre-credit processing system.

FIG. 2 illustrates a configuration example of the pre-credit processing system for realizing the pre-credit process. Here, a pre-credit processing system 10 of FIG. 2 includes the client apparatus 11, the EC store server (Merchant) 12, the mediation server 14, and the bank server (Issuer) 15 in FIG. 1. Note that although the acquirer server (Acquirer) 13 is described in FIG. 2, the acquirer server (Acquirer) 13 is described to illustrate a situation of advance to the normal settlement process from the client apparatus 11. In addition, a settlement network 21 provided between the acquirer server 13 and the bank server 15 includes the mediation server 14 and the like in the settlement process of FIG. 1.

In the pre-credit process of FIG. 2, the function of the client apparatus 11 is similar to the case in FIG. 1.

The EC store server 12 supplies the card number of the credit card and the information of the price regarding the product purchase supplied from the client apparatus 11 to the bank server 15 through the mediation server 14 at timing before the request for the credit indicated by the process Req 1 in FIG. 1. The EC store server 12 requests for the pre-credit and acquires the pre-credit result. Furthermore, in a case where the pre-credit result is not accepted, the EC store server 12 requests, through the mediation server 14, the bank server 15 for a so-called challenge flow (Challenge Flow), which is an authentication process for directly inputting a password to the client apparatus 11 or an authentication process for immediately inputting biological information. In response to the request for the challenge flow, the bank server 15 causes the client apparatus 11 to execute the authentication process. The bank server 15 acquires the authentication result and transmits the pre-credit result regarding the challenge flow to the EC store server 12 through the mediation server 14. Note that a flow without a problem in the pre-credit result, that is, a flow for advancing the settlement process without the need for the challenge flow, will be referred to as a frictionless flow (Frictionless Flow).

The bank server 15 calculates a risk score of the risk regarding counterfeiting and impersonation based on the information of the card number of the credit card and the information of the price supplied from the EC store server 12.

The bank server 15 compares the calculated risk score and a predetermined threshold. When the bank server 15 assumes that the risk score is lower than the predetermined threshold so that there is no counterfeiting or impersonation of the card number of the credit card, the bank server 15 transmits a pre-credit result indicating that there is no problem in the pre-credit to the EC store server 12 through the mediation server 14. In this case, the EC store server 12 advances the settlement process described with reference to Req 1 of FIG. 1.

On the other hand, when the bank server 15 assumes that the risk score is higher than the predetermined threshold so that there is a suspicion of counterfeiting or impersonation of the card number of the credit card after comparing the calculated risk score and the predetermined threshold, the bank server 15 transmits a pre-credit result indicating that there is a problem in the pre-credit to the EC store server 12 through the mediation server 14. In this case, the EC store server 12 acquires the pre-credit result and requests, through the mediation server 14, the bank server 15 for the challenge flow that is a process of requesting the client apparatus 11 for the authentication process.

In response to the request for the challenge flow, the bank server 15 requests the client apparatus 11 for the authentication process of the password and acquires. The bank server 15 determines whether or not the authentication result is appropriate and transmits the result to the EC store server 12 through the mediation server 14.

In this case, in a case where the authentication information acquired in the authentication process executed based on the challenge flow is appropriate, the EC store server 12 executes the settlement process as indicated by the process Req 1 of FIG. 1 as in the case where the risk score is higher than the predetermined threshold.

On the other hand, in a case where the authentication information acquired in the authentication process based on the challenge flow is not appropriate, the EC store server 12 stops the settlement process.

Here, the pre-credit process of the pre-credit system of FIG. 2 will be described.

In a process Pre 1 of FIG. 2, the client apparatus 11 transmits the card number of the credit card regarding the settlement process and the information of the price required for the settlement process to the EC store server 12.

In a process Pre 2, the EC store server 12 combines the acquired information of the card number and the information of the price and requests the bank server 15 for the pre-credit process through the mediation server 14.

In a process Pre 3, the bank server 15 calculates the risk score based on the acquired information of the card number and the information of the price and compares the risk score and the predetermined threshold to determine whether or not the pre-credit is OK. The bank server 15 transmits the pre-credit result based on the determination result to the EC store server 12 through the mediation server 14.

In this case, in a case where the pre-credit result is OK so that there is no problem in the card number of the credit card, the usage limit, and the like, the EC store server 12 starts the settlement process in the process Req 1. That is, the frictionless process is realized in this case.

Furthermore, in a case where the pre-credit result is NG so that there is a suspicion of counterfeiting or impersonation in relation to the card number of the credit card, the EC store server 12 requests the client apparatus 11 for the authentication process through the challenge flow in a process Pre 4.

In a process Pre 5, the client apparatus 11 notifies the bank server 15 of the fact that the EC store server 12 has requested for the authentication process through the challenge flow and notifies the bank server 15 to request the client apparatus 11 for the authentication process through the challenge flow.

In a process Pre 6, the bank server 15 requests the client apparatus 11 for the authentication process using a password input by the user or using biological information. In response to this, the client apparatus 11 supplies the authentication result based on the input password or the biological information to the bank server 15. Furthermore, the bank server 15 acquires the authentication result and determines whether or not the authentication result is authorized.

In a process Pre 7, the bank server 15 transmits the determination result indicating whether or not the authentication information in the challenge flow is authorized to the EC store server 12 through the mediation server 14. In a process Pre 8, the EC store server 12 notifies that the authentication result of the challenge flow is received.

In this case, the process proceeds to the process Req 1 in a case where the authentication information in the challenge flow is authorized, and the settlement process ends in a case where the authentication information is not authorized.

As a result of the pre-credit process, the risk score of counterfeiting and impersonation of the credit card is obtained. In the case where the risk score is lower than the predetermined threshold, the frictionless flow is conducted, and the settlement process is carried out. In the case where the risk score is higher than the predetermined threshold, the challenge flow is conducted to execute the authentication process, and the settlement process is carried out according to the authentication result.

As a result, the settlement process can be realized while the measures against counterfeiting and impersonation of the credit card are taken, and a more appropriate settlement process can be realized.

However, if a high risk score is obtained for some reason in a case where an authorized user uses an authorized credit card to execute the settlement process, the challenge flow is conducted even though the authorized user is using the authorized credit card.

In such a case, the input process of the authentication information in the challenge flow is a troublesome process when the authorized user uses the authorized credit card, and it is desirable that the challenge flow be not conducted in the pre-credit process.

Therefore, in the present disclosure, the frequency of transition to the challenge flow when the authorized user uses the authorized credit card can be reduced as much as possible while appropriately taking measures against counterfeiting and impersonation of the credit card. This can realize a settlement process comfortable for the user while maintaining the security.

<<2. Configuration Example of Settlement Processing System of Present Disclosure>>

Next, a configuration example of a settlement processing system of the present disclosure will be described with reference to FIG. 3.

Figure 3:
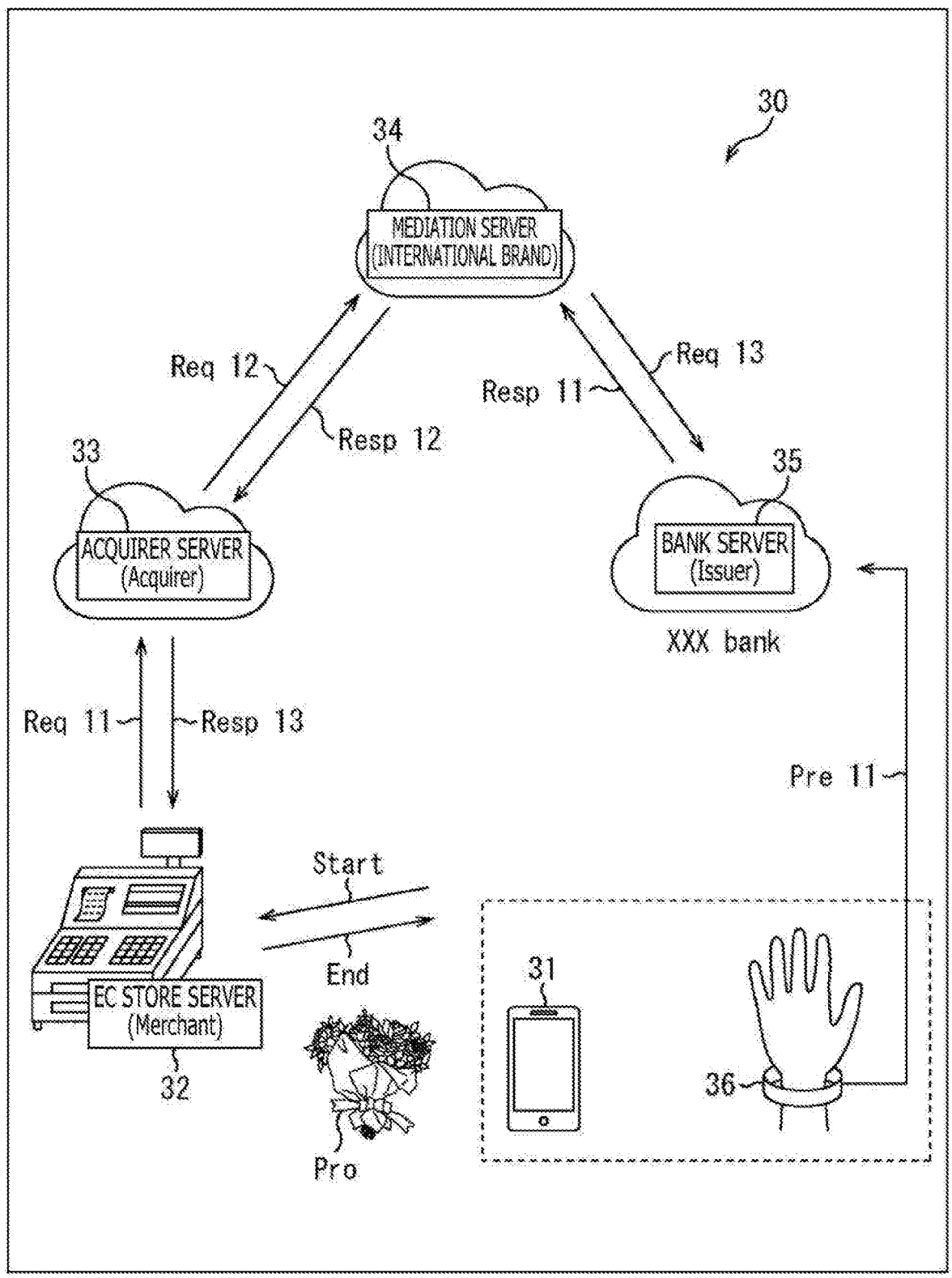
FIG. 3 is a diagram describing an overview of a settlement processing system of the present disclosure.

A settlement processing system 30 of FIG. 3 includes a client apparatus 31, an EC store server (Merchant) 32, an acquirer server (Acquirer) 33, a mediation server 34, a bank server (Issuer) 35, and a wearable device 36.

Note that basic functions of the client apparatus 31, the EC store server (Merchant) 32, the acquirer server (Acquirer) 33, the mediation server 34 managed and operated by an international brand (Payment card brand) agent are substantially the same as the client apparatus 11, the EC store server (Merchant) 12, the acquirer server (Acquirer) 13, and the mediation server 14 of FIG. 1, respectively.

In addition, the settlement processing system 30 of FIG. 3 is different from the settlement processing system 1 of FIG. 1 in that the wearable device 36 is additionally provided.

The wearable device 36 is worn by the user using the client apparatus 31, and the wearable device 36 executes an authentication process based on the biological information of the user. The wearable device 36 also acquires position information at a predetermined time interval and transmits the position information as context information to the bank server 35. The biological information used in the authentication process of the wearable device 36 can be any biological information that can identify the user, such as a fingerprint, a vein pattern, an iris, a face image, and a combination of these. However, an example of using a fingerprint as the biological information to execute the authentication process will be described below.

In addition, the settlement process of the settlement processing system 30 of FIG. 3 is different from the settlement process in the settlement processing system 1 of FIG. 1 in that the position information of the client apparatus 31 is used in the pre-credit process in addition to the information of the credit card and the price.

That is, the wearable device 36 transmits the position information to the bank server 35 at a predetermined time interval. The bank server 35 associates and stores, in advance, the wearable device 36 used by the user that is a user of the credit card and the client apparatus 11 used in the settlement process, in association with the card number of the credit card.

In addition, the bank server 35 acquires and stores the context information including the position information periodically transmitted from the wearable device 36. Furthermore, in the settlement process, the bank server 35 compares the position information of the client apparatus 31 that has requested the settlement process and the position information of the wearable device 36 that is the latest context information. In a case where the position information matches, the bank server 35 assumes that the user using the client apparatus 31 to request the settlement process is the person authenticated by the wearable device 36 based on the biological information, and the bank server 35 reduces the risk score to execute the pre-credit process.

As a result, in the settlement process in which the authorized user using the authorized credit card uses the client apparatus 31, the user of the credit card is the authenticated authorized user, and the user is executing the settlement process. Therefore, the risk score is reduced, and the frequency of transition to the challenge flow is reduced. As a result, the authentication process associated with the challenge flow is not necessary. This can reduce the frequency of troublesome authentication process without reducing the security level, and a comfortable settlement process can be realized.

Note that the details of the pre-credit process will be described later with reference to a pre-credit processing system of the present disclosure in FIG. 4.

In addition, the settlement process in the settlement processing system 30 of FIG. 3 is the same as the settlement process of the settlement processing system 1 in FIG. 1, and the description will not be repeated.

<<3. Configuration Example of Pre-Credit Processing System of Present Disclosure>>

Next, a configuration example of the pre-credit processing system of the present disclosure will be described with reference to FIG. 4.

A pre-credit system 40 of the present disclosure includes the client apparatus 31, the EC store server (Merchant) 32, the mediation server 34, the bank server (Issuer) 35, and the wearable device 36 in FIG. 1.

Note that here, the client apparatus 31, the EC store server (Merchant) 32, and the mediation server 34 also have substantially the same functions as the client apparatus 11, the EC store server (Merchant) 12, and the mediation server 14, respectively, and the description will be appropriately skipped. In addition, the processes of processes Pre 11 to Pre 18 in FIG. 4 are basically similar to the processes Pre 11 to Pre 8 of FIG. 2.

Although the basic function of the bank server 35 is substantially the same as the bank server 15, the bank server 35 acquires and stores, as context information, the position information of the user transmitted by the wearable device 36 at a predetermined time interval and the authentication result based on the biological information.

In addition, once the bank server 35 acquires the position information of the client apparatus 31 in addition to the card number of the credit card and the information of the price in the pre-credit process, the bank server 35 reduces the risk score by a predetermined value when the position information of the client apparatus 31 substantially matches the position information of the wearable device 36 based on the comparison with the position information included in the most recently acquired context information supplied from the wearable device 36 and when there is no problem in the authentication result based on the biological information (when the acquired biological information matches the biological information of the authorized user registered in advance in the authentication process).

That is, the bank server 35 can assume that the authorized user is using the authorized credit card to request for the settlement process in the case where the position information of the client apparatus 31 matches the position information of the wearable device 36 and there is no problem in the authentication result based on the biological information registered in advance. Therefore, the bank server 35 can reduce the risk score obtained by the normal calculation method.

As a result of the process, the pre-credit process using the position information and the authentication result based on the biological information can suppress generation of an unnecessary challenge flow while taking measures against counterfeiting and impersonation of the credit card. In the case where the authorized user uses the authorized credit card, an unnecessary authentication process is not requested, and a more comfortable settlement process can be realized.

<<4. Configuration Example of Client Apparatus>>

Figure 5:
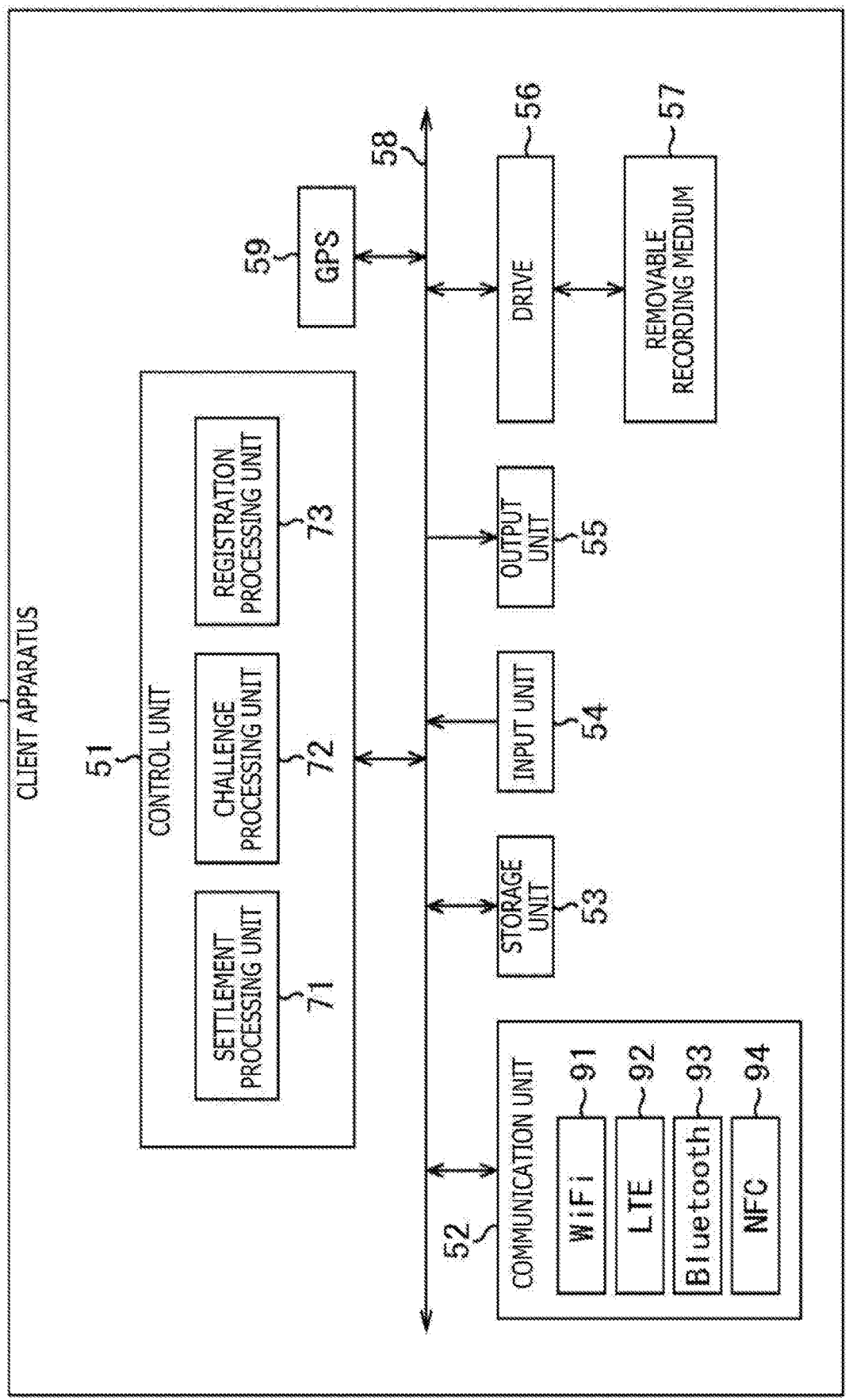
FIG. 5 is a diagram describing a configuration example of a client apparatus.

Next, a configuration example of the client apparatus 31 will be described with reference to FIG. 5.

The client apparatus 31 is a terminal used by a user purchasing a product in a settlement process and is, for example, a smartphone, a PC, or the like.

More specifically, the client apparatus 31 includes a control unit 51, a communication unit 52, a storage unit 53, an input unit 54, an output unit 55, a drive 56, a removable storage medium 57, and a GPS 59 that are electrically connected to each other through a bus 58.

The control unit 51 includes a processor and a memory and controls the entire operation of the client apparatus 31.

In addition, the control unit 51 includes a settlement processing unit 71, a challenge processing unit 72, and a registration processing unit 73. Note that the settlement processing unit 71, the challenge processing unit 72, and the registration processing unit 73 are functions realized by, for example, installing an application program distributed by the bank server 35.

The settlement processing unit 71 executes the settlement process in purchasing the product and controls the communication unit 52 to transmit, to the EC store server 12, the position information of the client apparatus 31 acquired from the GPS 59 and the information of the card number of the credit card stored in the storage unit 53.

In a case where the risk score is high in the pre-authentication process, and the authentication process is requested by the bank server 35, the challenge processing unit 72 controls the output unit 55 to display an image for prompting the input of authentication information and to output sound. The challenge processing unit 72 also controls the communication unit 52 to transmit the authentication result based on the input authentication information to the EC store server 12.

The registration processing unit 73 executes a registration process to register and store the wearable device 36 worn by the user and the card number in association with the bank server 35.

The communication unit 52 is controlled by the control unit 51, and the communication unit 52 uses a wired network (or a wireless network (not illustrated)) to transmit and receive various data and programs to and from the EC store server 32 and the wearable device 36 through a communication network represented by a LAN (Local Area Network) or the like.

More specifically, the communication unit 52 includes various communication functions including a WiFi communication unit (WiFi) 91, an LTE communication unit (LTE) 92, a Bluetooth communication unit (Bluetooth) 93, and an NFC communication unit (NFC) 94 and communicates with the EC store server 12 and the wearable device 36. Note that just any one of the WiFi communication unit (WiFi) 91, the LTE communication unit (LTE) 92, the Bluetooth communication unit 93 (Bluetooth), and the NFC communication unit (NFC) 94 needs to be provided, or a communication unit of another communication system may also be included.

The WiFi communication unit (WiFi) 91 is controlled by the control unit 51, and the WiFi communication unit (WiFi) 91 transmits and receives data and programs to and from other apparatuses through WiFi communication.

The LTE communication unit (LTE) 92 is controlled by the control unit 51, and the LTE communication unit (LTE) 92 transmits and receives data and programs to and from other apparatuses through LTE (Long Term Evolution) communication. Note that the LTE is one of the mobile phone communication techniques, and another communication system of mobile phone communication may also be used.

The Bluetooth communication unit (Bluetooth) 93 is controlled by the control unit 51, and the Bluetooth communication unit (Bluetooth) 93 transmits and receives data and programs to and from other apparatuses through Bluetooth (registered trademark) communication.

The NFC communication unit (NFC) 93 is controlled by the control unit 51, and the NFC communication unit (NFC) 93 transmits and receives data and programs to and from other apparatuses through NFC (Near Field Communication) communication.

The storage unit 53 is controlled by the control unit 51, and the storage unit 53 includes an HDD (Hard Disk Drive), an SSD (Solid State Drive), a semiconductor memory, or the like. The storage unit 53 writes or reads various data and programs. In addition, the information of the card number of the credit card is stored in the storage unit 53.

The input unit 54 includes a keyboard, an operation button, and the like, and the input unit 54 receives an operation input of the user.

The output unit 55 includes: a display unit that is a display or the like including, for example, an LCD (Liquid Crystal Display) or an organic EL (Electro Luminescence) for displaying images; and a sound output unit including a speaker or the like that outputs sound. The output unit 55 outputs images and sound as necessary.

The drive 56 reads and writes data to and from the removable storage medium 57, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

The GPS (Global Positioning System) 59 receives signals from a plurality of satellites not illustrated. The GPS 59 calculates the position information of the client apparatus 11 and outputs the calculated position information to the control unit 51.

<<5. Configuration Example of EC Store Server>>

Figure 6:
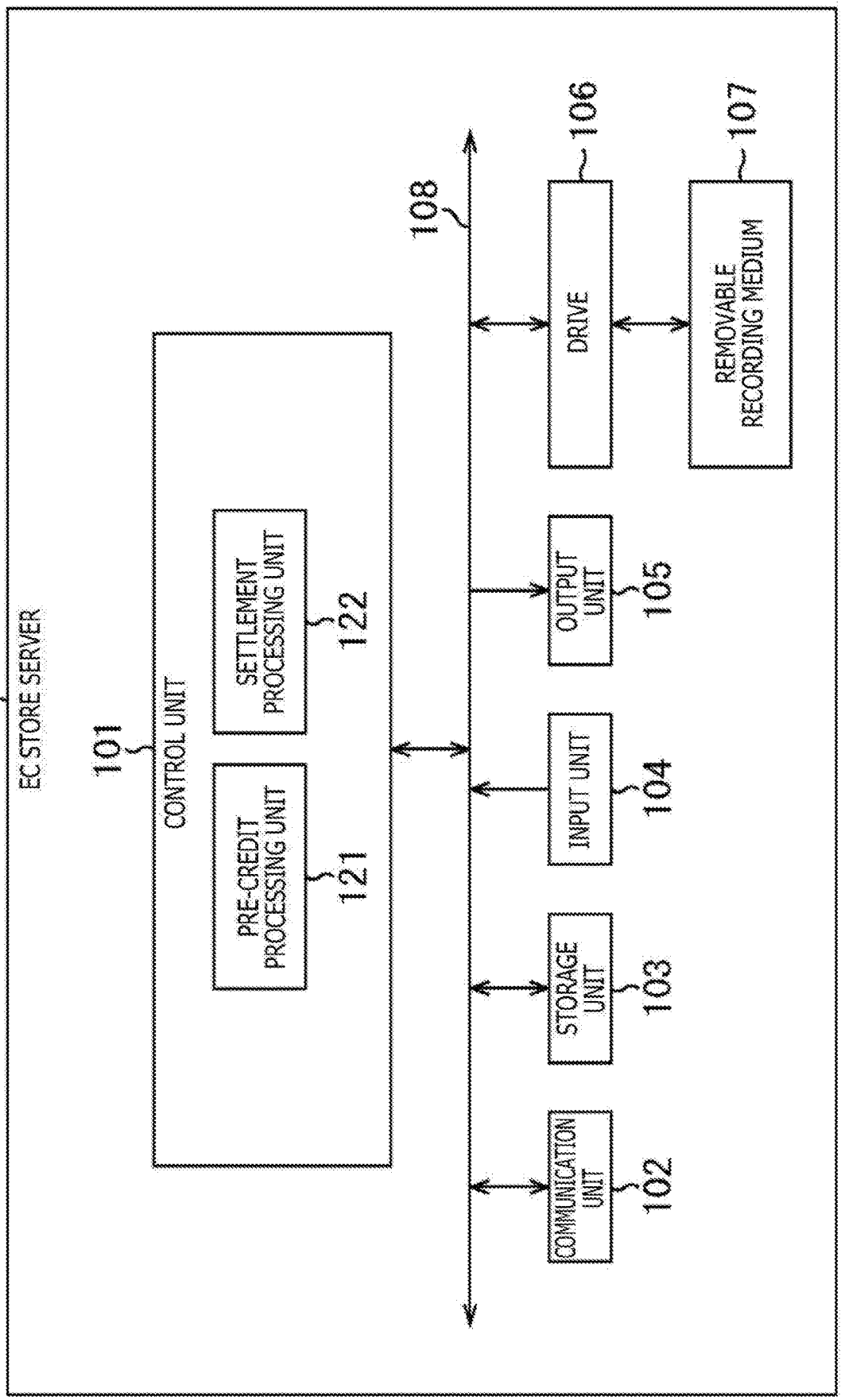
FIG. 6 is a diagram describing a configuration example of an EC store server.

Next, a configuration example of the EC store server 32 will be described with reference to FIG. 6.

The EC store server 32 is a server managed and operated by a store selling a product through the settlement process and is, for example, a PC or the like.

More specifically, the EC store server 32 includes a control unit 101, a communication unit 102, a storage unit 103, an input unit 104, an output unit 105, a drive 106, and a removable storage medium 107 that are electrically connected to each other through a bus 108.

The control unit 101 includes a processor and a memory and controls the entire operation of the EC store server 32.

In addition, the control unit 101 includes a pre-credit processing unit 121 and a settlement processing unit 122.

The pre-credit processing unit 121 executes in advance a pre-credit process that is a countermeasure process against counterfeiting and impersonation of the credit card upon the settlement process. More specifically, the pre-credit processing unit 121 supplies, to the bank server 35 through the mediation server 34, the card number of the credit card, the price, and the position information of the client apparatus 31 that has requested for the settlement process and requests the bank server 35 for the pre-credit process.

In a case where the pre-credit is NG, the pre-credit processing unit 121 issues a request for acquiring the authentication result from the client apparatus 31 through the challenge flow.

In a case where there is no problem in the authentication result of the challenge flow, the settlement processing unit 122 requests the acquirer server 33 for the credit process (process Req 1) regarding the settlement process based on the card number of the credit card and the information of the price.

On the other hand, in a case where there is a problem in the authentication result in the authentication process through the challenge flow, the settlement process is stopped.

The communication unit 102 is controlled by the control unit 101, and the communication unit 102 uses a wired network (or a wireless network (not illustrated)) to transmit and receive various data and programs to and from the client apparatus 31, the acquirer server 33, and the mediation server 34 through a communication network represented by a LAN (Local Area Network) or the like.

The storage unit 103 is controlled by the control unit 101, and the storage unit 103 includes an HDD (Hard Disk Drive), an SSD (Solid State Drive), a semiconductor memory, or the like. The storage unit 103 writes or reads various data and programs.

The input unit 104 includes a keyboard, an operation button, and the like, and the input unit 104 receives an operation input of the user.

The output unit 105 includes: a display unit that is a display or the like including, for example, an LCD (Liquid Crystal Display) or an organic EL (Electro Luminescence) for displaying images; and a sound output unit including a speaker or the like that outputs sound. The output unit 105 outputs images and sound as necessary.

The drive 106 reads and writes data to and from the removable storage medium 107, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

<<6. Configuration Example of Acquirer Server>>

Figure 7:
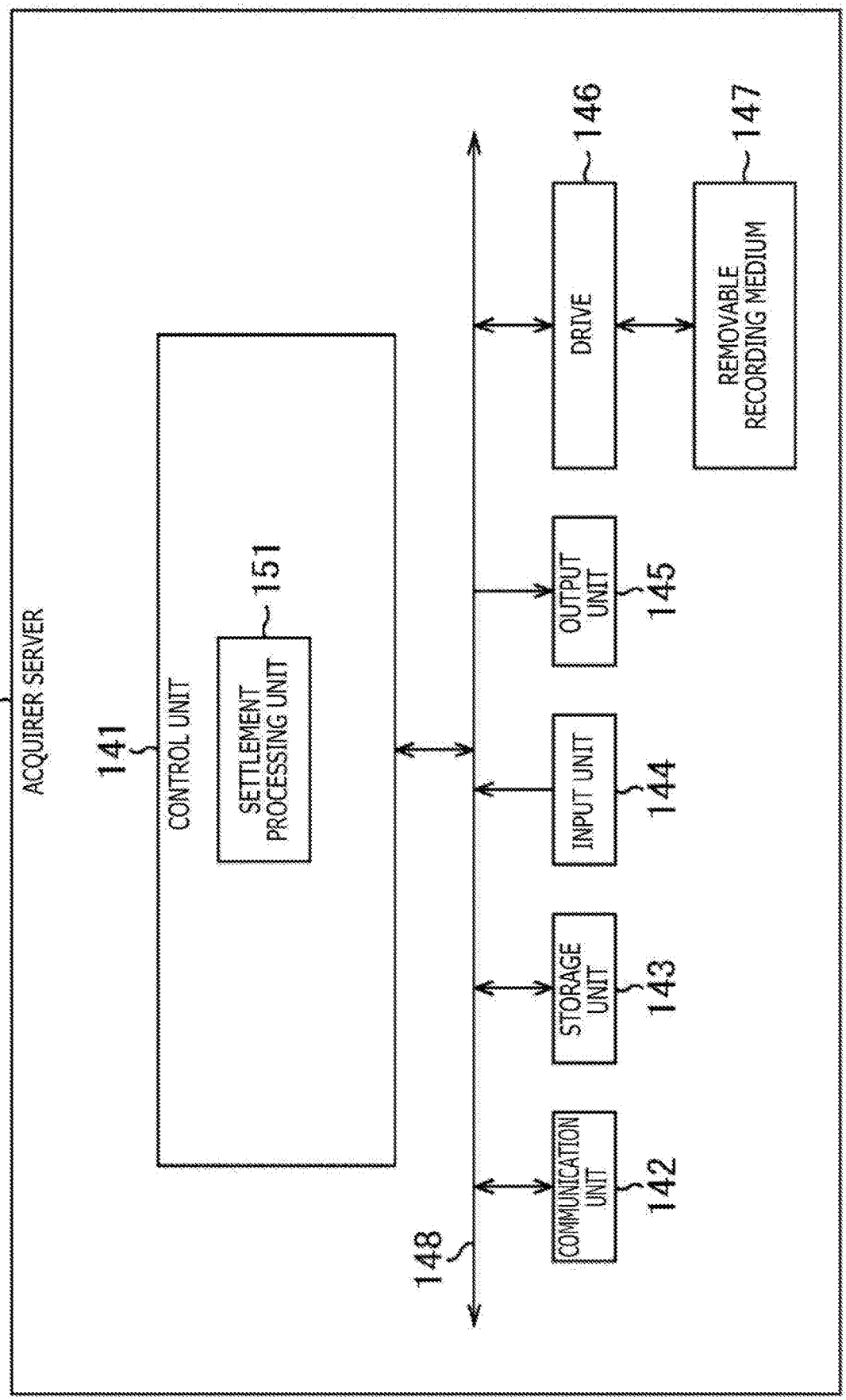
FIG. 7 is a diagram describing a configuration example of an acquirer server.

Next, a configuration example of the acquirer server 33 will be described with reference to FIG. 7.

The acquirer server 33 is a server managed by a member store management agent that is a financial institution for paying the amount to the EC store server 12 according to the settlement result of the credit card, and the acquirer server 33 is, for example, a PC or the like.

More specifically, the acquirer server 33 includes a control unit 141, a communication unit 142, a storage unit 143, an input unit 144, an output unit 145, a drive 146, and a removable storage medium 147 that are electrically connected to each other through the bus 108.

The control unit 141 includes a processor and a memory and controls the entire operation of the acquirer server 33.

In addition, the control unit 141 includes a settlement processing unit 151.

In a case where the frictionless flow is conducted in the pre-credit process or in a case where the authentication process through the challenge flow is accepted, the settlement processing unit 151 requests the mediation server 34 for the credit process regarding the settlement process based on the card number of the credit card and the information of the price.

The communication unit 142 is controlled by the control unit 141, and the communication unit 142 uses a wired network (or a wireless network (not illustrated)) to transmit and receive various data and programs to and from the EC store server 32 and the mediation server 34 through a communication network represented by a LAN (Local Area Network) or the like.

The storage unit 143 is controlled by the control unit 141, and the storage unit 143 includes an HDD (Hard Disk Drive), an SSD (Solid State Drive), a semiconductor memory, or the like. The storage unit 143 writes or reads various data and programs.

The input unit 144 includes a keyboard, an operation button, and the like, and the input unit 144 receives an operation input of the user.

The output unit 145 includes: a display unit that is a display or the like including, for example, an LCD (Liquid Crystal Display) or an organic EL (Electro Luminescence) for displaying images; and a sound output unit including a speaker or the like that outputs sound. The output unit 145 outputs images and sound as necessary.

The drive 146 reads and writes data to and from the removable storage medium 147, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

<<7. Configuration Example of Mediation Server>>

Figure 8:
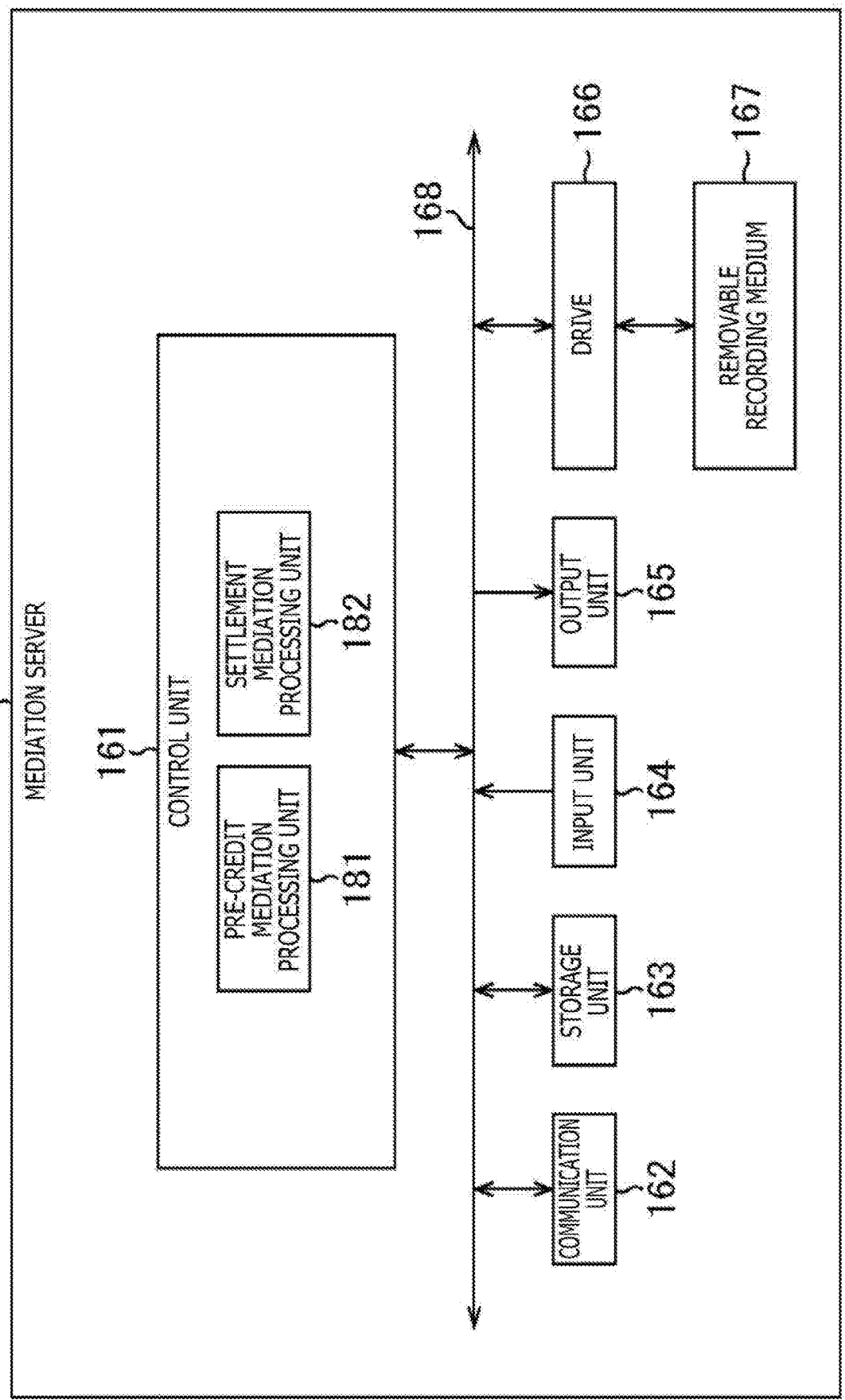
FIG. 8 is a diagram describing a configuration example of a mediation server.

Next, a configuration example of the mediation server 34 will be described with reference to FIG. 8.

The mediation server 34 is a server managed and operated by an agent that manages an international brand (Payment card brand). The mediation server 34 executes a mediation process regarding the credit process between the acquirer server 13 and the bank server 15 in the settlement process and executes a mediation process regarding the pre-credit process between the EC store server 32 and the bank server 15 in the pre-credit process.

More specifically, the mediation server 34 includes a control unit 161, a communication unit 162, a storage unit 163, an input unit 164, an output unit 165, a drive 166, and a removable storage medium 167 that are electrically connected through a bus 168.

The control unit 161 includes a processor and a memory and controls the entire operation of the mediation server 34.

In addition, the control unit 161 includes a pre-credit mediation processing unit 181 and a settlement mediation processing unit 182.

The pre-credit mediation processing unit 181 executes the mediation process regarding the pre-credit process between the EC store server 32 and the bank server 15 in the pre-credit process.

The settlement mediation processing unit 182 executes the mediation process regarding the credit process between the acquirer server 13 and the bank server 15 in the settlement process.

The communication unit 162 is controlled by the control unit 161, and the communication unit 162 uses a wired network (or a wireless network (not illustrated)) to transmit and receive various data and programs to and from the EC store server 32, the acquirer server 33, and the bank server 35 through a communication network represented by a LAN (Local Area Network) or the like.

The storage unit 163 is controlled by the control unit 161, and the storage unit 163 includes an HDD (Hard Disk Drive), an SSD (Solid State Drive), a semiconductor memory, or the like. The storage unit 163 writes or reads various data and programs.

The input unit 164 includes a keyboard, an operation button, and the like, and the input unit 164 receives an operation input of the user.

The output unit 165 includes: a display unit that is a display or the like including, for example, an LCD (Liquid Crystal Display) or an organic EL (Electro Luminescence) for displaying images; and a sound output unit including a speaker or the like that outputs sound. The output unit 145 outputs images and sound as necessary.

The drive 166 reads and writes data to and from the removable storage medium 167, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

<<8. Configuration Example of Bank Server>>

Figure 9:
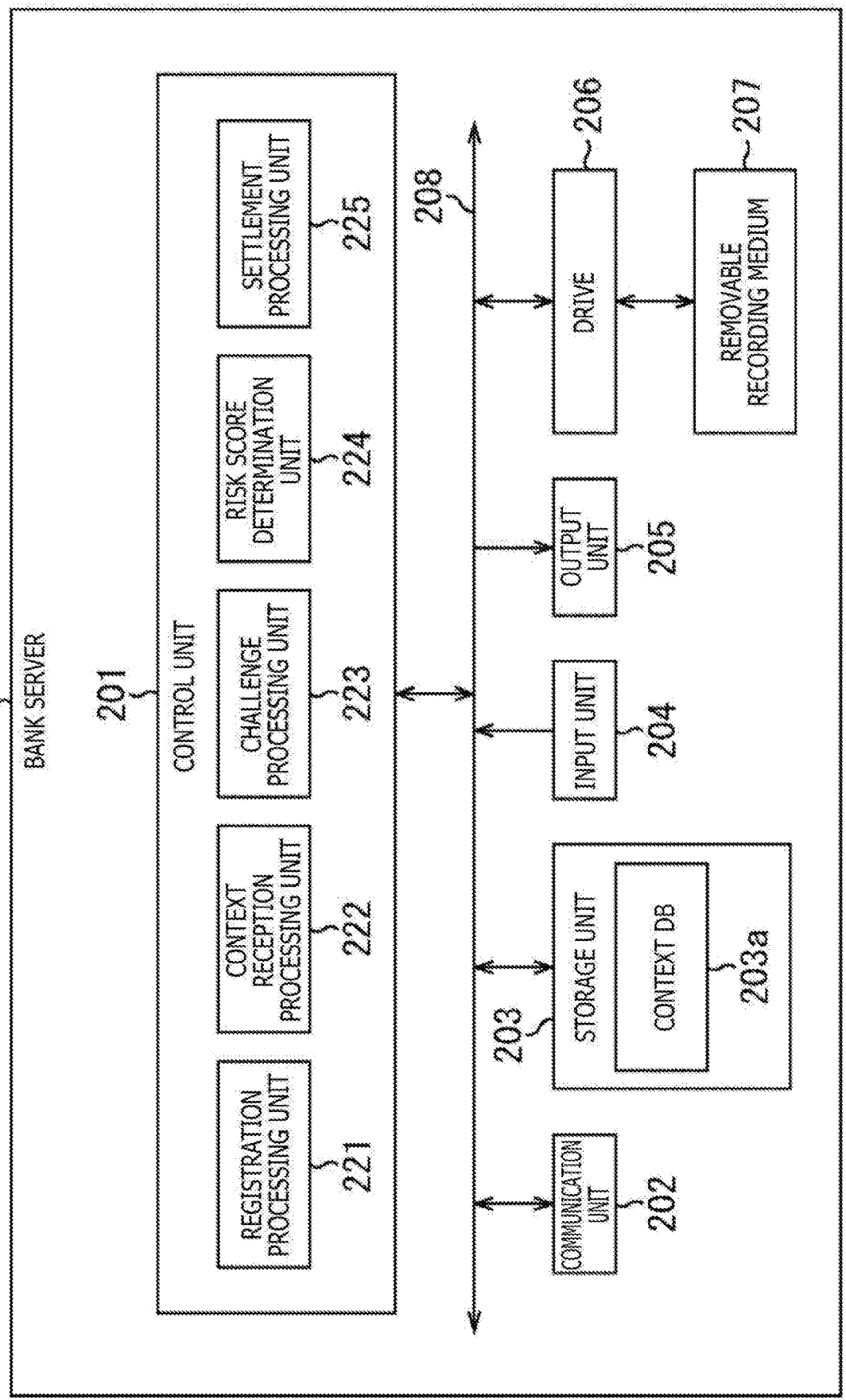
FIG. 9 is a diagram describing a configuration example of a bank server.

Next, a configuration example of the bank server 35 will be described with reference to FIG. 9.

The bank server 35 is an issuer of the credit card and is a server managed and operated by a bank that makes a contract with the credit card user to provide various services. The bank server 35 executes a credit process regarding settlement by credit card.

More specifically, the bank server 35 includes a control unit 201, a communication unit 202, a storage unit 203, an input unit 204, an output unit 205, a drive 206, and a removable storage medium 207 that are electrically connected to each other through a bus 208.

The control unit 201 includes a processor and a memory and controls the entire operation of the bank server 35.

In addition, the control unit 201 includes a registration processing unit 221, a context reception processing unit 222, a challenge processing unit 223, a risk score determination unit 224, and a settlement processing unit 225.

The registration processing unit 221 executes a registration process of registering the client apparatus 31 and the wearable device 36 in association with the card number of the credit card.

The context reception processing unit 222 receives context information including the position information transmitted at a predetermined time interval from the registered wearable device 36 and the biological information and causes the storage unit 203 to store the context information as a context DB 203a.

In a case where the risk score determination unit 224 determines that the risk score is larger than a predetermined threshold so that a transition to the challenge flow is necessary, the challenge processing unit 223 requests the client apparatus 31 for the authentication process. The challenge processing unit 223 acquires the authentication result and determines whether or not there is a problem in the authentication result.

The risk score determination unit 224 calculates the risk score based on the card number of the credit card, the price, the position information of the client apparatus 31, and the position information of the wearable device 36 that is the most recent context information. Furthermore, the risk score determination unit 224 compares the calculated risk score and the predetermined threshold to determine whether to conduct the challenge flow or the frictionless flow.

The settlement processing unit 225 executes the credit process regarding settlement based on the card number of the credit card supplied from the acquirer server 33 through the mediation server 34 in the settlement process.

The communication unit 202 is controlled by the control unit 201, and the communication unit 202 uses a wired network (or a wireless network (not illustrated)) to transmit and receive various data and programs to and from the acquirer server 33 and the mediation server 34 through a communication network represented by a LAN (Local Area Network) or the like.

The storage unit 203 is controlled by the control unit 201, and the storage unit 203 includes an HDD (Hard Disk Drive), an SSD (Solid State Drive), a semiconductor memory, or the like. The storage unit 203 writes or reads various data and programs.

The input unit 204 includes a keyboard, an operation button, and the like, and the input unit 204 receives an operation input of the user.

The output unit 205 includes: a display unit that is a display or the like including, for example, an LCD (Liquid Crystal Display) or an organic EL (Electro Luminescence) for displaying images; and a sound output unit including a speaker or the like that outputs sound. The output unit 205 outputs images and sound as necessary.

The drive 206 reads and writes data to and from the removable storage medium 207, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

<<9. Configuration Example of Wearable Device>>

Figure 10:
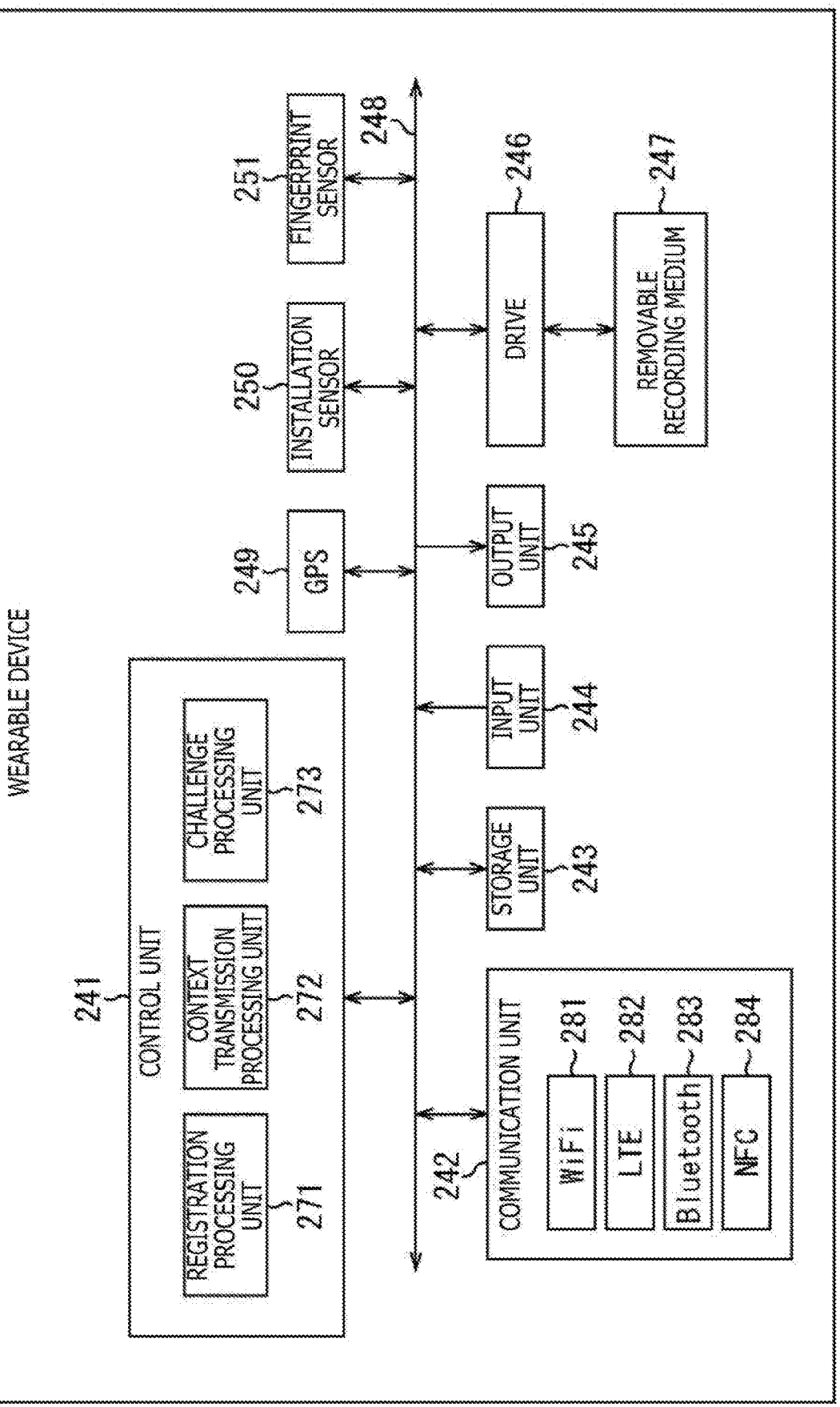
FIG. 10 is a diagram describing a configuration example of a wearable device.

Next, a configuration example of the wearable device 36 will be described with reference to FIG. 10.

The wearable device 36 is worn by the user, and the wearable device 36 uses a fingerprint as biological information to execute the authentication process. The wearable device 36 also acquires the position information at a predetermined time interval and transmits the position information as context information to the bank server 35.

More specifically, the wearable device 36 includes a control unit 241, a communication unit 242, a storage unit 243, an input unit 244, an output unit 245, a drive 246, a removable storage medium 247, a GPS 249, an installation sensor 250, and a fingerprint sensor 251 that are electrically connected to each other through a bus 248.

The control unit 241 includes a processor and a memory and controls the entire operation of the wearable device 36.

In addition, the control unit 241 includes a registration processing unit 271, a context transmission processing unit 272, and a challenge processing unit 273.

The registration processing unit 271 executes a registration process to register and store the wearable device 36 and the client apparatus 11 in the bank server 35 in association with the card number of the credit card.

In a case where the wearable device 36 is worn by the user and there is no problem in the authentication result as a result of the authentication process executed by the fingerprint sensor 251 using the biological information including the fingerprint, the context transmission processing unit 272 controls the GPS 249 at a predetermined time interval to acquire the position information and controls the communication unit 242 to transmit the position information as context information to the bank server 35. In addition, the context transmission processing unit 272 controls the installation sensor 250 to detect timing that the main body of the wearable device 36 is worn by the user or timing that the main body of the wearable device 36 is removed from the user. The context transmission processing unit 272 controls the communication unit 242 at the timing of installation or removal to transmit, to the bank server 35, information for notifying the installation or removal.

In a case where the bank server 35 requests the client apparatus 31 for the authentication process in the pre-credit process, the challenge processing unit 273 controls the fingerprint sensor 251 in response to the request for the authentication process from the client apparatus 31 and executes the authentication process using the fingerprint as biological information. The challenge processing unit 273 transmits the authentication result to the client apparatus 31.

The communication unit 242 is controlled by the control unit 241, and the communication unit 242 uses a wired network (or a wireless network (not illustrated)) to transmit and receive various data and programs to and from the mediation server 34 and the bank server 35 through a communication network represented by a LAN (Local Area Network) or the like.

More specifically, the communication unit 242 includes various communication functions including a WiFi 281, an LTE 282, a Bluetooth 283, and an NFC 284 and communicates with the client apparatus 31 and the bank server 35. Note that just any one of the WiFi communication unit (WiFi) 281, the LTE communication unit (LTE) 282, the Bluetooth communication unit (Bluetooth) 283, and the NFC communication unit (NFC) 284 needs to be provided, or a communication unit of another communication system may also be included.

The WiFi communication unit (WiFi) 281 is controlled by the control unit 241, and the WiFi communication unit (WiFi) 281 transmits and receives data and programs to and from other apparatuses through WiFi communication.

The LTE communication unit (LTE) 282 is controlled by the control unit 241, and the LTE communication unit (LTE) 282 transmits and receives data and programs to and from other apparatuses through LTE (Long Term Evolution) communication. Note that the LTE is one of the mobile phone communication techniques, and another communication system of mobile phone communication may also be used.

The Bluetooth communication unit (Bluetooth) 283 is controlled by the control unit 241, and the Bluetooth communication unit (Bluetooth) 283 transmits and receives data and programs to and from other apparatuses through Bluetooth communication.

The NFC communication unit (NFC) 283 is controlled by the control unit 241, and the NFC communication unit (NFC) 283 transmits and receives data and programs to and from other apparatuses through NFC (Near Field Communication) communication.

The storage unit 243 is controlled by the control unit 241, and the storage unit 243 includes an HDD (Hard Disk Drive), an SSD (Solid State Drive), a semiconductor memory, or the like. The storage unit 243 writes or reads various data and programs. In addition, the information of the fingerprint of the authorized user read in advance by the fingerprint sensor 251 may be stored in the storage unit 243.

The input unit 244 includes a keyboard, an operation button, and the like, and the input unit 244 receives an operation input of the user.

The output unit 245 includes: a display unit that is a display or the like including, for example, an LCD (Liquid Crystal Display) or an organic EL (Electro Luminescence) for displaying images; and a sound output unit including a speaker or the like that outputs sound. The output unit 245 outputs images and sound as necessary.

The drive 246 reads and writes data to and from the removable storage medium 247, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

The GPS (Global Positioning System) 249 receives signals from a plurality of satellites not illustrated. The GPS 249 calculates the position information of the wearable device 36 and outputs the calculated position information to the control unit 241.

The installation sensor 250 detects whether or not the wearable device 36 is worn by the user and outputs the detection result to the control unit 241.

The fingerprint sensor 251 detects the fingerprint of the user of the wearable device 36 and compares the information of the detected fingerprint and the information of the fingerprint of the authorized user that is stored in the storage unit 243 and registered in advance. The fingerprint sensor 251 executes the authentication process based on the fingerprint and outputs the authentication result.

<<10. Settlement Process in Settlement Processing System of FIG. 3>>

Next, a settlement process in the settlement processing system of FIG. 3 will be described with reference to a flow chart of FIG. 11. Note that the following process is based on the assumption that the user operates the client apparatus 31 to determine a desirable product to be purchased and then performs an operation of the settlement process regarding the purchase.

In step S11, the settlement processing unit 71 in the control unit 51 of the client apparatus controls the GPS 59 to acquire the current position information.

In step S12, the settlement processing unit 71 reads the information of the card number of the credit card possessed by the user stored in the storage unit 53 and controls the communication unit 52 to transmit the information to the EC store server 32 along with the position information of the client apparatus 31 to request the EC store server 32 for the settlement. Note that the process in steps S11 and S12 is a process corresponding to the process Start in FIG. 3 (process Pre 11 of FIG. 4).

In step S31, the pre-credit processing unit 121 of the control unit 101 in the EC store server 32 controls the communication unit 102 to receive the transmitted card number and the position information of the client apparatus 31.

In step S32, the pre-credit processing unit 121 applies the pre-credit process of the card number, the price regarding the purchase, and the position information of the client apparatus 31 to the bank server 35 through the mediation server 34. In a case where there is no problem in the pre-credit result of the credit card of the user, the process proceeds to step S33.

Note that in a case where there is a problem in the pre-credit result, it is determined that the settlement process is impossible, and the process ends. In addition, the pre-credit process is realized by a process including step S13 in the client apparatus 11, step S71 in the mediation server 34, and step S91 in the bank server 35 in addition to the process of step S32. Furthermore, the pre-credit process will be described in detail later with reference to a flow chart of FIG. 16.

In step S33, the settlement processing unit 122 controls the communication unit 102 to transmit the card number and the information of the price regarding the purchase to the acquirer server 33 to request the acquirer server 33 for the credit process. Note that the process of step S33 corresponds to the process Req 1 of FIG. 3.

In step S51, the settlement processing unit 151 in the control unit 141 of the acquirer server 33 controls the communication unit 142 to receive the card number and the information of the price from the EC store server 32.

In step S52, the settlement processing unit 151 controls the communication unit 142 to transmit the card number and the information of the price to the mediation server 34 to request the mediation server 34 for the credit process. Note that the process of step S52 corresponds to the process Req 12 of FIG. 3.

In step S72, the settlement mediation processing unit 182 in the control unit 161 of the mediation server 34 controls the communication unit 162 to receive the card number and the information of the price.

In step S73, the settlement mediation processing unit 182 controls the communication unit 162 to transmit the card number and the information of the price to the bank server 35 to request the bank server 35 for the credit process. Note that the process of step S73 corresponds to the process Req 13 of FIG. 3.

In step S92, the settlement processing unit 225 in the control unit 201 of the bank server 35 controls the communication unit 202 to receive the card number and the information of the price.

In step S93, the settlement processing unit 225 executes the credit determination of the credit card registered in association with the card number based on the card number and the information of the price.

In step S94, the settlement processing unit 225 controls the communication unit 202 to transmit the credit determination result to the mediation server 34. Note that the process of step S94 corresponds to the process of the process Resp 11 in FIG. 3.

In step S74, the settlement mediation processing unit 182 of the mediation server 34 controls the communication unit 162 to receive the credit determination result from the bank server 35.

In step S75, the settlement mediation processing unit 182 controls the communication unit 162 to transmit the credit determination result to the acquirer server 33. Note that the process of step S75 corresponds to the process of the process Resp 12 in FIG. 3.

In step S53, the settlement processing unit 151 of the acquirer server 33 controls the communication unit 142 to receive the credit determination result from the mediation server 34.

In step S54, the settlement processing unit 151 controls the communication unit 142 to transmit the credit determination result to the EC store server 32. Note that the process of step S54 corresponds to the process of the process Resp 13 in FIG. 3.

In step S34, the settlement processing unit 122 of the EC store server 32 controls the communication unit 102 to receive the credit determination result from the acquirer server 33.

In step S35, in a case where there is no problem in the credit determination result based on the credit determination result, the settlement processing unit 122 settles the payment of the charge subjected to the purchase process of the client apparatus 31. Note that in a case where there is a problem in the settlement determination result, the settlement process is not executed here.

In step S36, the settlement processing unit 122 controls the communication unit 102 to transmit the settlement result to the client apparatus 31. Note that the process of step S36 corresponds to the process End in FIG. 3.

In step S14, the settlement processing unit 71 of the client apparatus 31 controls the communication unit 52 to receive the settlement result transmitted from the EC store server 32.

In step S15, the settlement processing unit 71 displays the settlement result on the display of the output unit 55.

The process realizes the settlement process.

Figure 11:
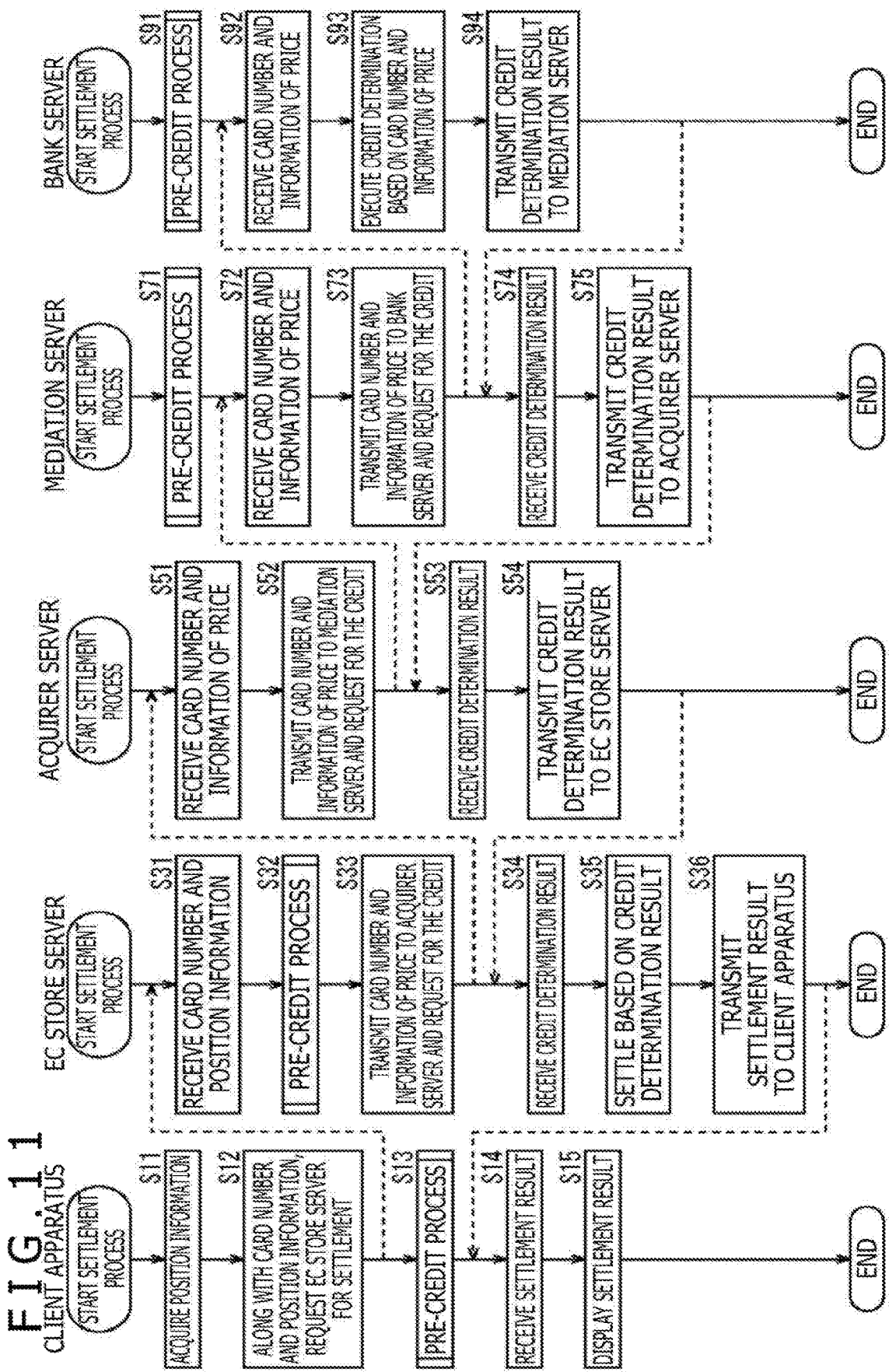
FIG. 11 is a flow chart describing a settlement process of the settlement processing system of FIG. 3.

That is, the settlement process of FIG. 11 is basically similar to the process described with reference to FIGS. 1 and 2 except that the position information is used in addition to the card number and the price in the pre-credit process.

<<11. Registration Process>>

Figure 12:
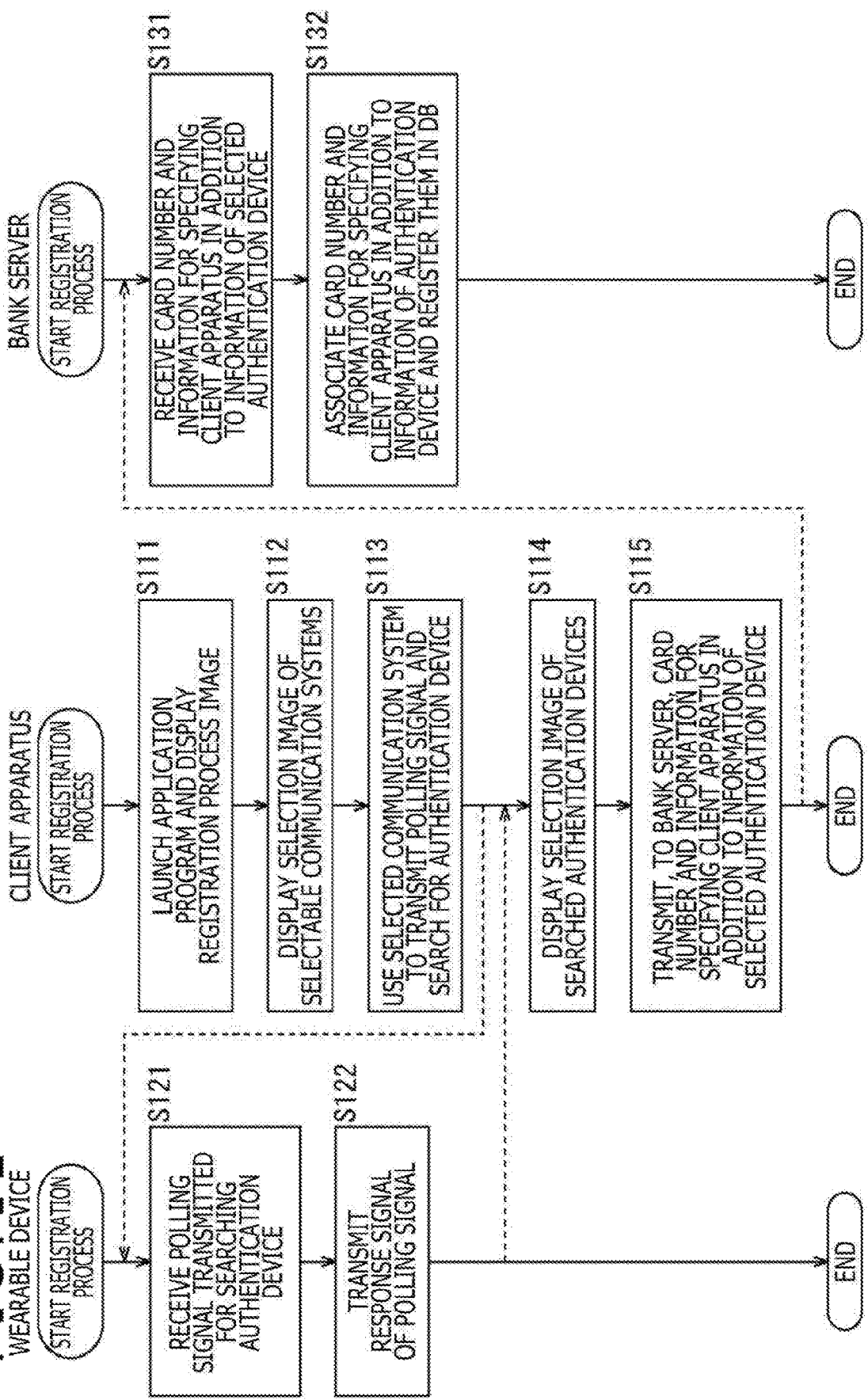
FIG. 12 is a flow chart describing a registration process of the pre-credit processing system of FIG. 4.

Next, preprocessing of the pre-credit process that is a registration process of registering, in the bank server 35, the wearable device 36, which is used in the authentication process using the biological information executed by the user operating the client apparatus 31 to purchase the product, will be described with reference to a flow chart of FIG. 12. Note that the registration process described with reference to FIG. 12 corresponds to the process of a process Pre 21 in FIG. 4.

In step S111, the registration processing unit 73 in the control unit 51 of the client apparatus 31 launches an application program to generate a registration process image and causes the display of the output unit 55 to display the registration process image.

In step S112, the registration processing unit 73 generates a selection image of selectable communication systems and displays the selection image on the display of the output unit 55.

Figure 13:
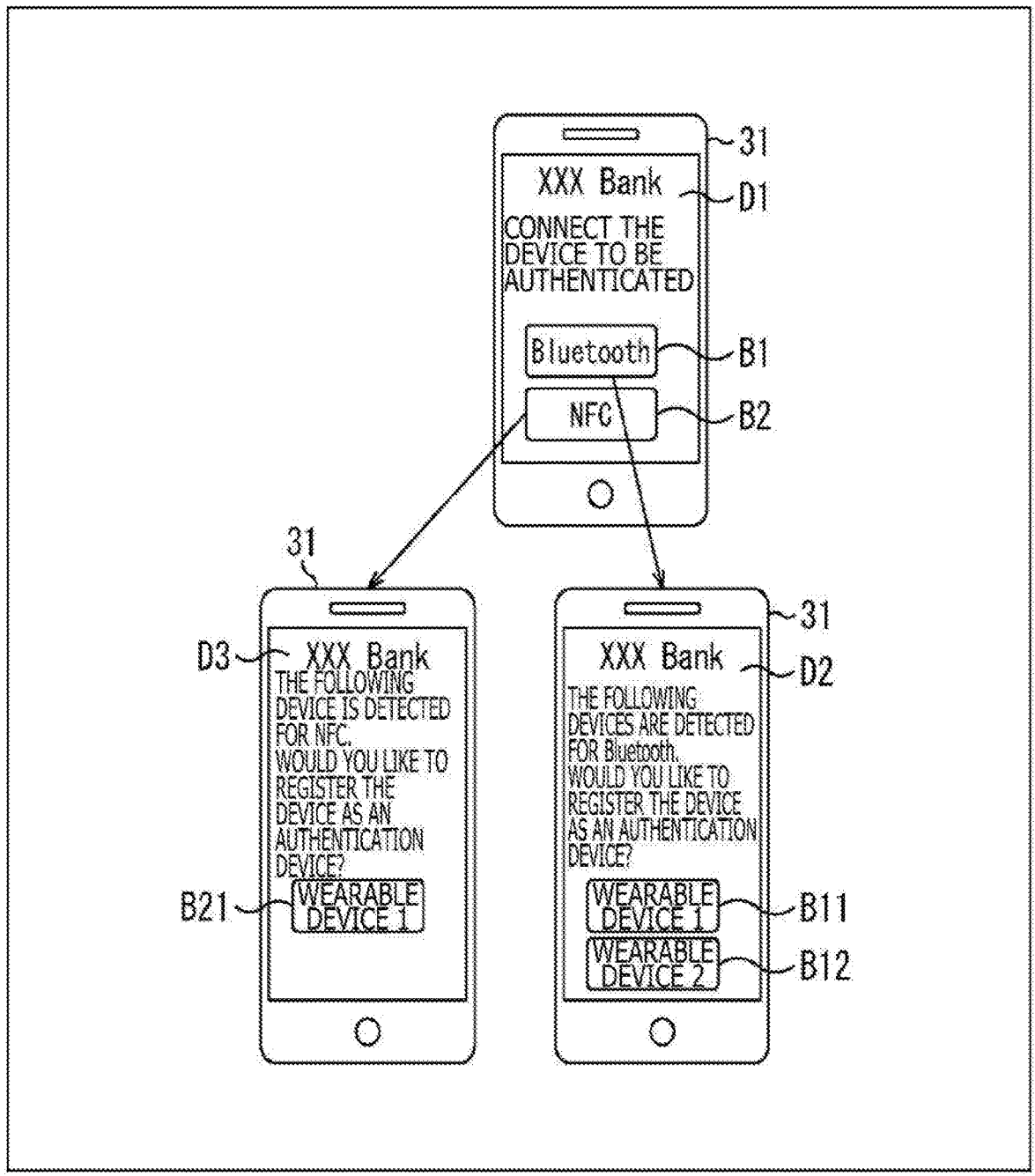
FIG. 13 is a diagram describing a display example of a display image in the registration process.

Here, the displayed selection image is, for example, a display image D1 as illustrated on the upper right in FIG. 13. In the display image D1, "XXX Bank Connect the device to be authenticated." is displayed from the top. The display image D1 is displayed by the application program of XXX Bank that manages and operates the bank server 35, and an image for selecting the communication system for communicating with the wearable device 36 necessary in the authentication process is displayed. In addition, below the display image D1, a button B1 displayed as "Bluetooth" and a button B2 displayed as "NFC" from the top are displayed as selectable communication systems.

In the client apparatus 31, although the WiFi communication unit 91, the LTE communication unit 92, the Bluetooth communication unit 93, and the NFC communication unit 94 can be selected as a communication system of the communication unit 52, the Bluetooth communication unit 93 and the NFC communication unit 94 among these are displayed as selectable communication systems in FIG. 13. Therefore, the WiFi communication unit 91 and the LTE communication unit 92 may be further displayed as selectable communication systems.

In a case where the buttons B1 and B2 for selecting the selectable communication system are provided in the display image D1, and the displayed "Bluetooth" is to be selected, the button B1 is operated. In a case where "NFC" is to be selected, the button B2 is selected.

In step S113, the registration processing unit 73 controls the communication unit 52 to transmit a polling signal for searching a selectable wearable device based on the selected communication system. That is, when the button B1 is operated in the case of FIG. 13, the registration processing unit 73 controls the Bluetooth communication unit 93 to transmit the polling signal. Furthermore, when the button B2 is operated in the case of FIG. 13, the registration processing unit 73 controls the NFC communication unit 94 to transmit the polling signal.

In step S121, the registration processing unit 271 of the wearable device 36 controls the communication unit 242 to receive the transmitted polling signal. More specifically, the registration processing unit 271 controls each of the WiFi communication unit 281, the LTE communication unit 282, the Bluetooth communication unit 283, and the NFC communication unit 284 of the communication unit 242 to cause the unit to detect whether or not there is a polling signal. In a case where a polling signal is detected, the registration processing unit 271 controls the unit to receive the transmitted polling signal. Here, the button B1 or B2 is operated in the process of step S113, and the polling signal of any one of "Bluetooth" and "NFC" is received.

In step S122, the registration processing unit 271 uses the communication system that has received the polling signal in the communication unit 242 to transmit a response signal of the poling signal along with information for identifying the wearable device 36.

In step S114, the registration processing unit 73 of the client apparatus 31 receives the transmitted response signal of the polling signal and the information for identifying the wearable device 36 that is the sender. The registration processing unit 73 generates a selection image of the searched authentication devices based on the received information of the wearable device 36 and causes the output unit 55 to display the selection image.

Figure 14:
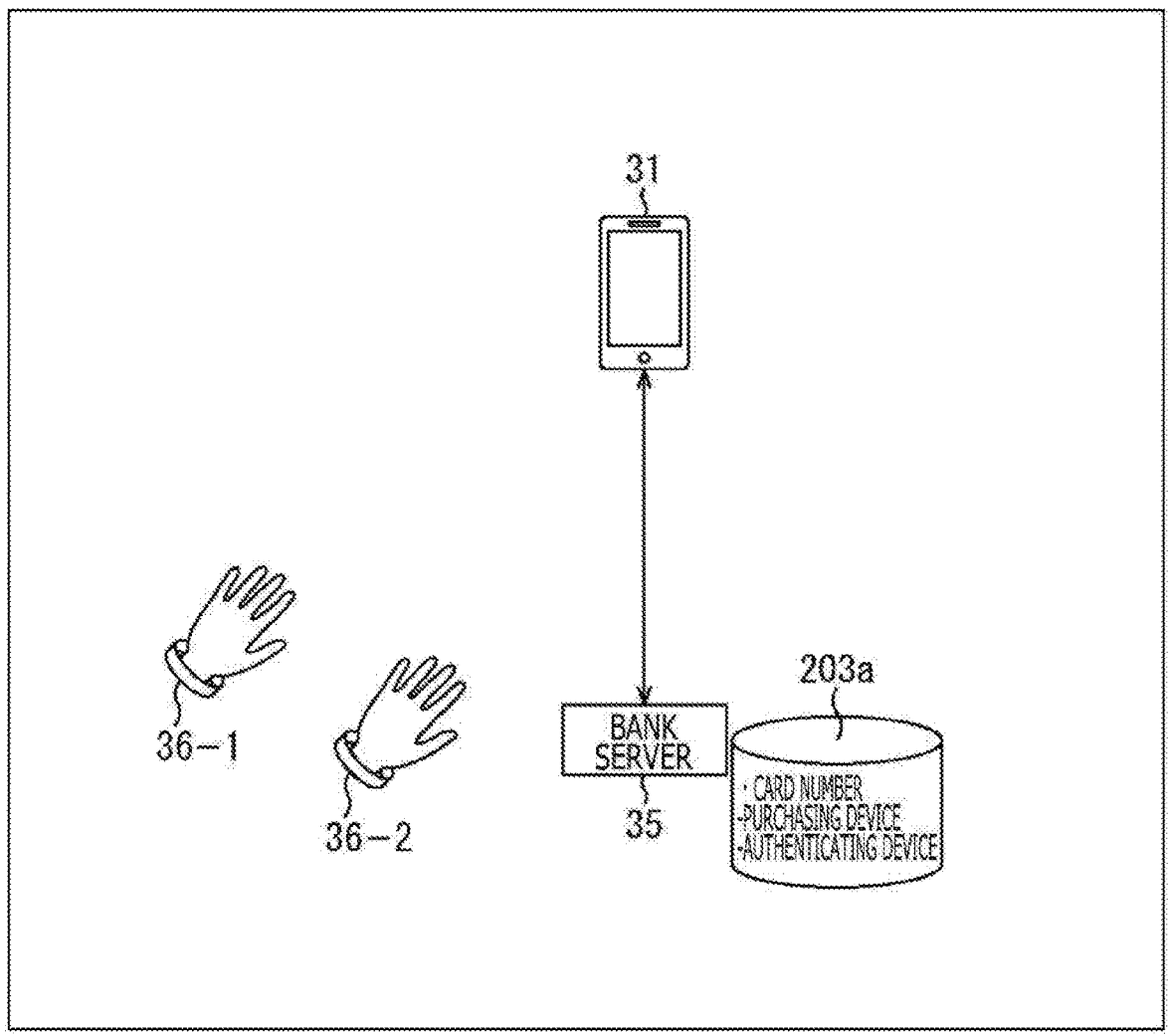
FIG. 14 is a diagram describing a registration process.

That is, for example, when there are wearable devices 36-1 and 36-2 capable of Bluetooth communication near the client apparatus 31 as illustrated in FIG. 14 in a case where the button B1 is pressed to transmit a polling signal of Bluetooth in the process of step S113, the response signal of the polling signal from each of the wearable devices 36-1 and 36-2 is transmitted to the client apparatus 31, and the information for identifying each of the wearable devices 36 is transmitted to the client apparatus 31.

As a result, the client apparatus 31 displays a display image D2 for prompting to select a selectable wearable device 36 as illustrated on the lower right in FIG. 13.

In the display image D2, "XXX Bank The following devices are detected for Bluetooth. Would you like to register the device as an authentication device?" is displayed from the top, and a button B11 written as "Wearable Device 1" and a button B12 written as "Wearable Device 2" are displayed below.

That is, the wearable devices 1 and 2 corresponding to the wearable devices 36-1 and 36-2 that are near the client apparatus 31 and that can be selected as authentication devices in the communication system of Bluetooth are displayed by the buttons B11 and B12, respectively, and the buttons B11 and B12 are pressed to select the wearable devices 1 and 2, respectively.

On the other hand, in a case where, for example, the button B2 is pressed to select the NFC as a communication system in the display image D1 illustrated on the upper right in FIG. 13, a display image D3 as illustrated on the lower left in FIG. 13 is displayed, for example.

In the display image D3, "XXX Bank The following device is detected for NFC. Would you like to register the device as an authentication device?" is displayed from the top, and a button B21 written as "Wearable Device" is displayed below.

That is, a wearable device 1 corresponding to the wearable device 36 that is near the client apparatus 31 and that can be selected as an authentication device in the communication system of NFC is displayed by the button B21, and the button B21 is pressed to select the wearable device 36 corresponding to the wearable device 1.

In step S115, the registration processing unit 73 controls the communication unit 52 to cause the communication unit 52 to transmit, to the bank server 35, the card number and the information for specifying the client apparatus 31 along with the information of the wearable device 36 that is the authentication device selected as an authentication device by pressing any one of the buttons B11 and B12 or the button B21 based on the display image D2 or D3.

In step S131, the registration processing unit 221 of the bank server 35 controls the communication unit 202 to receive the card number and the information for identifying the client apparatus 31 in addition to the information of the wearable device 36 selected as an authentication device that is transmitted from the client apparatus 31.

In step S132, the registration processing unit 221 associates the card number and the information for identifying the client apparatus 31 in addition to the information of the wearable device 36 selected as an authentication device transmitted from the client apparatus 31 and causes the storage unit 203 to store them in the context DB 203a.

As a result of the process, the client apparatus 31 used by the user to purchase the product and the wearable device 36 as an authentication device are registered in the context DB 203a in association with the information of the card number of the credit card as illustrated in FIG. 14.

In this way, context information supplied from the wearable device 36 in a context information upload process described later is stored in the context DB 203a in association with the card number of the credit card registered in association with the wearable device 36 that transmits the context information.

<<12. Context Information Upload Process>>

Next, the context information upload process will be described with reference to a flow chart of FIG. 15. Note that the context information upload process described with reference to FIG. 15 corresponds to the process of a process of Pre 22 in FIG. 4.

In step S151, the context transmission processing unit 272 in the control unit 241 of the wearable device 36 controls the installation sensor 250 to determine whether or not installation is detected.

In step S151, once the installation sensor 250 detects installation after the user wears the wearable device 36, the process proceeds to step S152.

In step S152, the context transmission processing unit 272 displays a display image on the display of the output unit 245 or outputs sound from the speaker to request for the authentication process of the biological information. Although the fingerprint authenticated by the fingerprint sensor 251 is used as the biological information in the example described here, biological information may be biological information other than the fingerprint, and face authentication, iris authentication, vein authentication, or the like may be used.

In step S153, the context transmission processing unit 272 controls the fingerprint sensor 251 to present the fingerprint of the user as biological information and compare the fingerprint with the fingerprint of the authorized user registered in advance to determine whether or not the authentication is accepted. In a case where the authentication using the fingerprint as biological information is accepted in step S153, the process proceeds to step S154.

In step S154, the context transmission processing unit 272 determines whether or not a predetermined time period T has passed, and the context transmission processing unit 272 repeats the similar process until a lapse of the predetermined time period T. Furthermore, in a case where the context transmission processing unit 272 assumes that the predetermined time period T has passed in step S154, the process proceeds to step S155.

In step S155, the context transmission processing unit 272 controls the GPS 249 to acquire the current position information of the wearable device 36.

In step S156, the context transmission processing unit 272 controls the communication unit 242 to cause the bank server 35 to upload the acquired current position information as context information. In this case, the context transmission processing unit 272 also causes the bank server 35 to upload the information indicating that the authentication result of the authentication process using the biological information is accepted and the information for identifying the wearable device 36 along with the position information as the context information. Note that the process of step S156 corresponds to the process Pre 22 in FIG. 4.

In step S157, the context transmission processing unit 272 determines whether or not the end of the context information upload process is instructed. In a case where the end is instructed, the process ends. Furthermore, in a case where the end of the process is not instructed in step S157, the process proceeds to step S158.

In step S158, the context transmission processing unit 272 controls the installation sensor 250 to determine whether or not the wearable device 36 is removed. In a case where the removal of the wearable device 36 is not detected in step S158, the process returns to step S154.

Furthermore, in a case where, for example, the user removes the wearable device 36, the installation sensor 250 detects the removal of the wearable device 36 in step S158, and the process proceeds to step S159.

In step S159, the context transmission processing unit 272 controls the communication unit 242 to notify the bank server 35 of the removal of the wearable device 36, and the process returns to step S151.

On the other hand, in a case where the installation of the wearable device 36 is not detected in step S151 or in a case where the authentication is not accepted in the authentication process using the fingerprint as biological information in step S153, the process proceeds to step S160, and whether or not the end of the process is instructed is determined. Furthermore, in a case where the end of the process is not instructed in step S160, the process returns to step S151, and the similar process is repeated. In a case where the end of the process is instructed in step S160, the process ends.

That is, when the authentication process using the biological information is accepted after the detection of the installation of the wearable device 36 in the context information upload process executed by the wearable device 36, the process of detecting the position information at the interval of the predetermined time period T and transmitting the position information to the bank server 35 along with the authentication result of the biological information is repeated until the removal is confirmed. Furthermore, once the removal of the wearable device 36 is detected, the bank server 35 is notified of the removal, and the bank server 35 is not notified of the position information until the installation of the wearable device 36 and the authentication of the biological information.

Figure 15:
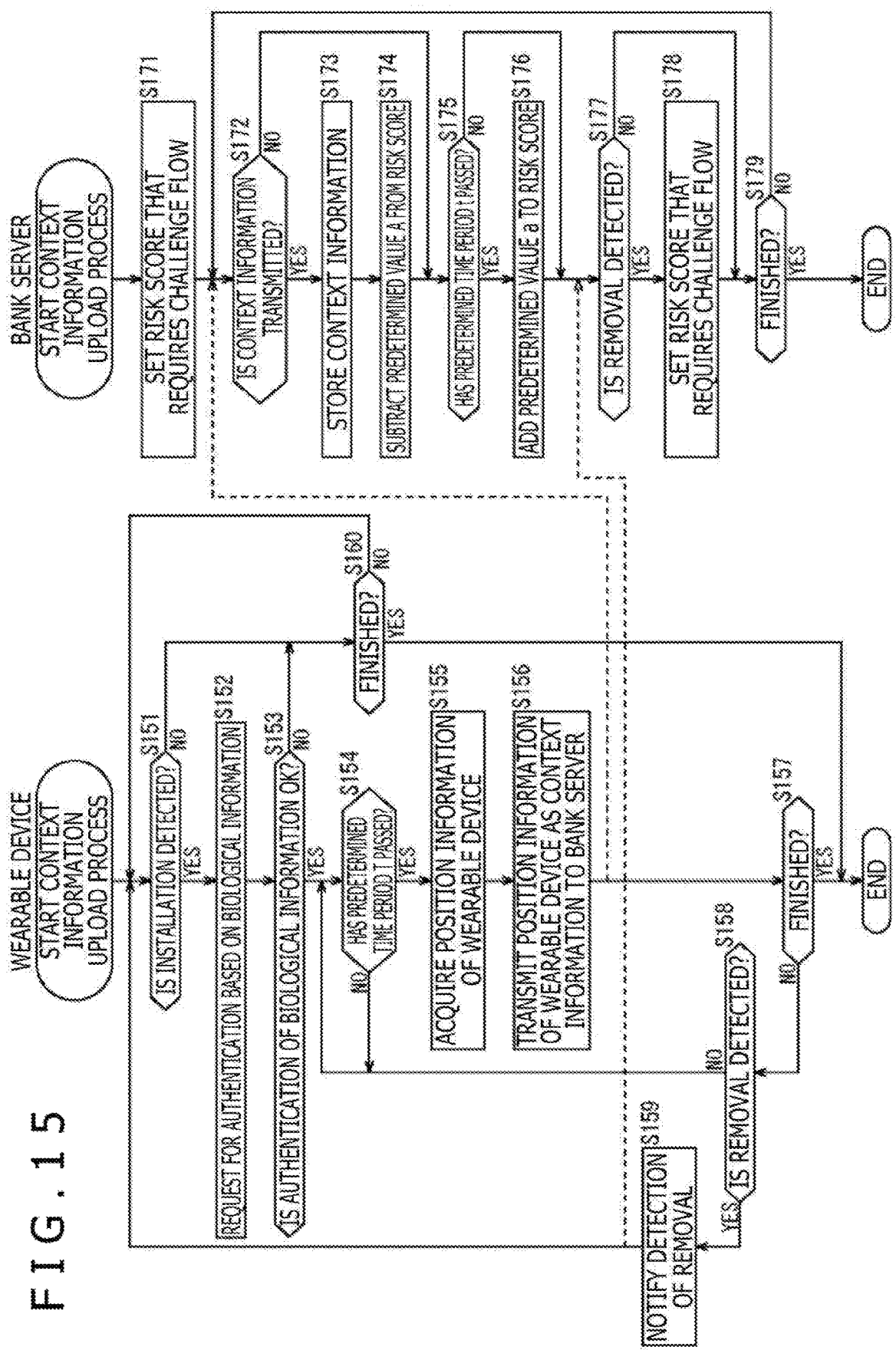
FIG. 15 is a flow chart describing a context information upload process of the pre-credit processing system of FIG. 4.

On the other hand, the context information upload process executed by the bank server 35 is a process illustrated in a flow chart on the right side in FIG. 15.

That is, in step S171, the context reception processing unit 222 in the control unit 201 of the bank server 35 sets the risk score to a value that requires the challenge flow and causes the storage unit 203 to store the risk score.

Furthermore, in step S172, the context reception processing unit 222 controls the communication unit 202 to determine whether or not the position information as context information is transmitted from the wearable device 36.

In a case where the context information is transmitted in step S172, the process proceeds to step S173.

In step S173, the context reception processing unit 222 stores, in the context DB 203a, the position information that is the transmitted context information, in association with the card number associated with the transmitted information for identifying the wearable device 36.

In step S174, the context reception processing unit 222 reduces the risk score by subtracting a predetermined value A from the risk score of the credit card specified by the card number of the credit card used by the user of the client apparatus 31 registered in association with the wearable device 36 that has transmitted the context information.

That is, the risk score of the credit card used by the user that is the user of the wearable device 36 that has transmitted the context information is reduced. This can reduce the frequency of transition to the challenge flow that requires the user to execute the authentication process due to a high risk score in a pre-credit process described later, and the frequency of transition to the frictionless flow can be increased.

Note that in a case where the context information is not transmitted in step S172, the process of steps S173 and S174 is skipped.

In step S175, the context reception processing unit 222 determines whether or not a predetermined time period t has passed based on a counter (not illustrated) that counts the time period. In a case where the predetermined time period t has passed, the process proceeds to step S176.

In step S176, the context reception processing unit 222 adds a predetermined value a to the risk score and resets the counter that counts the elapsed time.

Note that in a case where the predetermined time period t has not passed in step S175, the process of step S176 is skipped.

That is, the risk score is gradually increased by the predetermined value a at the interval of the predetermined time period t. That is, the risk score is reduced by the predetermined value A at the timing of the reception of the context information and is gradually increased with a lapse of the time period. Therefore, the risk score is reduced at the timing of the reception of the context information, and the frequency of transition to the challenge flow is reduced. The risk score is then increased with a lapse of the time period, and the frequency of transition to the challenge flow is gradually increased.

In step S177, the context reception processing unit 222 controls the communication unit 202 to determine whether or not the notification indicating the detection of the removal is transmitted from the wearable device 36. In a case where the notification indicating the detection of the removal is transmitted in step S177, the process proceeds to step S178.

In step S178, the context reception processing unit 222 sets the risk score to a value that requires the challenge flow.

Note that in a case where the notification indicating the detection of the removal is not transmitted in step S177, the process of step S178 is skipped.

In step S179, the context reception processing unit 222 determines whether or not the end of the process is instructed. In a case where the end of the process is not instructed, the process returns to step S172, and the subsequent process is repeated.

Furthermore, in a case where the end of the process is instructed in step S179, the process ends.

That is, in the case where the notification indicating the detection of the removal is transmitted, the position information of the user wearing the wearable device 36 cannot be acquired, and whether or not there is impersonation cannot be judged by comparing the position information with the position information of the client apparatus 31. Therefore, the risk score is set to a high value so that the challenge flow is always selected in the determination process based on the risk score.

Figure 16:
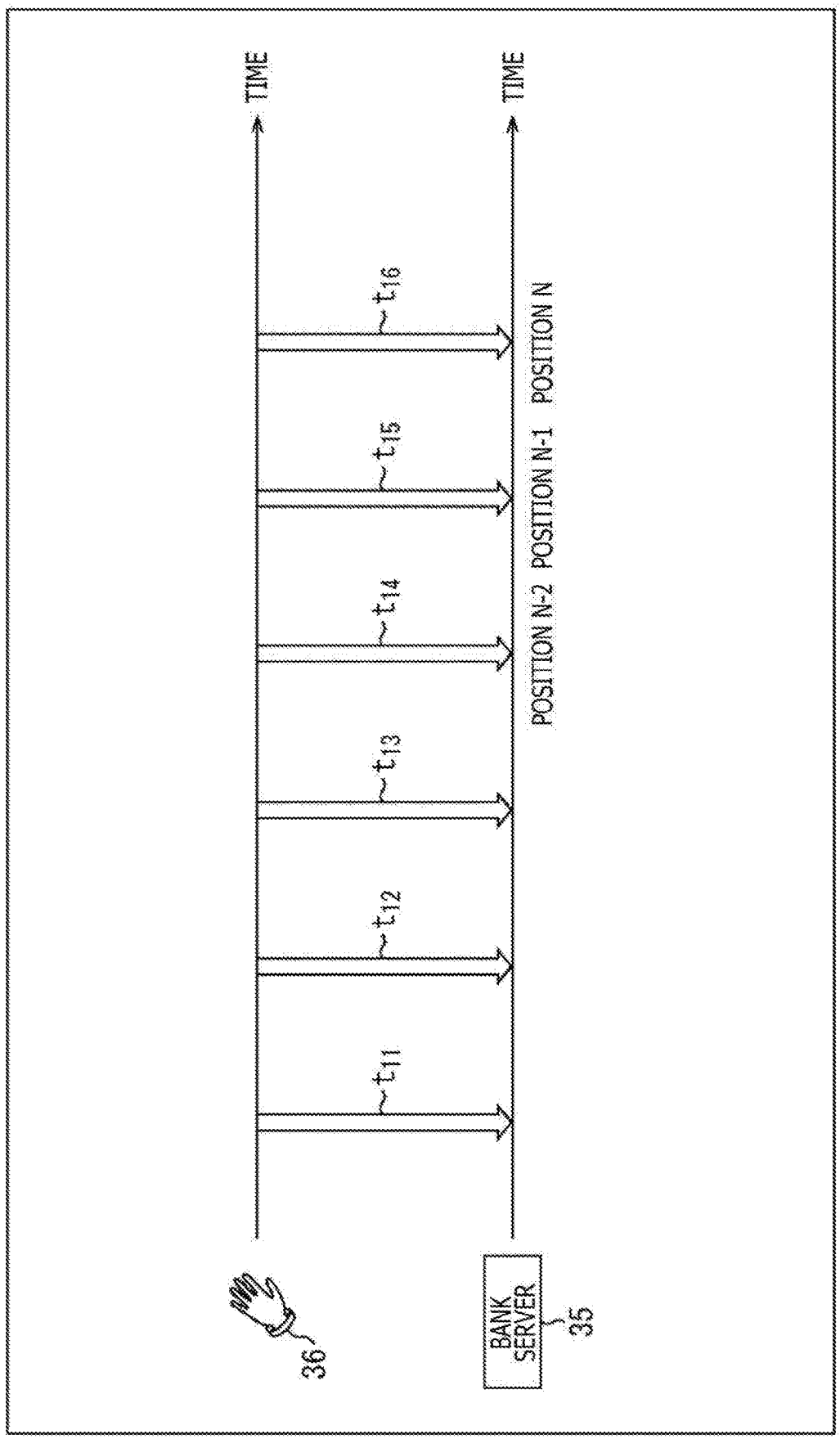
FIG. 16 is a diagram describing a context information upload process.

As a result of the process, as illustrated, for example, in FIG. 16, the context information including the position information of the wearable device 36 is transmitted at the predetermined time interval from the wearable device 36 to the bank server 35 at the predetermined time interval as long as the user is wearing the wearable device 36 in the state in which the authentication based on the biological information is accepted.

In FIG. 16, the upper part indicates the timing of the transmission of the context information transmitted by the wearable device 36, and the lower part indicates the timing of the reception of the context information received by the bank server 35.

That is, in FIG. 16, the context information is transmitted from the wearable device 36 to the bank server 35 at time t11, t12, 13 . . . t16, and the process of reducing the risk score by the predetermined value A is repeated at each timing. In addition, the risk score is increased by the predetermined value a with time, at the time interval of the predetermined time period t.

Here, the time t11, t12, 13 . . . t16 is set at equal time intervals. In addition, the position information of a position N is transmitted as context information at time t16 that is the most recent timing. Furthermore, at time t15 that is timing before the time t16, the position information of a position N−1 is transmitted as context information. In addition, at time t14 that is timing before the time t15, position information of a position N−2 is transmitted as context information.

As a result of the process, while the risk score is reduced every time the context information is transmitted, the risk score is increased with time. Therefore, the newer the position information of the user wearing the wearable device 36 is, the higher the reliability against the impersonation can be. This can reduce the frequency of selection of the challenge flow in a pre-credit process described later. Furthermore, when the state without the transmission of the context information continues for a long time or in a state in which the wearable device 36 is not worn, the risk score can be increased, and the challenge flow can be easily selected. This can prevent the risk of impersonation.

<<13. Pre-Credit Process of Settlement Processing System of FIG. 3>>

Figure 17:
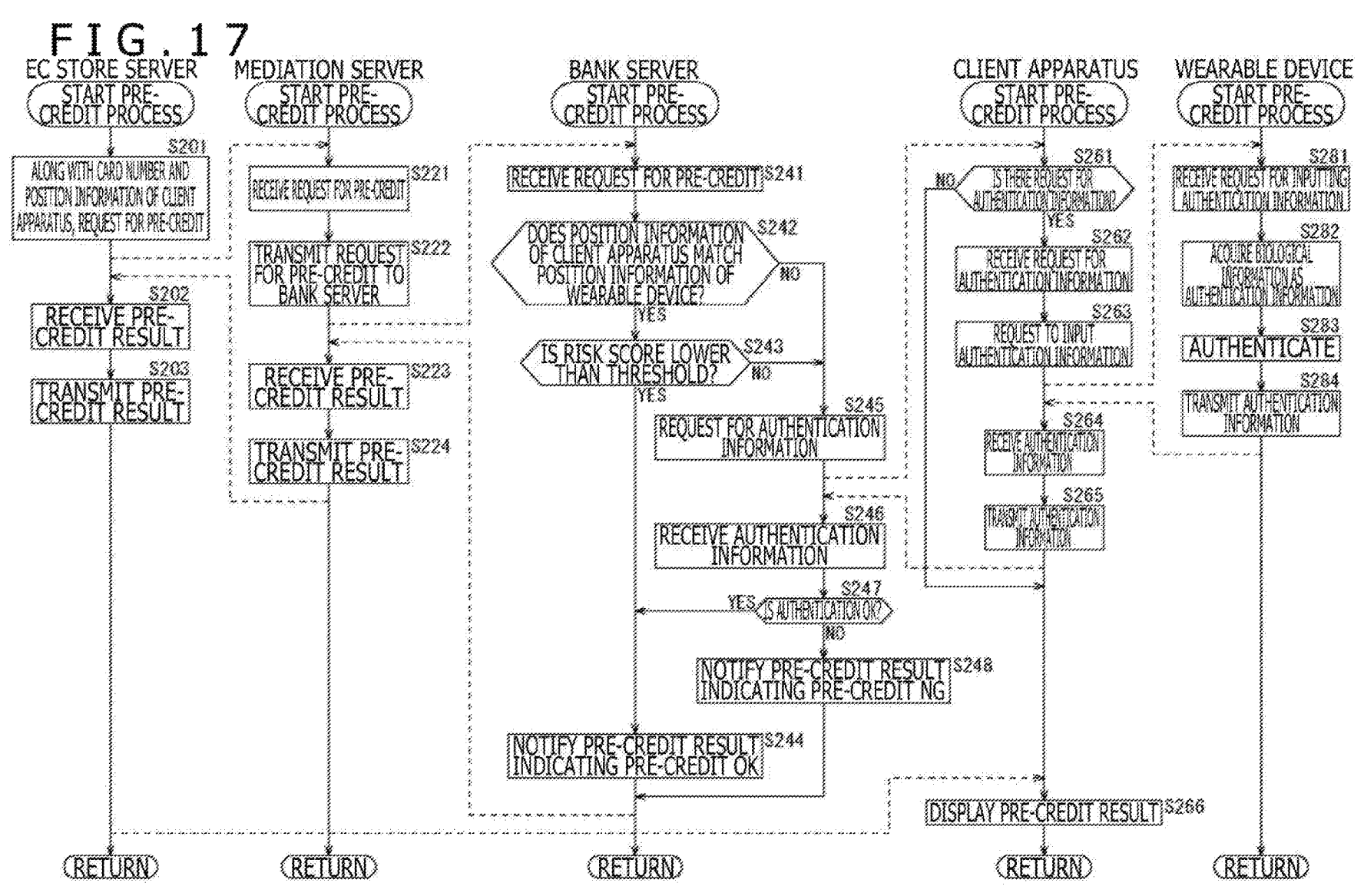

Next, the pre-credit process of the settlement processing system of FIG. 3 will be described with reference to a flow chart of FIG. 17.

In step S201, the pre-credit processing unit 121 in the control unit 101 of the EC store server 32 controls the communication unit 102 to transmit the card number and the position information of the client apparatus 31 to the mediation server 14 to request the bank server 15 for the pre-credit. Note that the process of step S201 corresponds to the process Pre 12 in FIG. 4.

In step S221, the pre-credit mediation processing unit 181 of the control unit 161 of the mediation server 14 controls the communication unit 162 to receive the request for the pre-credit along with the card number and the position information of the client apparatus 31.

In step S222, the pre-credit mediation processing unit 181 controls the communication unit 162 to transmit the request for the pre-credit to the bank server 35 along with the card number, the price regarding the settlement process, and the position information of the client apparatus 31. Note that the process of step S222 corresponds to the process Pre 12 in FIG. 4.

In step S241, the risk score determination unit 224 in the control unit 201 of the bank server 35 controls the communication unit 202 to receive the card number, the price, and the position information of the client apparatus 31 transmitted by the EC store server 32 through the mediation server 34.

In step S242, the risk score determination unit 224 accesses the context DB 203a to determine whether or not the position information of the wearable device 36, which is registered as the latest context information and registered in association with the card number of the credit card, matches the position information of the client apparatus 31.

Figure 18:
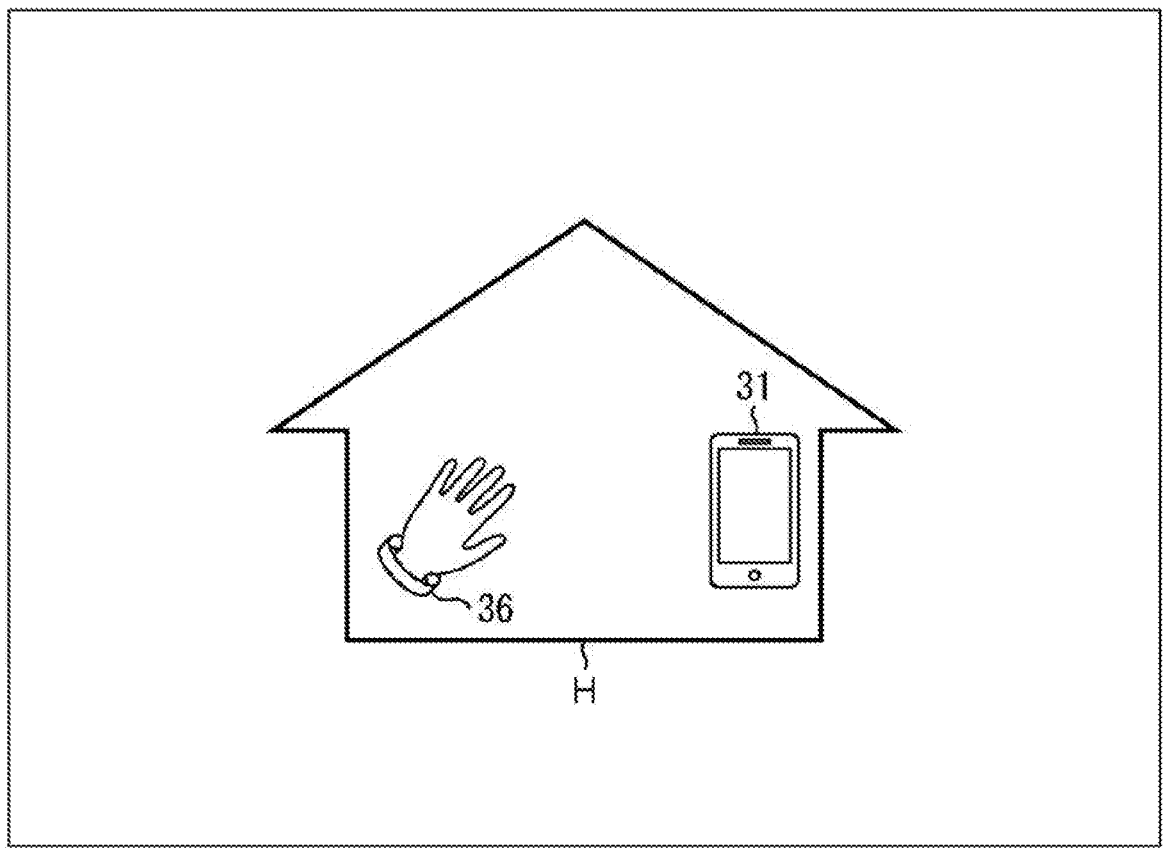
FIG. 18 is a diagram describing a state in which the client apparatus and the wearable device are in the same room.

For example, in a case where the client apparatus 31 and the wearable device 36 are at a same position (the same room) H as illustrated in FIG. 18, the position information of the wearable device 36 registered in association with the card number of the credit card matches the position information of the client apparatus 31, and it can be recognized that the user wearing the wearable device 36 is using the client apparatus 31.

Figure 19:
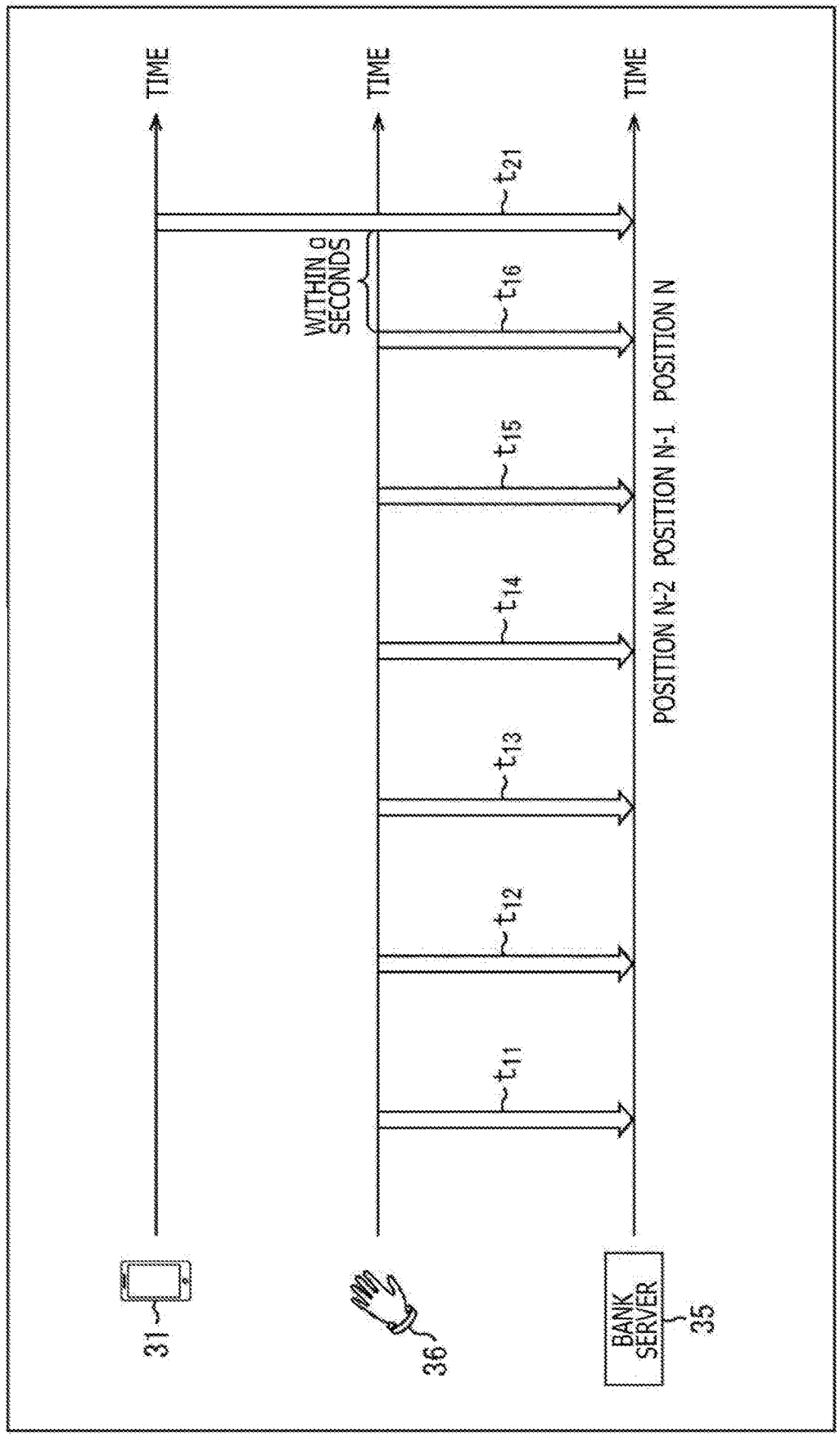
FIG. 19 is a diagram describing a pre-credit process of the pre-credit processing system of FIG. 4.

In addition, the context information as position information of the wearable device 36 is supplied from the wearable device 36 to the bank server 35 at a predetermined time interval as illustrated in FIG. 19. Therefore, in a case where, for example, the EC store server 32 starts the settlement process and requests for the pre-credit at the timing of time t21, a time period a that is the difference between time t21 and time t16 that is the timing of the acquisition of the position information at the position N in the latest context information at time t16 in FIG. 19 is a time period shorter than the predetermined time period T in the context information upload process described with reference to a flow chart of FIG. 15.

Therefore, in a case where the position information of the wearable device 36 matches the position information of the client apparatus 11 at time t16, it can be assumed that the wearable device 36 and the client apparatus 11 are at substantially the same position at the timing of the settlement at time t21 if the predetermined time period T is, for example, approximately 30 seconds.

Because of these reasons, it can be assumed that there is no impersonation of the user in using the credit card specified by the card number.

Note that in FIG. 19, the timing of the transmission of the context information in FIG. 16 from the wearable device 36 to the bank server 35 is illustrated on the center part and the lower part, and the timing of the start of the settlement process of the EC store server 32 is illustrated on the upper part.

In addition, as for the position information of the wearable device 36, not only the position information in the most recent context information may be used, but also, for example, an average value of the position information of a plurality of pieces of most recent context information may also be used as the position information of the wearable device 36. In such a way, fluctuations and errors can be corrected.

In a case where the risk score determination unit 224 accesses the context DB 203a and determines that the position information of the client apparatus 31 matches the position information of the wearable device 36 registered in association with the card number of the credit card in step S242, the risk score determination unit 224 assumes that the user of the credit card is using the client apparatus 31 so that there is no impersonation, and the process proceeds to step S243.

In step S243, the risk score determination unit 224 accesses the context DB 203a and determines whether or not the risk score registered in association with the card number of the credit card is lower than a predetermined threshold, that is, whether or not the authentication through the challenge flow is necessary.

Figure 20:
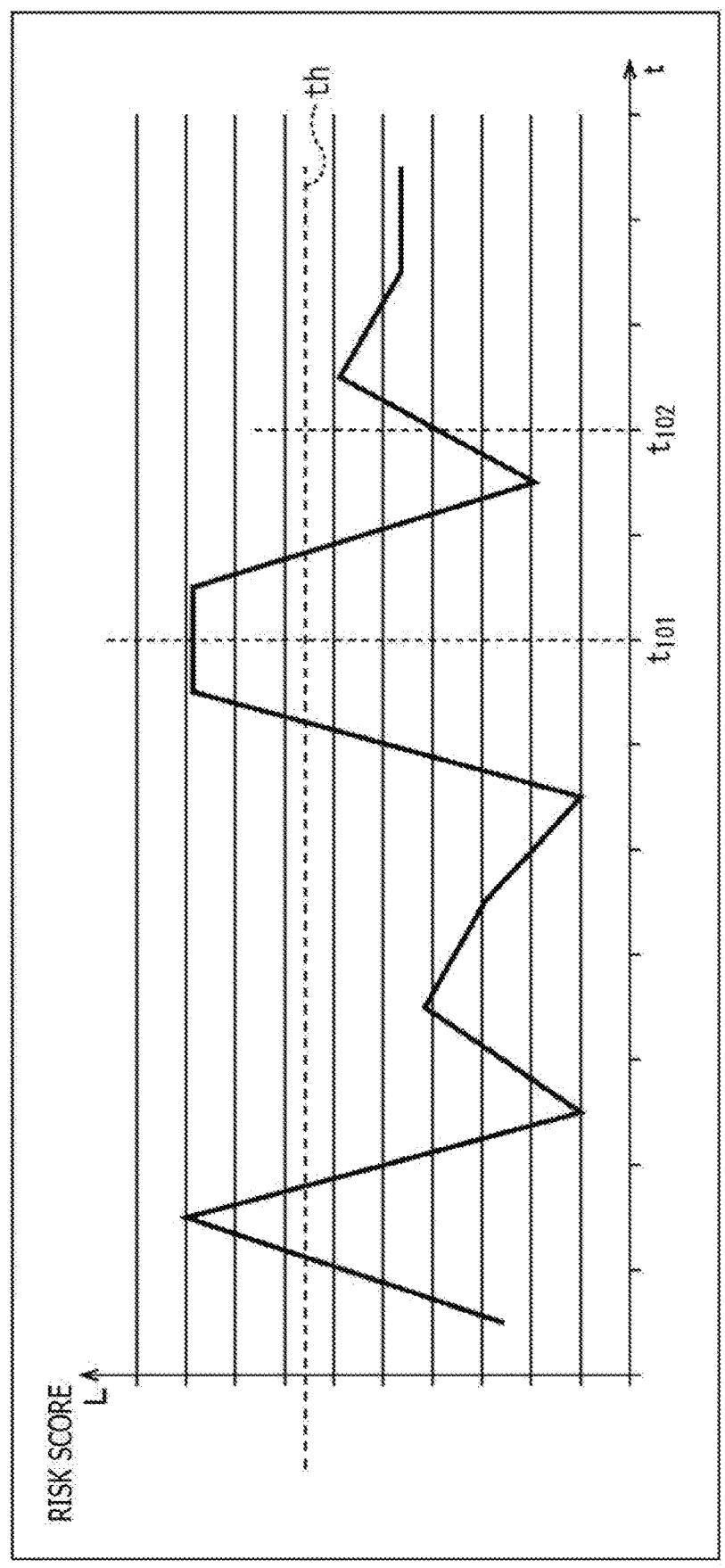
FIG. 20 is a diagram describing risk score determination based on a risk score and a threshold.

For example, in a case where the risk score chronologically changes as indicated by a solid line in FIG. 20, and a threshold th is set as indicated by a dotted line, the risk score is higher than the threshold th at time t101. Therefore, the risk score determination unit 224 assumes that the authentication through the challenge flow is necessary.

On the other hand, in the case of FIG. 20, the risk score is lower than the threshold th at time t102. Therefore, the risk score determination unit 224 assumes that the authentication through the challenge flow is not necessary and selects the frictionless flow.

In a case where, for example, the risk score determination unit 224 assumes in step S243 that there is no problem in the pre-credit so that the process can be executed through the frictionless flow because the risk score is lower than the predetermined threshold as indicated by time t102 of FIG. 20, the process proceeds to step S244.

In step S244, the risk score determination unit 224 controls the communication unit 162 to cause the communication unit 162 to transmit, to the mediation server 34, a pre-credit result including information indicating that there is no problem in the pre-credit. Note that the process of step S244 corresponds to the process Pre 13 in FIG. 4.

On the other hand, in a case where the risk score determination unit 224 accesses the context DB 203a and assumes that the position information of the client apparatus 31 does not match the position information of the wearable device 36 registered in association with the card number of the credit card in step S242 or in a case where the risk score determination unit 224 assumes that there is a problem in the pre-credit so that the process needs to be executed through the challenge flow because the risk score is higher than the predetermined threshold, the process proceeds to step S245.

In step S245, the risk score determination unit 224 requests the challenge processing unit 223 to acquire the authentication information through the challenge flow. The challenge processing unit 223 controls the communication unit 202 to request the client apparatus 31 for the authentication information.

Figure 4:
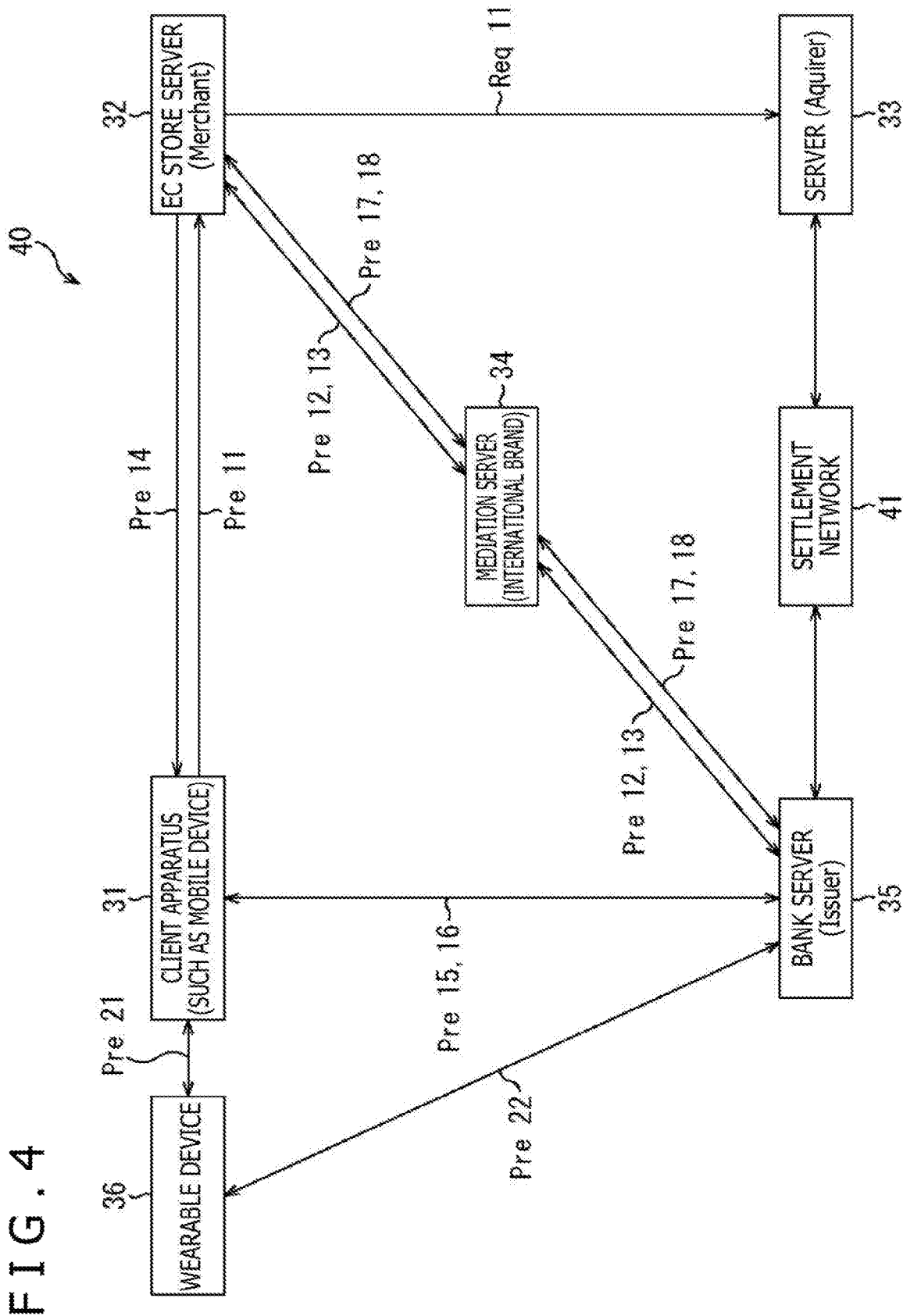
FIG. 4 is a diagram describing a configuration example of a pre-credit processing system of the present disclosure.

Note that the process of step S245 corresponds to the process Pre 15, 16 in FIG. 4. Strictly speaking, in the case where the challenge flow is necessary in the process, the EC store server 32 is notified of the fact that the pre-credit is not accepted in the process Pre 13 in FIG. 4 so that the challenge flow is necessary. Furthermore, the information for requesting the challenge flow is transmitted from the EC store server 32 to the client apparatus 31 in the process Pre 14, and the client apparatus 31 further requests the bank server 35 for the challenge flow. As a result of the series of processes, the process moves to the challenge flow of the process Pre 15, 16, and the challenge processing unit 223 of the bank server 35 controls the communication unit 202 to request the client apparatus 31 for the authentication information necessary for the challenge flow. However, this is not illustrated in the flow chart of FIG. 17.

In step S261, the challenge processing unit 72 in the control unit 51 of the client apparatus 31 controls the communication unit 52 to determine whether or not there is a request for the authentication information, that is, whether or not the challenge flow is to be conducted. In the case where there is a request for the authentication information, that is, in the case of the challenge flow, the process proceeds to step S262.

In step S262, the challenge processing unit 72 controls the communication unit 52 to receive the request for the authentication information.

In step S263, the challenge processing unit 72 controls the communication unit 52 to transmit information for requesting the wearable device 36 registered as an authentication device to input the authentication information and controls the output unit 55 to use an image or sound to present, to the fingerprint sensor 251 of the wearable device 36, information for prompting to input the fingerprint as authentication information.

In step S281, the challenge processing unit 273 in the control unit 241 of the wearable device 36 controls the communication unit 242 to receive the information for requesting the wearable device 36 registered as an authentication device to input the authentication information.

In step S282, the challenge processing unit 273 controls the output unit 245 to output, from the display or the speaker, an image or sound for requesting the user for the authentication using the fingerprint. The challenge processing unit 273 controls the fingerprint sensor 251 to receive input of the biological information using the fingerprint of the user.

In step S283, the challenge processing unit 273 compares the fingerprint information that is the biological information input by the fingerprint sensor 251 and the fingerprint information of the authorized user registered in advance and executes the authentication process.

In step S284, the challenge processing unit 273 controls the communication unit 242 to transmit the authentication result as authentication information to the client apparatus 31.

In step S264, the challenge processing unit 72 in the control unit 51 of the client apparatus 31 controls the communication unit 52 to acquire the authentication information.

In step S265, the challenge processing unit 72 controls the communication unit 52 to transmit the authentication information acquired from the wearable device 36 to the bank server 35.

Note that in a case where there is no request for the authentication information so that the challenge flow is not to be conducted in S261, the process of steps S262 to S265 is skipped.

In step S246, the challenge processing unit 223 in the control unit 201 of the bank server 35 controls the communication unit 202 to acquire the authentication information and supplies the authentication information to the risk score determination unit 224.

In step S247, the risk score determination unit 224 determines whether or not the authentication result in the authentication information is OK (authentication using biological information is accepted), that is, whether or not the fingerprint as input biological information matches the information of the authorized fingerprint registered in advance.

In a case where the authentication information is OK in step S247, the process proceeds to step S244.

Furthermore, in a case where the authentication information is not OK in step S247, the process proceeds to step S248.

In step S248, the risk score determination unit 224 controls the communication unit 202 to cause the communication unit 202 to transmit a pre-credit result indicating that the pre-credit is NG (pre-credit is not accepted) to the mediation server 34. Note that the process of step S248 corresponds to the process Pre 17 in FIG. 4.

In step S223, the pre-credit mediation processing unit 181 of the control unit 161 of the mediation server 34 controls the communication unit 162 to receive the pre-credit result from the bank server 35.

In step S224, the pre-credit mediation processing unit 181 of the control unit 161 of the mediation server 34 controls the communication unit 162 to transmit the pre-credit result to the EC store server 32.

In step S202, the pre-credit processing unit 121 in the control unit 101 of the EC store server 32 controls the communication unit 102 to receive the pre-credit result transmitted through the mediation server 34.

In step S203, the pre-credit processing unit 121 controls the communication unit 102 to transmit the pre-credit result to the client apparatus 31.

In step S266, the settlement processing unit 71 in the control unit 51 of the client apparatus 31 controls the communication unit 52 to receive the pre-credit result. The settlement processing unit 71 controls the output unit 55 to use an image, sound, or the like to present the pre-credit result.

For example, in a case considered below, a display image D21 is displayed as illustrated on the left side in FIG. 21, in which "XXX Shop Cart•USB Charger•USB Cable Total ¥1080-" is displayed on the upper part in the client apparatus 31, and a button B51 written as "Pay" pressed to request for the settlement is displayed on the lower part.

Figure 21:
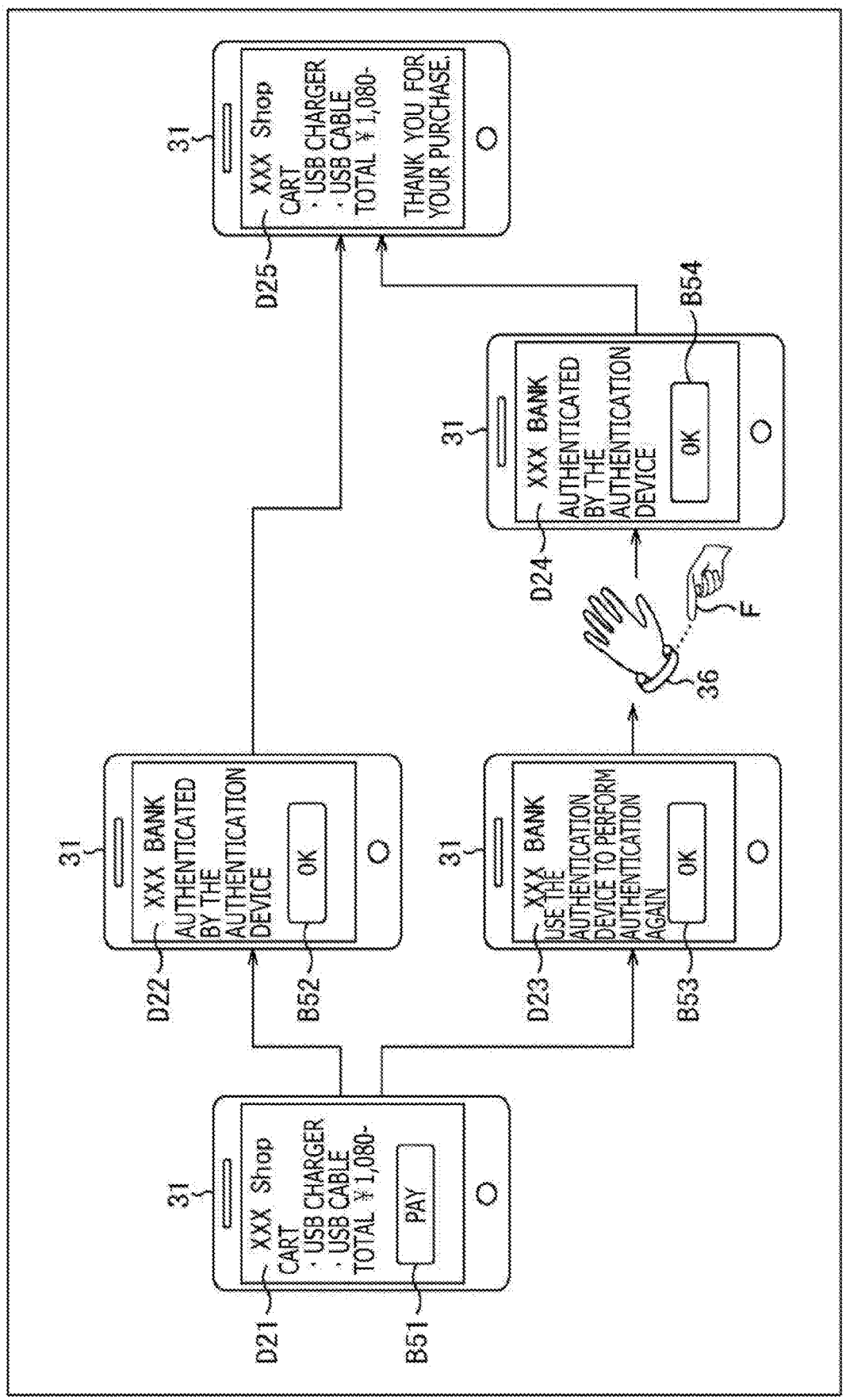
FIG. 21 is a diagram describing a display example of a display image in the pre-credit process of the pre-credit processing system of FIG. 4.

When the button B51 in the display image D21 of FIG. 21 is pressed, the settlement process described with reference to FIG. 11 is started.

In the case of FIG. 21, the pre-credit process corresponding to step S32 of FIG. 11 is executed to execute a settlement process, in which the USB charger and the USB cable are put in the cart in the XXX shop that is an EC store, and the total amount is 1080 yen.

In this case, in the case where the pre-credit result is OK in the pre-credit process, a display image D22 as illustrated, for example, on the center upper left in FIG. 21 is displayed as a result of the process of step S266. The display image D22 includes, from the top, a comment "XXX BANK Authenticated by the authentication device." and a button B52 written as "OK," and the fact that the pre-credit result is OK is displayed. Note that the display of the display image D22 is finished by pressing the button B52.

On the other hand, in the case where the risk score is higher than the threshold so that the authentication information using the challenge flow is necessary in the pre-credit process, a display image D23 for prompting to input the fingerprint as authentication information is displayed as illustrated, for example, on the center lower left in FIG. 21 as a result of the process of step S263.

The display image D23 includes, from the top, a comment "XXX Bank Use the authentication device to perform authentication again." and the button B52 written as "OK." Note that the display of the display image D23 is finished by pressing a button B53.

In accordance with the suggestion of the display image D23, a finger F of the user is held over the fingerprint sensor 251 of the wearable device 36 as illustrated on the center lower right in FIG. 21, and the fingerprint is detected. Furthermore, once the detected fingerprint matches the fingerprint of the authorized user registered in advance, a display image D24 indicating that the pre-credit result is OK is displayed in the client apparatus 31 as illustrated on the center right in FIG. 21.

The display image D24 includes, from the top, a comment "XXX BANK Authenticated by the authentication device." and a button B54 written as "OK" as illustrated on the center right in FIG. 21. Note that the display of the display image D24 is finished by pressing the button B54.

Furthermore, once the settlement process described with reference to the flow chart of FIG. 11 is completed, a display image D25 indicating the completion of the settlement is displayed as illustrated on the right side in FIG. 21.

In the display image D25, "XXX Shop Cart•USB Charger•USB Cable, Total Amount ¥1080—Thank you for your purchase." is displayed, and the completion of the settlement is displayed.

As a result of the control, in the case where the user wears the wearable device 36 authenticated based on the biological information and operates the client apparatus 31 to execute the settlement process, whether the user wearing the wearable device 36 matches the user operating the client apparatus 31 to purchase the product by using the credit card registered in association with the wearable device 36 can be checked. Therefore, whether or not the credit card is used for impersonation can be appropriately determined, and the frequency of challenge flow in the pre-credit process can be reduced.

As a result, the labor of the authentication process through the challenge flow can be reduced, and a comfortable settlement process using the credit card can be realized without reducing the security level against the impersonation of the credit card in the settlement process.

Note that in the example described in the process, the fingerprint authentication of the wearable device 36 is used in the case where the process moves to the challenge flow. However, other methods can be used to execute the authentication process as long as the user using the client apparatus 31 can be authenticated. For example, a password may be input to the client apparatus 31 in the authentication process.

In the example described above, the bank server 35 carries out the credit determination in the pre-credit process using the risk score. However, other apparatuses may carry out the process regarding the credit determination carried out by the bank server 35, and for example, the EC store server 32 may carry out the process.

In addition, the display images D22 and D24 among the display images D21 to D25 described with reference to FIG. 21 are display images just for confirming that the authentication is accepted. Therefore, the process of displaying the images may be skipped, and the images may not be displayed.

<<14. Variation of Acquisition Method of Position Information of Client Apparatus and Wearable Device (Part 1)>>

Figure 22:
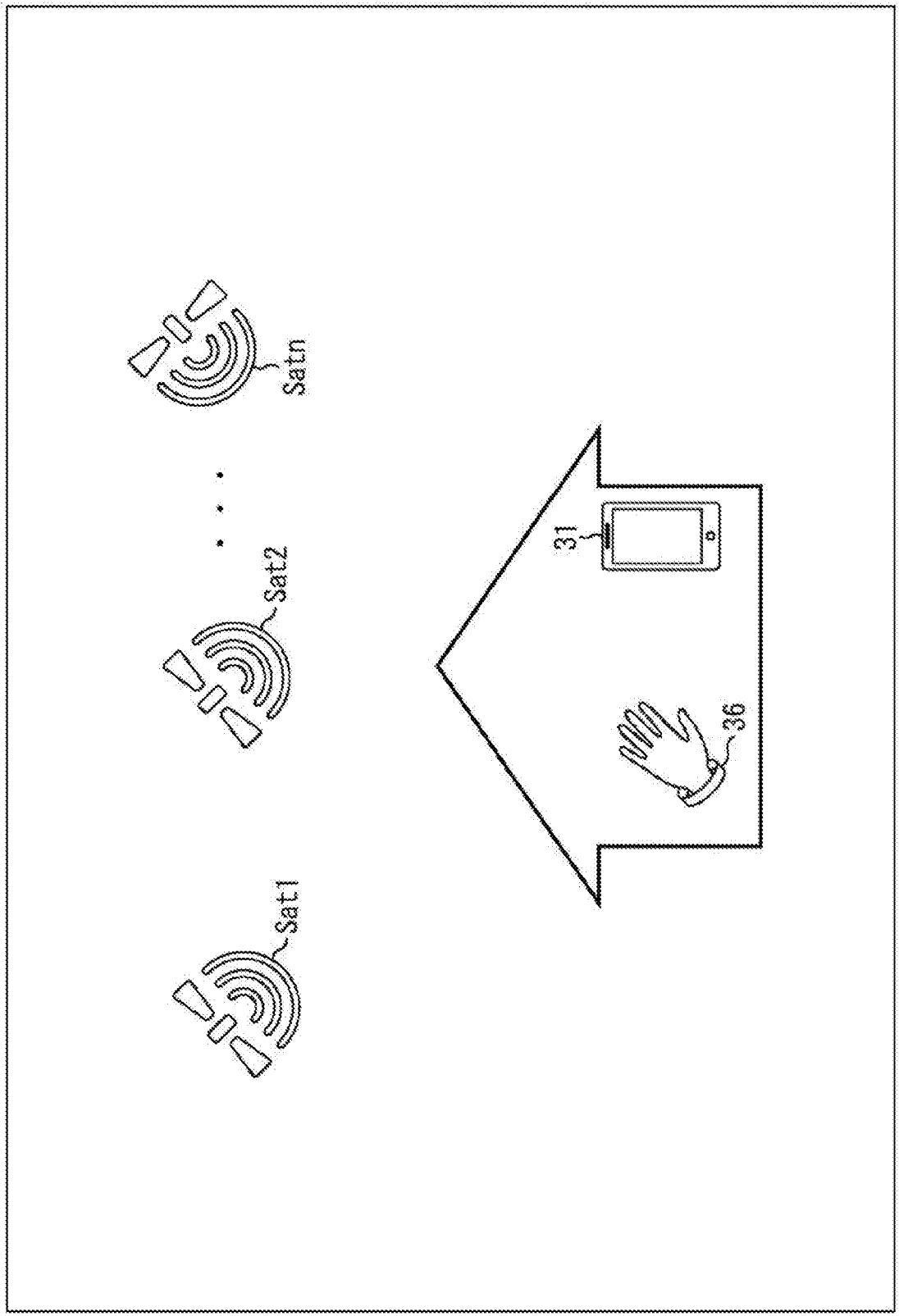
FIG. 22 is a diagram describing a variation of an acquisition method of position information of the client apparatus and the wearable device (part 1).

As for the position information of each of the client apparatus 31 and the wearable device 36 in the description above, whether or not the position information of the client apparatus 31 matches the position information of the wearable device 36 is determined based on the position information calculated by the GPSs 59 and 251 using signals acquired from satellites Sat1 to Satn as illustrated in FIG. 22, that is, whether or not to move to the challenge flow is determined based on whether or not the client apparatus 31 and the wearable device 36 are at substantially the same position with respect to each other.

However, other methods may be used to obtain the position information as long as whether the positions of the client apparatus 31 and the wearable device 36 are in a state closer than a predetermined state can be checked.

For example, SSIDs of receivable WiFi access points and reception strengths at the WiFi access points can be compared in the client apparatus 31 and the wearable device 36 to determine whether or not the client apparatus 31 and the wearable device 36 are at substantially the same position.

Figure 23:
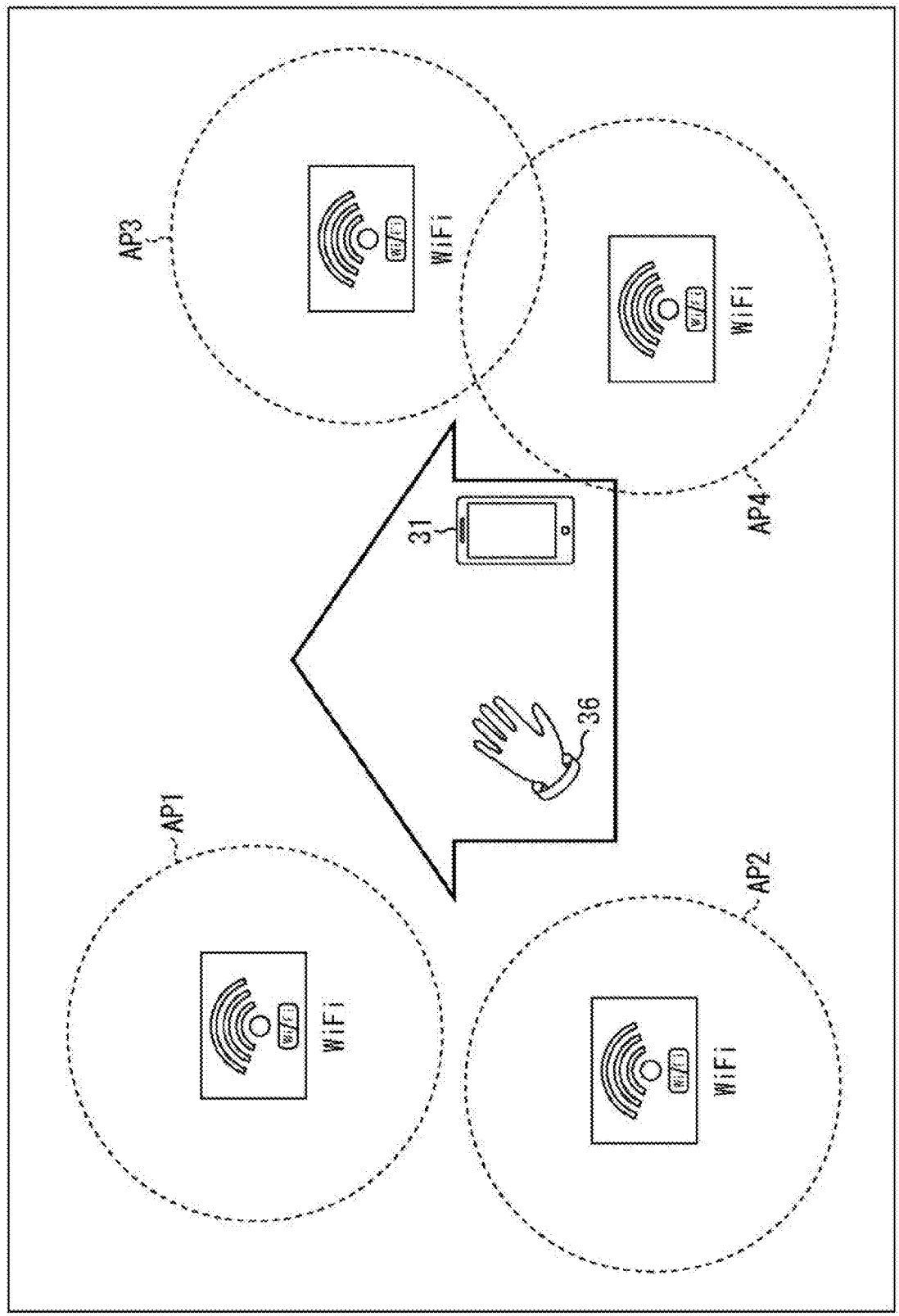
FIG. 23 is another diagram describing the variation of the acquisition method of the position information of the client apparatus and the wearable device (part 1).

That is, when there are receivable WiFi access points AP1 to AP4 in the case where the client apparatus 31 and the wearable device 36 are at substantially the same position as illustrated, for example, in FIG. 23, the positional relationship between the client apparatus 31 and the WiFi access points AP1 to AP4 and the positional relationship between the wearable device 36 and the WiFi access points AP1 to AP4 are the same. When the positional relationships match in such a way, the WiFi communication units 91 and 281 in the communication units 52 and 242 of the client apparatus 31 and the wearable device 36 can communicate with the access points AP1 to AP4, and furthermore, the reception strengths from the access points AP1 to AP4 are also substantially the same.

In other words, if the positional relationships between things in the surroundings, such as the access points AP1 to AP4, are the same, it can be assumed that the client apparatus 31 and the wearable device 36 are at substantially the same position. Therefore, peripheral information (for example, atmospheric pressure, temperature, environmental sound of the surroundings, and the like) of the client apparatus 31 and the wearable device 36 can be measured, and it can be assumed that the client apparatus 31 and the wearable device 36 are at the same position if the similarity of peripheral information is equal to or greater than a predetermined level.

Therefore, the wearable device 36 transmits, as position information, context information including the information of the SSIDs of the access points AP1 to AP4 and the reception strengths at the access points AP1 to AP4 received in the WiFi communication unit 281 in the communication unit 242 to the bank server 35 at a predetermined time interval.

Furthermore, in the pre-credit process, the bank server 35 acquires the information of the SSIDs of the access points AP1 to AP4 and the reception strengths at the access points AP1 to AP4 received by the WiFi communication unit 91 in the communication unit 52 of the client apparatus 31 that requests for the settlement process. The bank server 35 compares the information with the information of the latest context DB 203a. In a case where the similarity is equal to or greater than a predetermined level, the bank server 35 may assume that the client apparatus 31 and the wearable device 36 are at the same position.

That is, the SSIDs of the access points receivable in the client apparatus 31 and the wearable device 36 and the information of the reception strengths at the access points can be handled as the position information of the client apparatus 31 and the wearable device 36.

<<15. Variation of Acquisition Method of Position Information of Client Apparatus and Wearable Device (Part 2)>>

Figure 24:
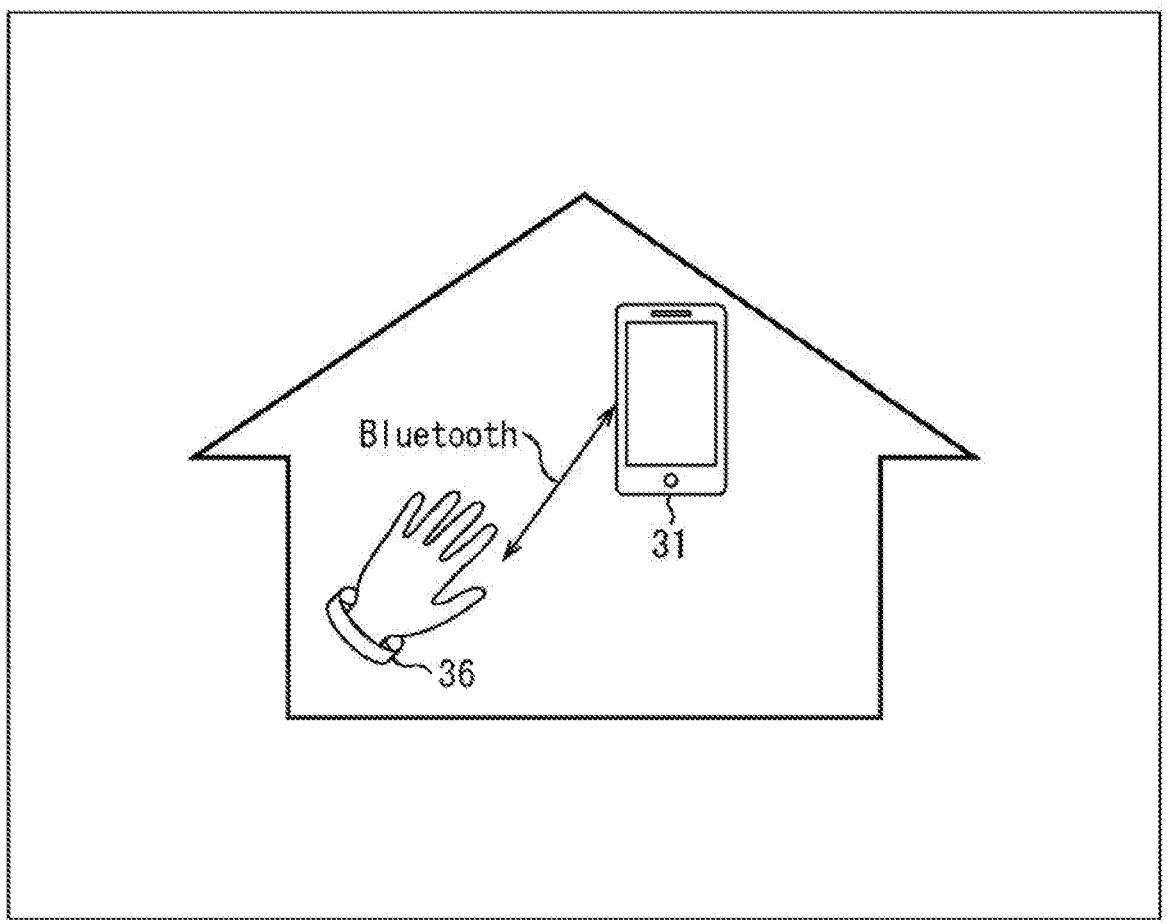
FIG. 24 is a further diagram describing a variation of the acquisition method of the position information of the client apparatus and the wearable device (part 2).

As illustrated in FIG. 24, the client apparatus 31 and the wearable device 36 may be paired with each other by Bluetooth, and it may be assumed that the client apparatus 31 and the wearable device 36 are at substantially the same position with respect to each other based on whether or not the client apparatus 31 and the wearable device 36 can communicate with each other.

That is, the Bluetooth communication allows communication only at a short distance of approximately several dozen meters, and it can be assumed that the client apparatus 31 and the wearable device 36 are at substantially the same position if the client apparatus 31 and the wearable device 36 are paired with each other.

Therefore, the Bluetooth communication unit 283 of the communication unit 242 in the wearable device 36 transmits context information, which includes information of the client apparatus 31 paired in the Bluetooth communication, to the bank server 35 at a predetermined time interval.

Furthermore, in the pre-credit process, the bank server 35 may compare the information of the wearable device 36, which is paired with the Bluetooth communication unit 93 in the communication unit 52 of the client apparatus 31 requesting for the settlement process in the Bluetooth communication, and the information of the latest context DB 203a. When the client apparatus 31 and the wearable device 36 are paired with each other, the bank server 35 may assume that the client apparatus 31 and the wearable device 36 are at substantially the same position.

Furthermore, additionally, a communication network of a mobile phone may be used to determine whether or not the client apparatus 31 and the wearable device 36 are at substantially the same position based on, for example, whether or not the cells, which are used by the LTE communication units 92 and 282 of the communication units 52 and 242 of the client apparatus 31 and the wearable device 36 in the communication, respectively, are the same.

Furthermore, whether or not the client apparatus 31 and the wearable device 36 are at substantially the same position may be determined based on whether or not the NFCs 94 and 284 of the communication units 52 and 242 of the client apparatus 31 and the wearable device 36 can communicate with each other.

<<16. Variation of Method of Determining Whether or not Client Apparatus and Wearable Device are at Substantially the Same Position (Part 1)>>

The position information obtained by various methods, such as the position information obtained from the SSIDs of the receivable access points AP1 to AP4 in each of the client apparatus 31 and the wearable device 36, the reception strengths at the access points AP1 to AP4, and the like and the position information obtained by the GPSs 59 and 249, may be used to directly obtain the distance between the client apparatus 31 and the wearable device 36. In a case where the distance is closer than a predetermined distance, it may be assumed that the client apparatus 31 and the wearable device 36 are at substantially the same position.

Figure 25:
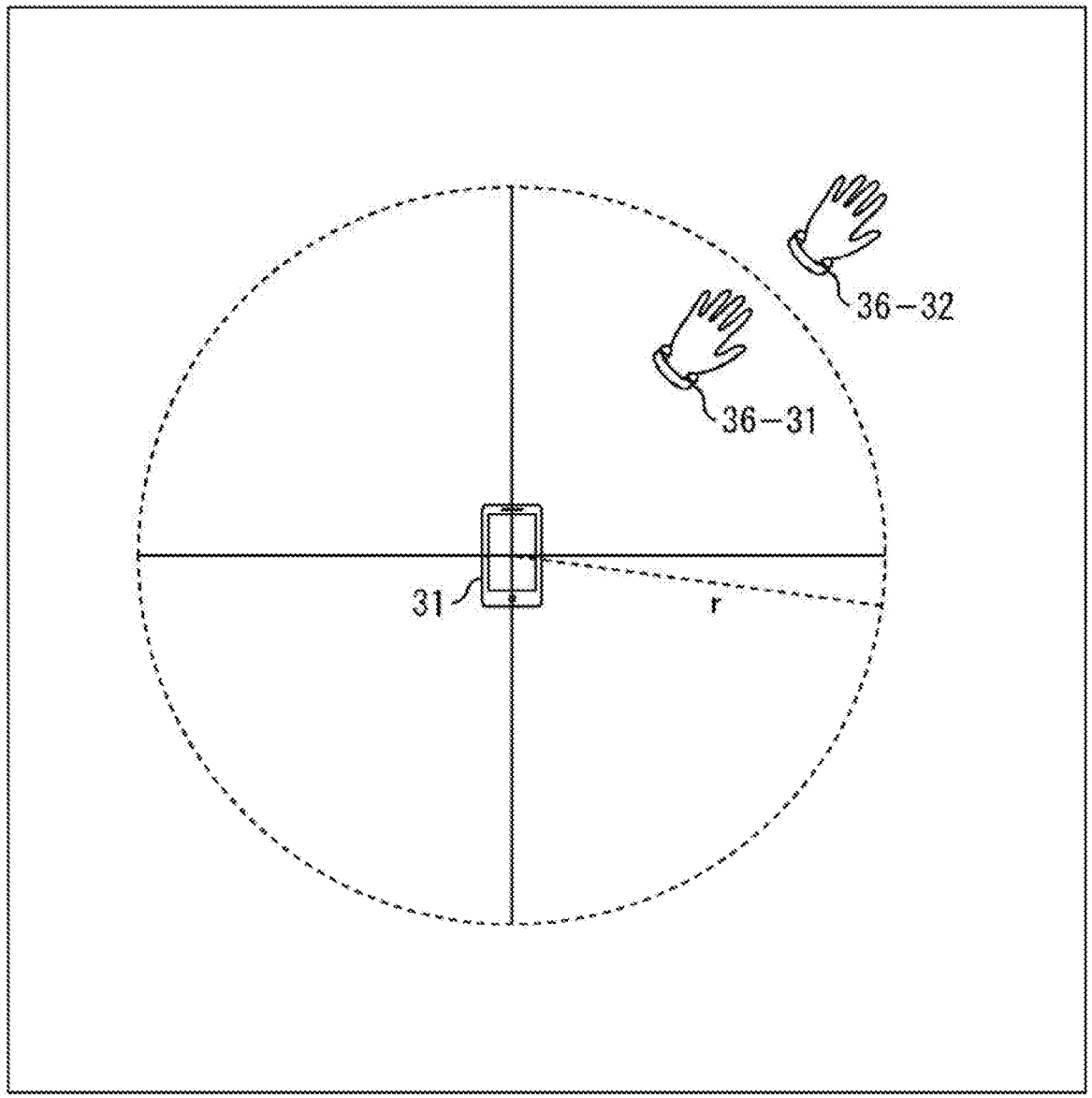
FIG. 25 is a diagram describing a variation of a method of determining whether or not the client apparatus and the wearable device are at substantially the same position (part 1).

That is, as indicated by a wearable device 36-31 of FIG. 25, it is assumed that the wearable device 36-31 and the client apparatus 31 are at substantially the same position with respect to each other in a case where the distance from the client apparatus 31 is closer than a predetermined distance r (for example, 30 m or the like).

On the other hand, as indicated by a wearable device 36-32, it may be assumed that the wearable device 36-32 and the client apparatus 31 are not at substantially the same position with respect to each other in a case where the distance from the client apparatus 31 is farther than the predetermined distance r (for example, 30 m or the like).

<<17. Variation of Method of Determining Whether or not Client Apparatus and Wearable Device are at Substantially the Same Position (Part 2)>>

In the examples described above, the distance between the position of the client apparatus 31 and the wearable device 36 is used to perform the actual measurement to compare the distance with the predetermined distance to thereby determine whether or not the client apparatus 31 and the wearable device 36 are at the same position after the start of the settlement process. It may also be determined that the wearable device 36 and the client apparatus 31 are at substantially the same position if, for example, the most recent context information as position information of the wearable device 36 indicates a place where the settlement is performed for several times in the past, even if there is no position information of the client apparatus 31.

That is, in the examples described above, the position information of the client apparatus 31 after the start of the settlement process is used to determine whether or not the position of the client apparatus 31 is the same as the position of the wearable device 36, and then the risk score is reduced by the predetermined value A when the client apparatus 31 and the wearable device 36 are at the same position.

However, in a case where the risk score is too high, the risk score may not be able to be reduced to a score lower than the threshold for transition to the challenge flow unless the risk score is repeatedly reduced by the predetermined value A for several times. In this case, the process may be moved to the challenge flow if the settlement process is executed before the risk score becomes smaller than the threshold.

Figure 26:
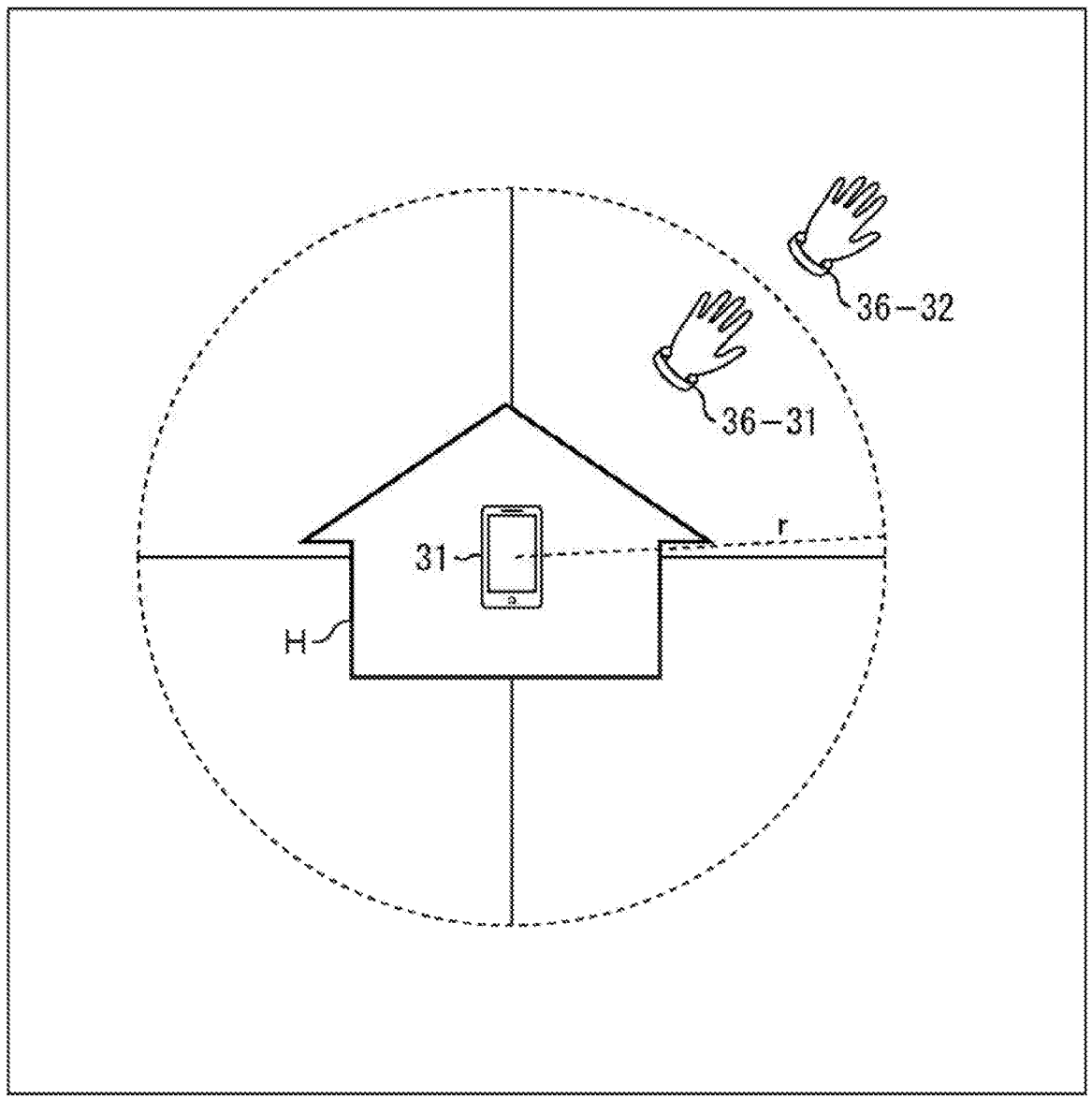
FIG. 26 is another diagram describing a variation of the method of determining whether or not the client apparatus and the wearable device are at substantially the same position (part 2).

Therefore, as illustrated in FIG. 26, the risk score is reduced in advance by assuming that the position of the wearable device 36 is substantially the same as the position of the client apparatus 31 in a stage before the settlement process is requested, that is, in a stage before the position information of the client apparatus 31 is supplied, when it is recognized that the position of the wearable device 36 is a position H, which is a position where the settlement process is executed for equal to or more than predetermined times in the past, minus the predetermined distance r.

That is, as indicated by the wearable device 36-31 of FIG. 26, it is assumed that the wearable device 36-31 and the client apparatus 31 are at substantially the same position with respect to each other in a case where the distance from the position H where the settlement process is executed by the client apparatus 31 in the past is closer than the predetermined distance r (for example, 30 m or the like). On the other hand, as indicated by the wearable device 36-32, it may be assumed that the wearable device 36-32 and the client apparatus 31 are not at substantially the same position with respect to each other in a case where the distance from the position H where the settlement process is executed by the client apparatus 31 in the past is farther than the predetermined distance r (for example, 30 m or the like).

The process can prevent a situation that the reduction of the risk score is not in time so that the process moves to the challenge flow.

<<18. Modification of Context Information Upload Process>>

In the examples described above, the context information is transmitted in one way from the wearable device 36 to the bank server 35 at a predetermined time interval. However, the context information may be transmitted in response to a request from the bank server 35.

For example, the risk score is increased by the predetermined value a at every predetermined time period t. Therefore, the bank server 35 may compare the current risk score and the threshold for transition to the challenge flow and may request the wearable device 36 for the context information when the risk score becomes a value about to exceed the threshold (or when the risk score exceeds the threshold). The wearable device 36 may transmit the context information in response to the request.

Here, a context information upload process in which the bank server 35 requests the wearable device 36 for the context information will be described with reference to a flow chart of FIG. 27.

Figure 27:
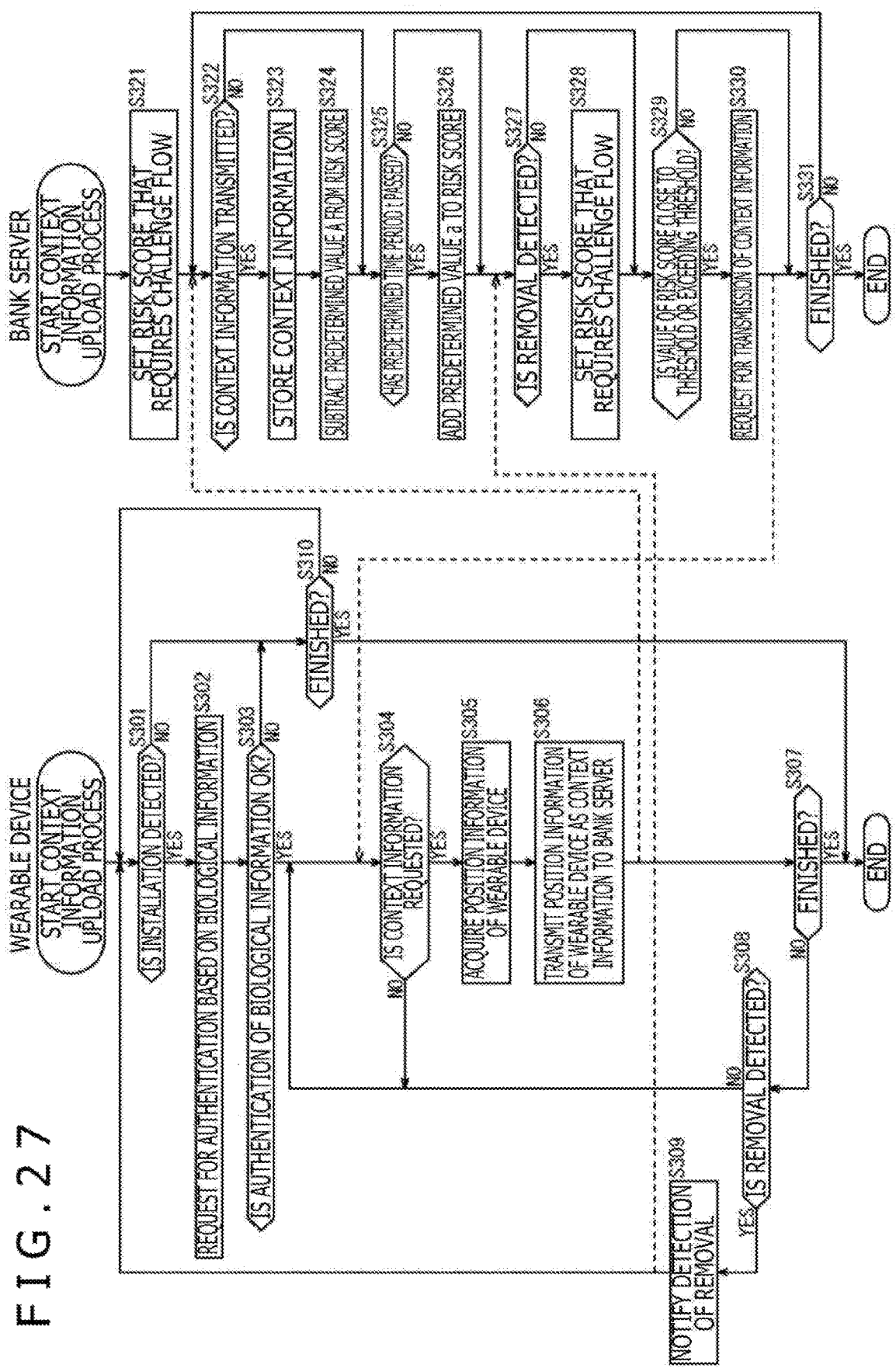
FIG. 27 is a flow chart describing a modification of a context information upload process of the pre-credit processing system of FIG. 4.

Note that in the flow chart of FIG. 27, the process of steps S301 to S303 and S305 to S310 and the process of steps S321 to S328 and S331 are similar to the process of steps S151 to S153 and S155 to S160 and the process of steps S171 to S179 in FIG. 15, and the description will be appropriately skipped.

That is, in step S329, the risk score determination unit 224 in the control unit 201 of the bank server 35 accesses the context DB 203a to determine whether or not there is a sign that the risk score will exceed the threshold (risk score is approaching the threshold) although the risk score is lower than the threshold for transition to the challenge flow or whether or not the risk score is already exceeding the threshold.

In a case where the risk score determination unit 224 determines that there is a sign that the risk score will exceed the threshold although the risk score is lower than the threshold or in a case where the risk score determination unit 224 determines that the risk score is already exceeding the threshold in step S329, the process proceeds to step S330.

In step S330, the risk score determination unit 224 controls the communication unit 202 to request the wearable device 36 for the context information.

Note that in a case where the risk score does not exceed the threshold and is not a value close to the threshold in step S329, the process of step S331 is skipped.

In step S304, the context transmission processing unit 272 in the control unit 241 of the wearable device 36 controls the communication unit 242 to determine whether or not the bank server 35 has requested for the context information and repeats the similar process until the request is transmitted.

Furthermore, once the information for requesting the context information is transmitted in step S304, the process proceeds to step S305.

That is, the wearable device 36 supplies the context information when the context information is requested by the bank server 35.

Figure 28:
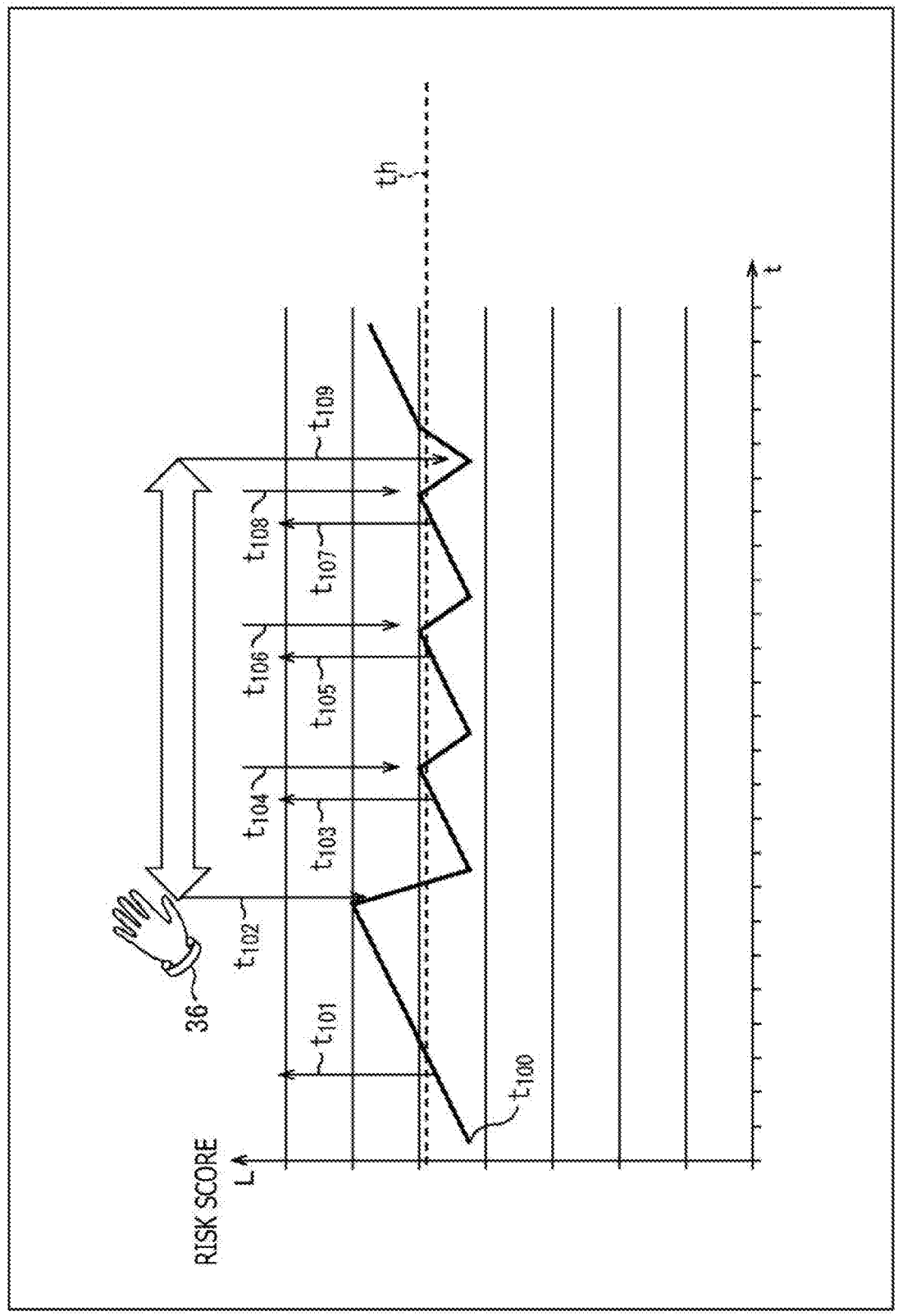
FIG. 28 is a diagram describing an example of change in risk score according to the modification of the context information upload process of FIG. 27.

As a result, the risk score chronologically changes as indicated by, for example, a solid line in FIG. 28. Note that the chronological change indicates the change in risk score from the state in which the wearable device 36 is not worn to the removal of the wearable device after the wearable device 36 is worn. In addition, a range of a two-way arrow at the top in FIG. 28 indicates the timing that the user is wearing the wearable device 36.

That is, at time t100, the user is not wearing the wearable device 36, and the risk score indicated by the solid line is a value lower than the risk score threshold th.

However, the risk score gradually increases with time and exceeds the threshold th at time t101.

Furthermore, the user does not wear the wearable device 36, and the risk score continues to increase.

Here, at time t102, the fingerprint for biological authentication is detected and recognized as registered authorized biological information, and the user wears the wearable device 36. The risk score decreases along with the installation, and the risk score becomes a value lower than the threshold th.

Subsequently, the risk score gradually increases with time, and the risk score becomes a value close to the threshold th at time t103. Therefore, the bank server 35 requests the wearable device 36 for the context information at time t103.

In response to the request for the context information, the wearable device 36 transmits the context information to the bank server 35 at time t104.

As a result, the risk score is reduced and becomes a value smaller than the threshold th. Subsequently, the risk score increases with time, and the risk score becomes a value close to the threshold th again at time t105. Therefore, the bank server 35 requests the wearable device 36 for the context information at time t105.

In response to the request for the context information, the wearable device 36 transmits the context information to the bank server 35 at time t106.

As a result, the risk score is reduced and becomes a value smaller than the threshold th. Subsequently, the risk score increases with time, and the risk score becomes a value close to the threshold th again at time t107. Therefore, the bank server 35 requests the wearable device 36 for the context information at time t107.

In response to the request for the context information, the wearable device 36 transmits the context information to the bank server 35 at time t108.

Subsequently, once the removal of the wearable device 36 is detected at time t109, the risk score is adjusted to a value larger than the threshold that requires the challenge flow.

As a result of the series of operations, the risk score can be maintained at a value lower than the threshold th in the period in which the user is wearing the wearable device 36. This can reduce the frequency of transition to the challenge flow without reducing the level of security against the impersonation.

As a result, the labor of the authentication process through the challenge flow can be reduced, and a comfortable settlement process using the credit card can be realized without reducing the security level against the impersonation of the credit card in the settlement process.

<<19. Application to Face-to-Face Settlement>>

Although the examples of the settlement process regarding electronic settlement have been described above, the settlement process can also be applied to so-called face-to-face settlement at a store.

In the face-to-face settlement, the client apparatus 31 corresponds to a card reader or the like of the credit card, and the EC store server 32 corresponds to a cash register or the like at the store connected to a network. Hereinafter, the cash register will also be referred to as a cash register 32 corresponding to the EC store server 32.

In addition, QR code settlement may also be used in the face-to-face settlement.

The QR code settlement is a settlement method, in which the client apparatus 31 provided with a dedicated application program is used, and a QR code (registered trademark) is used. The QR code settlement includes code settlement and read settlement.

Figure 29:
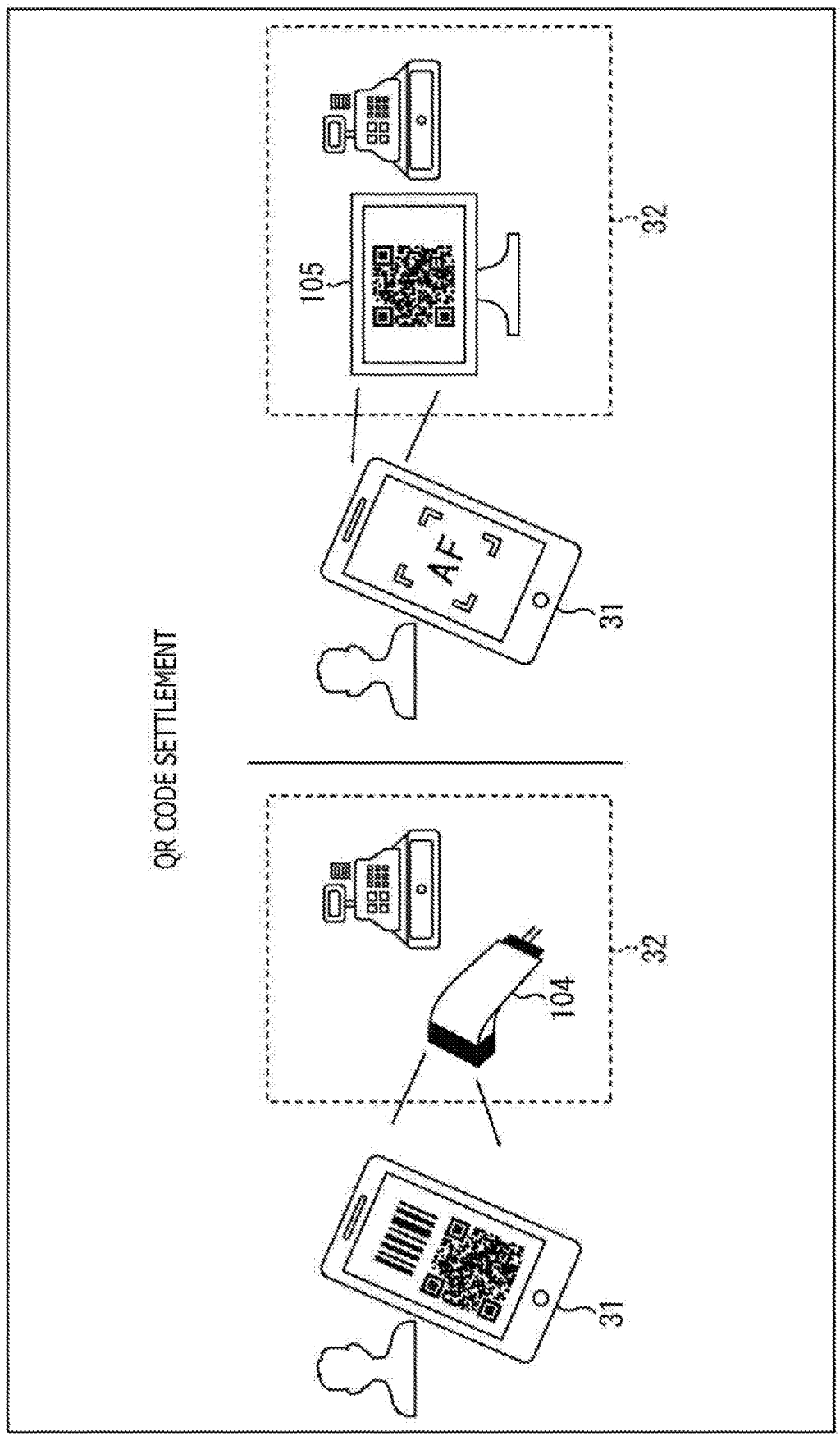
FIG. 29 is a diagram describing QR code settlement.

The code settlement is, for example, settlement as illustrated on the left side in FIG. 29, in which the client apparatus 31 provided with a dedicated application program is used, a QR code corresponding to the amount of payment is presented, and the cash register 32 or the like at the store uses a reader (corresponding to the input unit 104) to read the QR code.

The read settlement is, for example, settlement as illustrated on the right side in FIG. 29, in which the client apparatus 31 provided with a dedicated application program is used, and the client apparatus 31 uses a display or the like (corresponding to the output unit unit 105) connected to the cash register or the like at the store to read the QR code corresponding to the amount of payment.

In either case, the settlement can be performed as in the case where the client apparatus 31 uses the credit card.

<<20. Example of Execution by Software>>

Incidentally, although the series of processes can be executed by hardware, the series of processes can also be executed by software. In the case where the series of processes are executed by software, a program included in the software is installed from a recording medium to a computer incorporated into dedicated hardware or to, for example, a general-purpose computer that can execute various functions by installing various programs.

Figure 30:
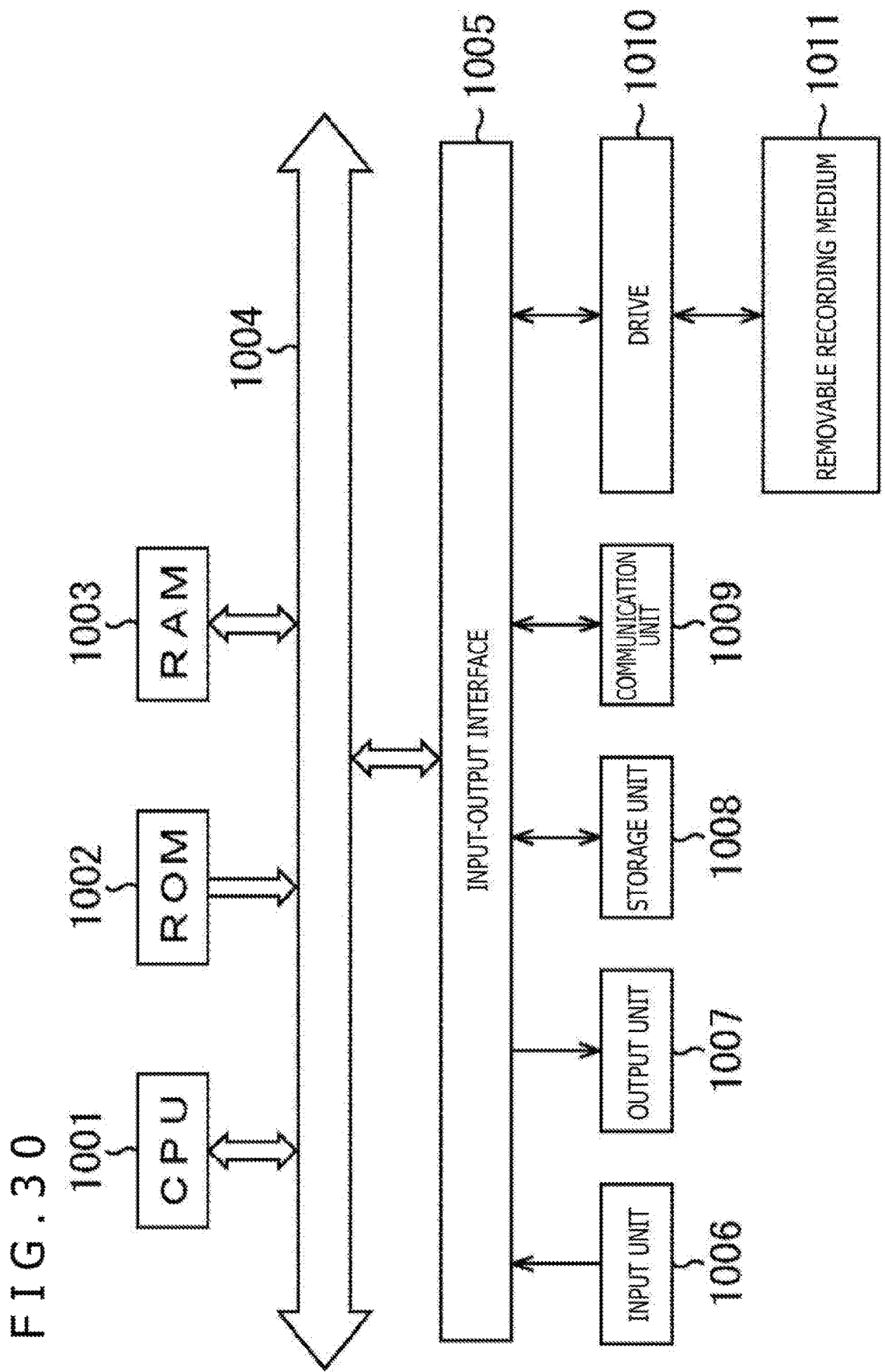
FIG. 30 is a diagram describing a configuration example of a general-purpose personal computer.

FIG. 30 illustrates a configuration example of the general-purpose computer. The personal computer includes a CPU (Central Processing Unit) 1001. An input-output interface 1005 is connected to the CPU 1001 through a bus 1004. A ROM (Read Only Memory) 1002 and a RAM (Random Access Memory) 1003 are connected to the bus 1004.

An input unit 1006 including an input device, such as a keyboard and a mouse, for the user to input an operation command, an output unit 1007 that outputs a processing operation screen or an image of a processing result to a display device, a storage unit 1008 including a hard disk drive or the like that stores programs and various data, and a communication unit 1009 that includes a LAN (Local Area Network) adapter or the like and that executes a communication process through a network represented by the Internet are connected to the input-output interface 1005. In addition, a drive 1010 that reads and writes data to and from a removable storage medium 1011, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory, is connected to the input-output interface 1005.

The CPU 1001 executes various processes according to a program stored in the ROM 1002 or a program read out from the removable storage medium 1011, such as a magnetic disk, an optical disk, a magneto-optical disk, and a semiconductor memory, installed on the storage unit 1008, and loaded from the storage unit 1008 to the RAM 1003. Data and the like necessary for the CPU 1001 to execute various processes are also appropriately stored in the RAM 1003.

In the computer configured in this way, the CPU 1001 loads, for example, a program stored in the storage unit 1008 on the RAM 1003 through the input-output interface 1005 and the bus 1004 and executes the program to execute the series of processes.

The program executed by the computer (CPU 1001) can be provided by recording the program in, for example, the removable storage medium 1011 as a package medium or the like. In addition, the program can also be provided through a wired or wireless transmission medium, such as a local area network, the Internet, and digital satellite broadcast.

In the computer, the removable storage medium 1011 can be mounted on the drive 1010, and the program can be installed on the storage unit 1008 through the input-output interface 1005. In addition, the communication unit 1009 can receive the program through a wired or wireless transmission medium, and the program can be installed on the storage unit 1008. In addition, the program can also be installed in advance on the ROM 1002 or the storage unit 1008.

Note that the program executed by the computer may be a program in which the processes are executed in chronological order described in the present specification, or the program may be a program for executing the processes in parallel or for executing the processes at necessary timing such as when the processes are invoked.

Note that the CPU 1001 in FIG. 30 realizes the functions of the control units 51, 101, 141, 161, 201, and 241 of FIGS. 5 to 10, respectively.

Furthermore, in the present specification, the system denotes a set of a plurality of constituent elements (such as apparatuses and modules (parts)), and whether or not all of the constituent elements are in the same housing does not matter. Therefore, both a plurality of apparatuses placed in separate housings and connected through a network and one apparatus including a plurality of modules placed in one housing are systems.

Note that the embodiment of the present disclosure is not limited to the embodiment, and various changes can be made without departing from the scope of the present disclosure.

For example, the present disclosure can be in a form of cloud computing in which a plurality of apparatuses shares one function through a network and cooperatively executes a process.

In addition, each step described in the flow charts can be executed by one apparatus or can be shared and executed by a plurality of apparatuses.

Furthermore, in a case where one step includes a plurality of processes, the plurality of processes included in one step can be executed by one apparatus or can be shared and executed by a plurality of apparatuses.

Note that the present disclosure can also be configured as follows.

<1>

An information processing apparatus including:

a risk determination unit that determines, in a settlement process, a risk regarding the settlement process based on a positional relationship between an authentication apparatus that has authenticated a user and a client apparatus for the user to execute the settlement process.

<2>

The information processing apparatus according to <1>, in which the risk determination unit sets, as a risk score, a score regarding the risk of the settlement process and compares the set risk score and a predetermined threshold to determine the risk.

<3>

The information processing apparatus according to <2>, further including:

an authentication process request unit that transmits an authentication process request for requesting an authentication process to the client apparatus in a case where the risk determination unit determines that the risk score is higher than the predetermined threshold, in which the risk determination unit determines the risk regarding the settlement process based on an authentication result from the client apparatus in response to the authentication process request.

<4>

The information processing apparatus according to <3>, further including:

a context information reception unit that receives, as context information, the authentication result of the user and authentication apparatus position information, which is position information of the authentication apparatus, that are transmitted at a predetermined time interval from the authentication apparatus, in which the risk determination unit reduces the risk score by a predetermined amount when the context information reception unit receives the context information.

<5>

The information processing apparatus according to <4>, in which the risk determination unit increases the risk score by a predetermined value at a predetermined time interval.

<6>

The information processing apparatus according to <4>, in which the authentication apparatus is worn by the user, and the context information reception unit receives the context information when the user wears the authentication apparatus.

<7>

The information processing apparatus according to <5>, in which the context information reception unit receives information indicating removal of the authentication apparatus when the authentication apparatus is removed by the user, and the risk determination unit sets the risk score to a value larger than the predetermined threshold when the context information reception unit receives the information indicating the removal of the authentication apparatus.

<8>

The information processing apparatus according to <4>, in which the context information reception unit requests the authentication apparatus for the context information and receives the context information when there is a sign that the risk score will exceed the predetermined threshold although the risk score is lower than the predetermined threshold or when the risk score exceeds the predetermined threshold.

<9>

The information processing apparatus according to any one of <1> to <8>, in which the risk determination unit determines the risk regarding the settlement process based on whether or not the positional relationship between the authentication apparatus and the client apparatus indicates the same position.

<10>

The information processing apparatus according to any one of <1> to <8>, in which the risk determination unit determines the risk regarding the settlement process based on whether or not the positional relationship between the authentication apparatus and the client apparatus indicates equal to or shorter than a predetermined distance.

<11>

The information processing apparatus according to any one of <1> to <8>, in which the risk determination unit determines the risk regarding the settlement process based on whether or not the positional relationship between the authentication apparatus and the client apparatus indicates similarity larger than a predetermined level in relation to SSIDs of access points that are capable of being received by both the authentication apparatus and the client apparatus and in relation to reception strengths of the authentication apparatus and the client apparatus.

<12>

The information processing apparatus according to any one of <1> to <8>, in which the risk determination unit determines the risk regarding the settlement process based on whether or not the positional relationship between the authentication apparatus and the client apparatus indicates that the authentication apparatus and the client apparatus are capable of being paired by Bluetooth.

<13>

An information processing method including:

determining, in a settlement process, a risk regarding the settlement process based on a positional relationship between an authentication apparatus that has authenticated a user and position information of a client apparatus for the user to execute the settlement process.

<14>

A client system including:

an authentication apparatus that authenticates a user; and a client apparatus that applies a settlement process of the user to an information processing apparatus that determines a risk regarding the settlement process, the authentication apparatus including an authentication unit that authenticates the user, an authentication apparatus position information acquisition unit that acquires position information of the authentication apparatus as authentication apparatus position information, and an authentication apparatus position information transmission unit that transmits an authentication result of the authentication unit and the authentication apparatus position information to the information processing apparatus, and the client apparatus including a client apparatus position information acquisition unit that acquires position information of the client apparatus as client apparatus position information, and a client apparatus position information transmission unit that transmits the client apparatus position information to the information processing apparatus.

<15>

The client system according to <14>, in which the authentication apparatus position information transmission unit transmits, as context information, the authentication result and the position information of the authentication apparatus to the information processing apparatus at a predetermined time interval.

<16>

The client system according to <15>, in which the authentication apparatus is worn by the user, and the authentication apparatus position information transmission unit transmits the context information to the information processing apparatus when the user wears the authentication apparatus.

<17>

The client system according to <16>, in which the authentication apparatus position information transmission unit transmits information indicating removal of the authentication apparatus to the information processing apparatus when the authentication apparatus is removed by the user.

<18>

The client system according to <15>, in which the authentication apparatus position information transmission unit transmits the context information to the information processing apparatus in a case where there is a request for the context information from the information processing apparatus.

<19>

The client system according to <14>, further including:

an authentication information transmission unit that transmits authentication information of the user to the information processing apparatus in a case where the authentication information of the user is requested based on a determination result of the risk regarding the settlement process of the information processing apparatus.

<20>

A control method of a client system including:

an authentication apparatus that authenticates a user; and a client apparatus that applies a settlement process of the user to an information processing apparatus that determines a risk regarding the settlement process, the control method of the authentication apparatus including an authentication process of authenticating the user, an authentication apparatus position information acquisition process of acquiring position information of the authentication apparatus as authentication apparatus position information, and an authentication apparatus position information transmission process of transmitting an authentication result of the authentication process and the authentication apparatus position information to the information processing apparatus, the control method of the client apparatus including a client apparatus position information acquisition process of acquiring position information of the client apparatus as client apparatus position information, and a client apparatus position information transmission process of transmitting the client apparatus position information to the information processing apparatus.

REFERENCE SIGNS LIST

30 Settlement processing system, 31 Client apparatus, 32 EC store server, 33 Acquirer server, 34 Mediation server, 35 Bank server, 36 Wearable device, 51 Control unit, 59 GPS, 71 Settlement processing unit, 72 Challenge processing unit, 73 Registration processing unit, 101 Control unit, 121 Pre-credit processing unit, 122 Settlement processing unit, 141 Control unit, 151 Settlement processing unit, 161 Control unit, 181 Pre-credit mediation processing unit, 182 Settlement mediation processing unit, 201 Control unit, 203a Context DB, 221 Registration processing unit, 222 Context reception processing unit, 223 Challenge processing unit, 224 Risk score determination unit, 225 Settlement processing unit, 241 Control unit, 249 GPS, 250 Installation sensor, 251 Fingerprint sensor, 271 Registration processing unit, 272 Context transmission unit, 273 Challenge processing unit

The invention claimed is:

1. An information processing apparatus, comprising:
circuitry configured to:
set, as a risk score, a score regarding a risk of a settlement process;
compare the set risk score and a threshold value;
transmit an authentication process request to a client apparatus based on the comparison;
receive, as context information, an authentication result from the client apparatus and a position information of an authentication apparatus, wherein
the authentication result is received based on the authentication process request, and
the authentication apparatus transmits the position information at a specific time interval;
determine, in the settlement process, the risk regarding the settlement process based on the authentication result and a positional relationship between the authentication apparatus and the client apparatus;
reduce the risk score by a first value at a time of the reception of the context information; and
increase the risk score by a second value after an elapse of a time period from the reception of the context information, wherein the first value is different from the second value.

2. The information processing apparatus according to claim 1, wherein the circuitry is further configured to:
transmit the authentication process request for request of an authentication process to the client apparatus based on the risk score being higher than the predetermined threshold value.

3. The information processing apparatus according to claim 1, wherein
the authentication apparatus is wearable by a user, and
the circuitry is further configured to receive the context information based on the authentication apparatus that is worn by the user.

4. The information processing apparatus according to claim 1, wherein
the circuitry is further configured to:
receive information indicating removal of the authentication apparatus based on removal of the authentication apparatus by a user, and
set the risk score to a value larger than the threshold value based on the reception of the information indicating the removal of the authentication apparatus.

5. The information processing apparatus according to claim 1, wherein the circuitry is further configured to:
determine a sign that the risk score will exceed the threshold value; and
request the authentication apparatus for the context information and receive the context information based on the sign or the risk score that exceeds the threshold value.

6. The information processing apparatus according to claim 1, wherein the circuitry is further configured to determine the risk regarding the settlement process based on the positional relationship between the authentication apparatus and the client apparatus that indicates a same position.

7. The information processing apparatus according to claim 1, wherein the circuitry is further configured to determine the risk regarding the settlement process based on the positional relationship between the authentication apparatus and the client apparatus indicates equal to or shorter than a specific distance.

8. The information processing apparatus according to claim 1, wherein
the risk circuitry is further configured to determine the risk regarding the settlement process based on the positional relationship between the authentication apparatus and the client apparatus that indicates similarity larger than a specific level, and
the similarity is in relation to SSIDs of access points that are received by both the authentication apparatus and the client apparatus and in relation to reception strength of each of the authentication apparatus and the client apparatus.

9. The information processing apparatus according to claim 1, wherein the circuitry is further configured to determine the risk regarding the settlement process based on the positional relationship between the authentication apparatus and the client apparatus that indicates the authentication apparatus is pairable with the client apparatus via Bluetooth.

10. An information processing method, comprising:
in an information processing apparatus:
setting, as a risk score, a score regarding a risk of a settlement process;
comparing the set risk score and a threshold value;
transmitting an authentication process request to a client apparatus based on the comparison;
receiving, as context information, an authentication result from the client apparatus and a position information of an authentication apparatus, wherein
the authentication result is received based on the authentication process request, and
the authentication apparatus transmits the position information at a specific time interval;
determining, in the settlement process, the risk regarding the settlement process based on the authentication result and a positional relationship between the authentication apparatus and the client apparatus;
reducing the risk score by a first value at a time of the reception of the context information; and
increasing the risk score by a second value after an elapse of a time period from the reception of the context information, wherein the first value is different from the second value.

11. A client system, comprising:
an authentication apparatus that includes a first circuitry configured to authenticate a user; and
a client apparatus that includes a second circuitry configured to apply a settlement process of the user to an information processing apparatus that determines a risk regarding the settlement process, wherein
the first circuitry is further configured to:
acquire position information of the authentication apparatus as authentication apparatus position information; and
transmit, as context information, an authentication result and the authentication apparatus position information to the information processing apparatus at a specific time interval, and
the second circuitry is further configured to:
acquire position information of the client apparatus as client apparatus position information; and
transmit the client apparatus position information to the information processing apparatus, and
the information processing apparatus:
determines, in the settlement process, the risk regarding the settlement process based on the authentication result transmitted by the first circuitry and a positional relationship between the authentication apparatus and the client apparatus;
reduces a risk score by a first value at a time of reception of the context information, wherein the risk score corresponds to the risk regarding the settlement process; and
increases the risk score by a second value after an elapse of a time period from the reception of the context information, wherein the first value is different from the second value.

12. The client system according to claim 11, wherein
the authentication apparatus is wearable by the user, and
the first circuitry is further configured to transmit the context information to the information processing apparatus based on the authentication apparatus that is worn by the user.

13. The client system according to claim 12, wherein the first circuitry is further configured to transmit information indicating removal of the authentication apparatus to the information processing apparatus based on removal of the authentication apparatus by the user.

14. The client system according to claim 11, wherein the first circuitry is further configured to transmit the context information to the information processing apparatus based on a request for the context information from the information processing apparatus.

15. The client system according to claim 11, wherein the first circuitry is further configured to transmit authentication information of the user to the information processing apparatus in a case where the authentication information of the user is requested based on a determination result of the risk regarding the settlement process of the information processing apparatus.

16. A control method of a client system, the method comprising:
  in an authentication apparatus that includes a first circuitry configured to authenticate a user and in a client apparatus that includes a second circuitry configured to apply a settlement process of the user to an information processing apparatus that determines a risk regarding the settlement process:
    acquiring, by the first circuitry, position information of the authentication apparatus as authentication apparatus position information;
    transmitting as context information, by the first circuitry, an authentication result of an authentication process and the authentication apparatus position information to the information processing apparatus at a specific time interval;
    acquiring, by the second circuitry, position information of the client apparatus as client apparatus position information; and
    transmitting, by the second circuitry, the client apparatus position information to the information processing apparatus, wherein
      based on the transmitted authentication result from the first circuitry and a positional relationship between the authentication apparatus and the client apparatus, determining, by the information processing apparatus, the risk regarding the settlement process,
      reducing, by the information processing apparatus, a risk score by a first value at a time of reception of the context information,
      the risk score corresponds to the risk regarding the settlement process, and
      increasing, by the information processing apparatus, the risk score by a second value after an elapse of a time period from the reception of the context information, wherein the first value is different from the second value.

* * * * *